US011840333B2

(12) United States Patent
Sweeny et al.

(10) Patent No.: US 11,840,333 B2
(45) Date of Patent: Dec. 12, 2023

(54) PACKAGE DELIVERY MECHANISM

(71) Applicant: Flirtey Holdings, Inc., Reno, NV (US)

(72) Inventors: Matthew Sweeny, Reno, NV (US); Jess Hayden, Reno, NV (US); Joseph Rinaldi, Reno, NV (US)

(73) Assignee: Flirtey Holdings, Inc., Reno, NV (US)

( * ) Notice: Subject to any disclaimer, the term of this patent is extended or adjusted under 35 U.S.C. 154(b) by 974 days.

(21) Appl. No.: 16/687,427

(22) Filed: Nov. 18, 2019

(65) Prior Publication Data

US 2020/0094962 A1 Mar. 26, 2020
US 2022/0089281 A9 Mar. 24, 2022

Related U.S. Application Data

(63) Continuation of application No. PCT/US2018/035657, filed on Jun. 1, 2018, which is
(Continued)

(51) Int. Cl.
*B64C 39/02* (2023.01)
*B64D 1/10* (2006.01)
(Continued)

(52) U.S. Cl.
CPC .............. *B64C 39/024* (2013.01); *B26D 5/00* (2013.01); *B64D 1/02* (2013.01); *B64D 1/10* (2013.01);
(Continued)

(58) Field of Classification Search
CPC . B64C 39/02; B64C 39/024; B64C 2201/027; B64C 2201/128;
(Continued)

(56) References Cited

U.S. PATENT DOCUMENTS 2,108,349 A 2/1938 Rasmussen
4,273,464 A 6/1981 Scott
(Continued)

FOREIGN PATENT DOCUMENTS

CN 103895870 A 7/2014
CN 104118564 A 10/2014
(Continued)

OTHER PUBLICATIONS

International Search Report and Written Opinion dated Dec. 23, 2016 for PCT Application No. PCT/US2016/057155.
(Continued)

*Primary Examiner* — Benjamin P Lee
(74) *Attorney, Agent, or Firm* — EIP US LLP

(57) ABSTRACT

Disclosed is a package delivery mechanism for use by an unmanned aerial vehicle (UAV). The package delivery mechanism includes a gravity activated locking mechanism to lock and unlock a package attached to the UAV based on the weight of the package. When the package is attached to suspension means of the UAV that lowers the package to the ground from the UAV, the locking mechanism automatically engages with the package and keeps the package locked to the suspension means, due to the weight of the package. When the package is lowered and reaches on the ground, the weight of the package is offloaded from the suspension means, which enables the locking mechanism to be disengaged, thereby releasing the package. The package delivery mechanism includes a severing module to sever the suspension means from the UAV.

20 Claims, 39 Drawing Sheets

Related U.S. Application Data a continuation of application No. 15/612,789, filed on Jun. 2, 2017, now Pat. No. 10,618,655, and a continuation of application No. 15/612,989, filed on Jun. 2, 2017, now abandoned.

(51) Int. Cl.

| | | |
|---|---|---|
| B64D 1/12 | (2006.01) | |
| B26D 5/00 | (2006.01) | |
| B64D 1/02 | (2006.01) | |
| B64D 17/38 | (2006.01) | |
| B26F 3/12 | (2006.01) | |
| F16B 21/02 | (2006.01) | |
| B64U 10/13 | (2023.01) | |
| B64U 101/60 | (2023.01) | |

(52) U.S. Cl.
CPC ............ *B64D 1/12* (2013.01); *B26F 3/12* (2013.01); *B64D 17/38* (2013.01); *B64U 10/13* (2023.01); *B64U 2101/60* (2023.01); *B64U 2201/10* (2023.01); *F16B 21/02* (2013.01)

(58) Field of Classification Search
CPC ...... B64C 2201/141; B26D 5/00; B64D 1/02; B64D 1/10; B64D 1/12; F16B 21/02
See application file for complete search history.

(56) References Cited

U.S. PATENT DOCUMENTS

| | | | |
|---|---|---|---|
| 4,536,024 | A | 8/1985 | Gabriel |
| 4,946,037 | A | 8/1990 | Keith |
| 4,966,280 | A | 10/1990 | Bradford |
| 6,394,340 | B1 | 5/2002 | Anchor et al. |
| 6,416,019 | B1 | 7/2002 | Hilliard et al. |
| 6,471,160 | B2 | 10/2002 | Grieser |
| 6,542,797 | B2 | 4/2003 | Lohmiller |
| 6,685,140 | B2 | 2/2004 | Carroll |
| 7,467,762 | B1 | 12/2008 | Parsons |
| 7,487,939 | B1 | 2/2009 | Christof |
| 8,483,891 | B2 | 7/2013 | Yakimenko et al. |
| 8,608,112 | B1 | 12/2013 | Levay |
| 8,979,023 | B1 | 3/2015 | Wang |
| 9,033,281 | B1 | 5/2015 | Adams |
| 9,056,676 | B1 | 6/2015 | Wang |
| 9,145,212 | B1 | 9/2015 | Wei et al. |
| 9,174,733 | B1* | 11/2015 | Burgess ............... B64C 39/024 |
| 9,448,040 | B2 | 9/2016 | Rastegar |
| 9,551,990 | B2 | 1/2017 | Heinonen |
| 9,650,136 | B1* | 5/2017 | Haskin ................. B64D 1/12 |
| 9,676,481 | B1* | 6/2017 | Buchmueller ........... B64D 1/22 |
| 9,738,380 | B2 | 8/2017 | Claridge et al. |
| 9,740,208 | B2 | 8/2017 | Sugumaran et al. |
| 9,874,874 | B2 | 1/2018 | Bernhardt et al. |
| 9,938,001 | B1 | 4/2018 | Parent et al. |
| 9,975,651 | B1* | 5/2018 | Eck ..................... B64C 39/024 |
| 10,071,804 | B1* | 9/2018 | Buchmueller ........... B64D 1/12 |
| 10,118,692 | B1* | 11/2018 | Beckman ............. G06Q 10/0832 |
| 10,301,021 | B2 | 5/2019 | Jones et al. |
| 10,383,409 | B2* | 8/2019 | Fiedler ................. A01K 27/005 |
| 10,807,715 | B2* | 10/2020 | Shannon ................. B64D 1/22 |
| 11,225,991 | B2* | 1/2022 | Hall ..................... F16B 7/0413 |
| 2001/0048050 | A1 | 12/2001 | Grieser |
| 2003/0025038 | A1 | 2/2003 | Nicolai et al. |
| 2003/0057327 | A1 | 3/2003 | Carroll |
| 2005/0006525 | A1 | 1/2005 | Byers et al. |
| 2005/0230555 | A1 | 10/2005 | Strong |
| 2011/0035149 | A1 | 2/2011 | Mcandrew et al. |
| 2012/0241553 | A1 | 9/2012 | Wilke |
| 2013/0167857 | A1 | 7/2013 | Degeorge |
| 2013/0233964 | A1 | 9/2013 | Woodworth et al. |
| 2013/0311009 | A1 | 11/2013 | Mcandrew et al. |
| 2014/0008496 | A1 | 1/2014 | Ye et al. |
| 2014/0105679 | A1* | 4/2014 | Oliver ..................... F16B 21/04 403/348 |
| 2015/0094883 | A1 | 4/2015 | Peeters et al. |
| 2015/0115106 | A1 | 4/2015 | Coffey et al. |
| 2015/0158587 | A1 | 6/2015 | Patrick et al. |
| 2015/0174504 | A1 | 6/2015 | Berglund |
| 2015/0254988 | A1 | 9/2015 | Wang et al. |
| 2015/0325064 | A1 | 11/2015 | Downey et al. |
| 2016/0059963 | A1 | 3/2016 | Burgess et al. |
| 2016/0107751 | A1 | 4/2016 | D'Andrea et al. |
| 2016/0340049 | A1 | 11/2016 | Ferreyra et al. |
| 2016/0347462 | A1 | 12/2016 | Clark |
| 2017/0021925 | A1 | 1/2017 | Weller et al. |
| 2017/0031365 | A1 | 2/2017 | Sugumaran et al. |
| 2017/0081028 | A1* | 3/2017 | Jones .................... B64C 39/024 |
| 2017/0081029 | A1 | 3/2017 | Jones et al. |
| 2017/0084181 | A1 | 3/2017 | Wilson et al. |
| 2017/0174343 | A1 | 6/2017 | Erickson et al. |
| 2017/0225792 | A1 | 8/2017 | Wang et al. |
| 2017/0267347 | A1* | 9/2017 | Rinaldi ............. B65D 81/3825 |
| 2017/0276161 | A1* | 9/2017 | Oliver ..................... F16B 21/04 |
| 2017/0305650 | A1 | 10/2017 | Coulter et al. |
| 2017/0334561 | A1* | 11/2017 | Sopper .................... B64D 1/22 |
| 2018/0072421 | A1* | 3/2018 | Prager ................... B64C 39/024 |
| 2018/0281954 | A1* | 10/2018 | Atchley .................. B64D 1/22 |
| 2018/0312247 | A1* | 11/2018 | Ichihara ................. B64C 39/02 |
| 2019/0152600 | A1* | 5/2019 | Kuk ...................... B66C 13/08 |
| 2019/0235494 | A1* | 8/2019 | Cantrell ............... G05D 1/0055 |
| 2020/0407197 | A1* | 12/2020 | Hafenrichter ............ B64D 1/22 |
| 2021/0300557 | A1* | 9/2021 | Oshima ................. B64D 27/24 |

FOREIGN PATENT DOCUMENTS

| | | |
|---|---|---|
| EP | 2112065 A2 | 10/2009 |
| FR | 3012423 A1 | 5/2015 |
| KR | 101496892 B1 | 3/2015 |
| WO | 8911415 A1 | 11/1989 |
| WO | 2007034468 A1 | 3/2007 |
| WO | 2014058510 A2 | 4/2014 |
| WO | 2014080409 A1 | 5/2014 |
| WO | 2016182750 A1 | 11/2016 |
| WO | 2016191140 A1 | 12/2016 |

OTHER PUBLICATIONS

European Extended Search Report dated Apr. 30, 2019 for EP Application No. 16856325.2.
International Search Report and Written Opinion dated Aug. 31, 2018 for PCT Application No. PCT/US2018/035657.
United States Non-Final Office action dated Oct. 11, 2017 for U.S. Appl. No. 15/294,479.
United States Notice of Allowance dated Jun. 11, 2018 for U.S. Appl. No. 15/294,479.
United States Non-Final Office action dated May 2, 2019 for U.S. Appl. No. 15/294,489.
United States Non-Final Office action dated Jun. 6, 2019 for U.S. Appl. No. 15/612,789.
United States Non-Final Office action dated Jun. 28, 2019 for U.S. Appl. No. 15/612,989.

\* cited by examiner

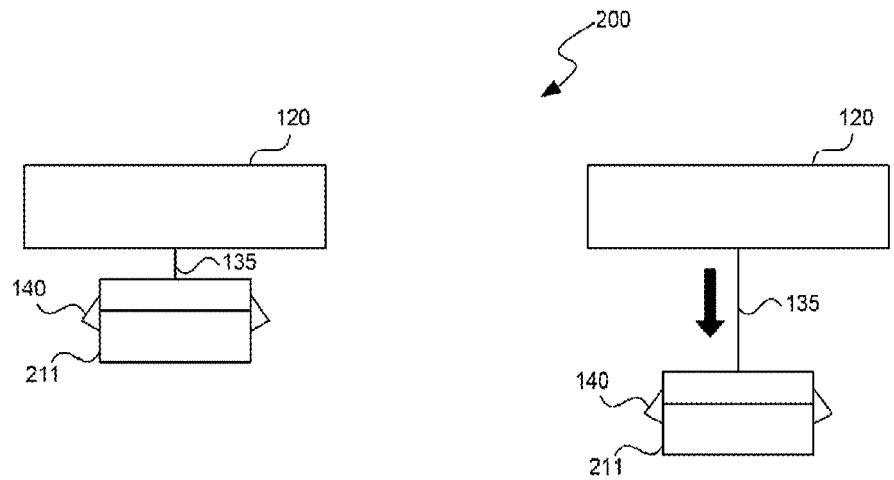
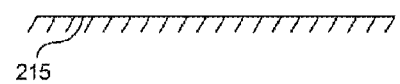
FIG. 2A
FIG. 2B
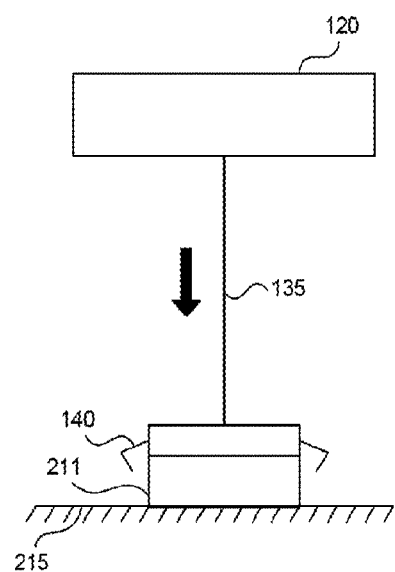
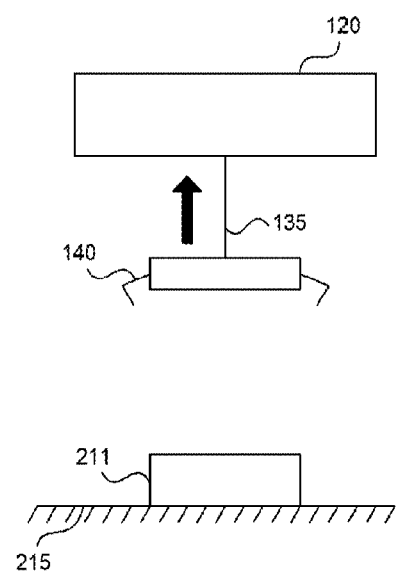
FIG. 2C
FIG. 2D

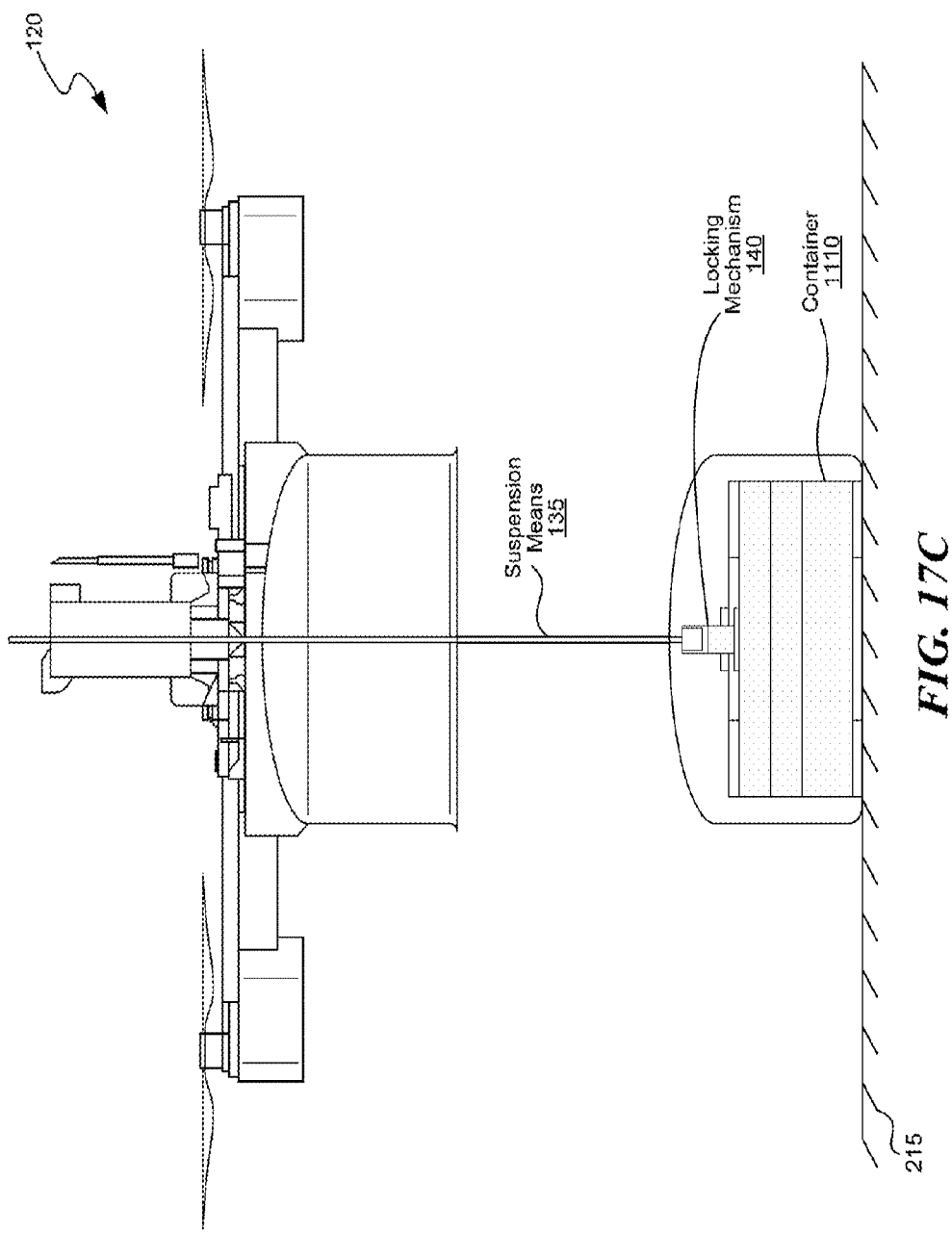

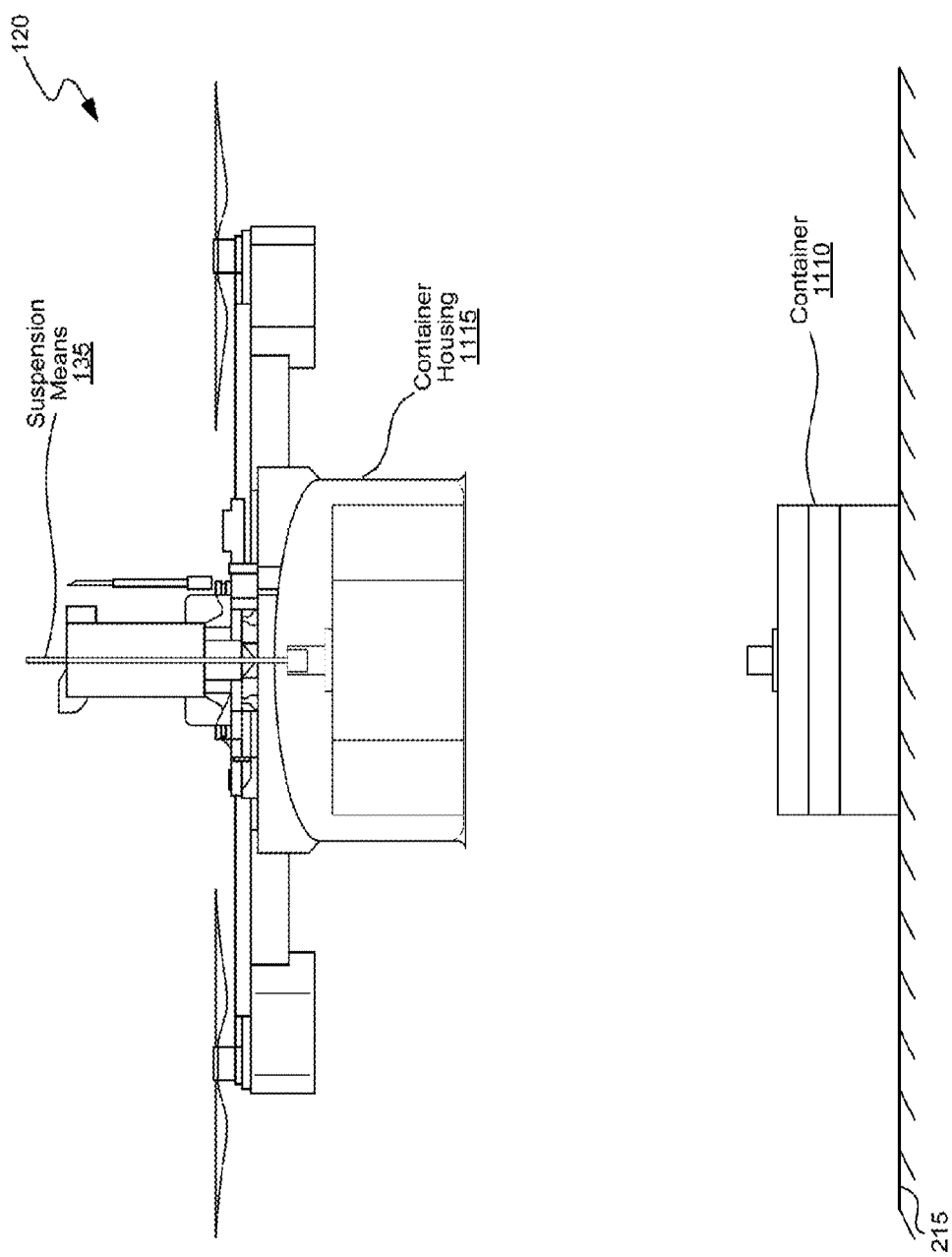

PACKAGE DELIVERY MECHANISM

CROSS-REFERENCE TO RELATED APPLICATIONS

This application is a continuation of International Application No. PCT/US2018/035657, entitled "PACKAGE DELIVERY MECHANISM," filed Jun. 1, 2018 which claims priority to U.S. application Ser. No. 15/612,789, entitled "PACKAGE DELIVERY MECHANISM IN AN UNMANNED AERIAL VEHICLE," filed Jun. 2, 2017 and U.S. application Ser. No. 15/612,989, entitled "PACKAGING CONTAINER FOR DRONE DELIVERY," filed Jun. 2, 2017. Each of the above-referenced patent applications is incorporated by reference in its entirety.

BACKGROUND OF THE INVENTION

Field of the Invention

The present disclosure relates to a package delivery mechanism, and more particularly to a package delivery mechanism comprising a coupling member for engaging with a coupling counterpart associated with a package to be delivered by an Unmanned Aerial Vehicle (UAV).

Description of the Related Technology

Unmanned aerial vehicles (UAVs), such as drones, are autonomous and/or remotely operated aerial vehicles. UAVs may be configured to fly using fixed wings or rotors and blades.

Delivery services, such as a postal service and/or a courier service offered by commercial carriers, provide delivery of goods, e.g., letters, packages, parcels or any payload, to recipients such as residences and businesses across the country. Such delivery services have some drawbacks and may not be efficient in catering to the needs of the consumers and/or businesses today. For example, such delivery services involve significant investments in terms of money and effort to procure and maintain a fleet of delivery vehicles, and to manage the human resource required to operate the fleet. In addition, these delivery services find it difficult to deliver goods quickly, in a short period after a customer has placed an order. Often the customer is required to wait several hours or even days between the moment they place the order and the moment they receive the goods.

It has been proposed to utilize UAVs for the delivery of goods to a customer. A UAV can be dispatched within a few minutes of a customer placing an order, and is relatively inexpensive to purchase and maintain compared to other types of delivery vehicle. A UAV delivery service can overcome some of the problems discussed above with respect to the conventional delivery services; however some problems still remain. For example, humans are often still required to both manually load a payload onto the UAV before delivery and to manually unload the payload from the UAV once the UAV has arrived at its delivery destination.

Furthermore, UAVs that are powered by rotor blades can be dangerous, so it is desirable to minimize interaction between the UAV and humans. Some UAVs therefore hover at a distance above the ground when collecting and/or delivering a payload. A retractable cable attached to the UAV can be lowered towards the ground, and a human can manually attach the payload to the cable while maintaining a safe distance from the rotating rotor blades of the UAV. Similarly, the payload can be lowered to the ground at the delivery destination, and the customer can manually detach the payload from the cable. However, again this system requires the presence of humans.

Some UAVs have automated coupling mechanisms for releasing the payload from the cable at the delivery destination. However, these mechanisms often have a separate communication wire running along the cable to which the package is attached or have some other wireless means to communicate with the coupling mechanism to detach the package from the cable. These coupling mechanisms and communication cables increase the mass of the UAV, increase the complexity of the operation of the UAV, and increase the expense of manufacturing and maintaining the UAV.

Accordingly, there is a need for an improved UAV coupling mechanism which overcomes the problems of these prior solutions.

SUMMARY

According to a first aspect of the present disclosure, there is provided a coupling member for coupling to a coupling counterpart. The coupling member may, for example, be attached to one end of a retractable cable and a UAV can lower and raise the coupling counterpart to couple to a payload having a coupling counterpart attached thereto.

The coupling member defines first and second longitudinal directions, opposite to one another and parallel to a longitudinal axis. The coupling member further defines an azimuthal direction around the longitudinal axis. The coupling member comprises a guide path extending in the first and second longitudinal directions and in the azimuthal direction, the guide path being configured to guide a protrusion of the coupling counterpart from an inlet of the guide path to an outlet of the guide path, the inlet and outlet having different azimuthal positions on the coupling member. The guide path comprises an ingress surface comprising a first part and a second part, the first part being configured to receive the protrusion from the inlet when the coupling member is moved in the first longitudinal direction towards the coupling counterpart. The first part is inclined so as to extend in the first longitudinal direction and in the azimuthal direction, thereby to cause the coupling member to rotate in the azimuthal direction when the coupling member is moved in the first longitudinal direction towards the coupling counterpart after the protrusion is received by the first part. The second part is configured to receive the protrusion from the first part and to abut the protrusion to limit movement of the coupling member relative to the coupling counterpart in the first longitudinal direction.

The guide path further comprises a locking surface comprising a third part and a fourth part, the third part being configured to receive the protrusion from the second part when the coupling member is moved in the second longitudinal direction away from the coupling counterpart. The third part is inclined so as to extend in the second longitudinal direction and in the azimuthal direction, thereby to cause the coupling member to rotate in the azimuthal direction when the coupling member is moved in the second longitudinal direction away from the coupling counterpart after the protrusion is received by the third part. The fourth part is configured to receive the protrusion from the third part and to abut the protrusion to engage the coupling member in a locking position relative to the coupling counterpart.

The guide path further comprises an egress surface comprising a fifth part and a sixth part, the fifth part being configured to receive the protrusion from the fourth part when the coupling member is moved in the first longitudinal direction towards the coupling counterpart. The fifth part is inclined so as to extend in the first longitudinal direction and in the azimuthal direction, thereby to cause the coupling member to rotate in the azimuthal direction when the coupling member is moved in the first longitudinal direction towards the coupling counterpart after the protrusion is received by the fifth part. The sixth part is configured to receive the protrusion from the fifth part, to abut the protrusion to limit movement of the coupling member relative to the coupling counterpart in the first longitudinal direction, and to release the protrusion towards the outlet when the coupling member is moved in the second longitudinal direction away from the coupling counterpart.

The longitudinal axis defined by the coupling member may be aligned substantially vertically, such that the first longitudinal direction is a downwards direction, towards a surface on which a payload is placed. Similarly, the second longitudinal direction may be an upwards direction, away from the surface. Although the present description generally describes the coupling member moving in a vertical dimension, the coupling member may also be used in any other dimension, such as a horizontal dimension.

As mentioned, a UAV according to an example may comprise the above described coupling member to enable the UAV to couple with a payload having a coupling counterpart attached thereto. Accordingly, the UAV may lower the coupling member towards a payload, which may be attached to the end of a retractable cable, to engage the coupling counterpart. The downward motion and engagement of the protrusion with an inclined surface causes the coupling member to rotate towards a locking position, such that as the coupling member is drawn back towards the UAV, the payload can be engaged and lifted away from the surface. Similarly, to uncouple the coupling counterpart, and therefore the payload, the UAV may lower the payload towards a delivery surface. As the payload engages the delivery surface, the coupling member continues to move towards the delivery surface which causes the coupling member to rotate towards an unlocked position, such that as the coupling member is drawn back towards the UAV, the payload is disengaged and can be left on the delivery surface. In another arrangement, the UAV may comprise the coupling counterpart and the payload may comprise the coupling member.

The coupling member defined above therefore enables automatic coupling to the coupling counterpart and enables automatic uncoupling from the coupling counterpart without the need for human intervention or any instruction from the UAV itself to cause the coupling member to rotate. Instead, as the coupling member moves in the first and second longitudinal directions, the engagement between the protrusion and the inclined surfaces causes the coupling member to automatically rotate relative to the coupling counterpart.

The term "inclined", when used to clarify a feature of an object, means that in a two-dimensional projection along the longitudinal axis, the object is disposed at an angle relative to the longitudinal axis, the angle being measured between the object and the longitudinal axis. In other words, the object is not arranged perpendicular or parallel to the longitudinal axis but is sloped. In one example, this angle is a helix angle.

In one arrangement, the coupling member is a male connector and is configured to fit within the coupling counterpart, which is a female connector. For example, the coupling member may comprise a generally elongate body having an outer surface from which the features of the guide path project outwards, in a radial direction. The coupling counterpart may therefore comprise an inner surface from which the protrusion projects inwards, in a radial direction. Alternatively, the coupling member may be a female connector and is configured to fit around an outer perimeter of the coupling counterpart, which may be a male connector. For example, the coupling member may comprise a generally elongate body having an inner surface from which the features of the guide path project inwards, in a radial direction. The coupling counterpart may therefore comprise an outer surface from which the protrusion projects outwards, in a radial direction. The outer/inner surface of the male/female coupling member therefore extends around the coupling member in the azimuthal direction.

Advantageously, the third part is spaced from the second part along the longitudinal axis and has substantially the same azimuthal position as the second part. Therefore, part of the ingress surface is aligned with part of the locking surface in a direction parallel to the axis. Similarly, the fifth part may be spaced from the fourth part along the longitudinal axis and have substantially the same azimuthal position as the fourth part. This alignment means that the motion of the coupling member can be limited to single dimension, i.e. along the longitudinal axis.

In a particular arrangement, the inlet to the guide path comprises an inlet surface having a curvature in the second longitudinal direction and in the azimuthal direction, the inlet surface being configured to guide the protrusion towards the first part by causing the coupling member to rotate in a direction opposite to the azimuthal direction when the coupling member is moved in the first longitudinal direction towards the coupling counterpart. In this way, the inlet surface provides a way to correctly align, in azimuth, the coupling member with respect to the protrusion as the coupling member moves towards the coupling counterpart.

In one example, the inlet surface comprises a seventh part, the seventh part being spaced from the sixth part along the longitudinal axis and having substantially the same azimuthal position as the sixth part such that the protrusion is prevented from entering the outlet and engaging the sixth part when the coupling member moves in the first longitudinal direction towards the coupling counterpart. The seventh part therefore acts as a component to stop the protrusion entering the guide path in the wrong direction. The seventh part may also be inclined to help guide the protrusion move towards the first part.

As mentioned above, the longitudinal axis may be aligned in a vertical direction. Accordingly, in an example, a gravitational force may act on the coupling member in the first longitudinal direction, thereby to cause the rotation in the azimuthal direction. For example, the coupling member has a mass and therefore a weight which acts in the first longitudinal direction. The gravitational force acting on the coupling member therefore causes the coupling member to rotate when an inclined surface engages a protrusion because the coupling member is being pulled downwards in the first longitudinal direction.

Preferably, the first part of the ingress surface and the fifth part of the egress surface are inclined at substantially the same angle and have substantially the same length. The angle may be defined as subtending between the ingress/egress surface and the longitudinal axis. As a consequence, the coupling member will rotate in the azimuthal direction by the same degree when the coupling member couples with, and uncouples from, the coupling counterpart. Similarly, the distance travelled along the longitudinal axis (i.e. the pitch)

during the rotations is the same. This provides greater control of the coupling member.

In one arrangement, the coupling member comprises a plurality of guide paths being azimuthally spaced apart around the coupling member, wherein each of the plurality of guide paths comprise an inlet and an outlet and are configured to engage to a corresponding protrusion of the coupling counterpart. As such, the coupling can be improved by having more than one protrusion and guide path engagement. The guide paths can be equally spaced to ensure that the payload remains level when it is being transported by the UAV. In a particular example, the coupling member comprises three guide paths. For example, the three inlets may be spaced in azimuth around the coupling member such that they are separated by 120 degrees. Having three guide paths and three protrusions provides a particularly stable arrangement.

In a particular example, the coupling member comprises a profile that tapers in the first longitudinal direction. For example, the coupling member may have an outer surface that narrows in width towards a lower surface. This tapered profile allows the coupling member to be guided more easily into the coupling counterpart. The angled surfaces can engage a lip of the coupling counterpart and deflect the coupling member more centrally into an aperture of the coupling counterpart.

As mentioned, a UAV may comprise the above described coupling member attached to a cable, such as a retractable suspension member. Such an arrangement facilitates a package/payload delivery mechanism for a UAV comprising a retractable suspension member and a coupling member as described above, where the coupling member is attached to an end of the retractable suspension member. The retractable suspension member allows the coupling member to be lowered towards a payload comprising the coupling counterpart while maintaining a safe distance from the ground. The payload delivery mechanism could be retrofitted to existing UAVs.

According to further aspects of the present disclosure, there is provided a UAV comprising a payload delivery mechanism as described above, and a coupling system, comprising a coupling member as described above and at least one coupling counterpart. The coupling system may further comprise at least one payload container, each payload container comprising one or more of the at least one coupling counterpart. For example, a payload container, such as a box to receive a payload, can have one or more coupling counterparts attached thereto. These may be located on a number of different surfaces of the container to allow the payload to be collected regardless of its orientation.

According to a yet further aspect of the present disclosure, there is provided a method of coupling a coupling member to a coupling counterpart, the coupling member defining first and second longitudinal directions, opposite to one another and parallel to a longitudinal axis, and an azimuthal direction around the longitudinal axis. The coupling member comprises a guide path extending in the first and second longitudinal directions and in the azimuthal direction, the guide path being configured to guide a protrusion of the coupling counterpart from an inlet of the guide path to an outlet of the guide path, the inlet and outlet having different azimuthal positions on the coupling member. The guide path comprises an ingress surface comprising a first part and a second part, the first part being inclined so as to extend in the first longitudinal direction and in the azimuthal direction. The guide path further comprises a locking surface comprising a third part and a fourth part, the third part being inclined so as to extend in the second longitudinal direction and in the azimuthal direction. The guide path further comprises an egress surface comprising a fifth part and a sixth part, the fifth part being inclined so as to extend in the first longitudinal direction and in the azimuthal direction.

The method comprises moving the coupling member in the first longitudinal direction towards the coupling counterpart such that the protrusion moves from the inlet and engages the first part. The method further comprises moving the coupling member in the first longitudinal direction until the protrusion abuts the second part, wherein the first part causes the coupling member to rotate in the azimuthal direction as the protrusion moves towards the second part. The method further comprises moving the coupling member in the second longitudinal direction away from the coupling counterpart, such that the protrusion moves from the second part and engages the third part. The method further comprises moving the coupling member in the second longitudinal direction such that the third part causes the coupling member to rotate in the azimuthal direction as the protrusion moves towards the fourth part to engage the coupling member in a locking position relative to the coupling counterpart. The method further comprises moving the coupling member in the first longitudinal direction, such that the protrusion moves from the fourth part and engages the fifth part. The method further comprises moving the coupling member in the first longitudinal direction until the protrusion abuts the sixth part, wherein the fifth part causes the coupling member to rotate in the azimuthal direction as the protrusion moves towards the sixth part. The method further comprises moving the coupling member in the second longitudinal direction such that the protrusion is released from the sixth part towards the outlet.

The inlet to the guide path may comprise an inlet surface having a curvature in the second longitudinal direction and in the azimuthal direction. The method may therefore further comprise moving the coupling member in the first longitudinal direction towards the coupling counterpart such that the protrusion is guided from the inlet towards the first part, wherein the inlet surface causes the coupling member to rotate in a direction opposite to the azimuthal direction.

The inlet surface may comprise a seventh part, the seventh part being spaced from the sixth part along the longitudinal axis and having substantially the same azimuthal position as the sixth part. The method may therefore further comprise engaging the protrusion with the seventh part by moving the coupling member in the first longitudinal direction towards the coupling counterpart, thereby preventing the protrusion from entering the outlet and engaging the sixth part.

The method may further comprise arranging the coupling member such that a gravitational force acts on the coupling member in the first longitudinal direction, thereby to cause the rotation in the azimuthal direction.

The coupling member may comprise a plurality of guide paths being azimuthally spaced apart around the coupling member, wherein each of the plurality of guide paths comprise an inlet and an outlet, and are configured to engage a corresponding protrusion of the coupling counterpart. The method may further comprise repeating the method for each of the corresponding protrusions of the coupling counterpart.

Further features and advantages of the disclosure will become apparent from the following description of preferred embodiments of the disclosure, given by way of example only, which is made with reference to the accompanying drawings.

BRIEF DESCRIPTION OF THE DRAWINGS

FIG. 2A is a diagram illustrating the drone enroute to deliver the package, consistent with various embodiments.

FIG. 2B is a diagram illustrating suspension means of the drone lowering the package from the drone, consistent with various embodiments.

FIG. 2C is a diagram illustrating the suspension means of the drone placing the package on a delivery area at a delivery destination, consistent with various embodiments.

FIG. 2D is a diagram illustrating the drone retracting the suspension means after lowering the package to the surface at the delivery destination, consistent with various embodiments.

FIG. 17C is a diagram illustrating the drone placing the package on a delivery area at a delivery destination, consistent with various embodiments.

FIG. 17E is a diagram illustrating the hood being fully retracted into a container housing of the drone, consistent with various embodiments.

DETAILED DESCRIPTION OF CERTAIN INVENTIVE EMBODIMENTS

Figure 1:
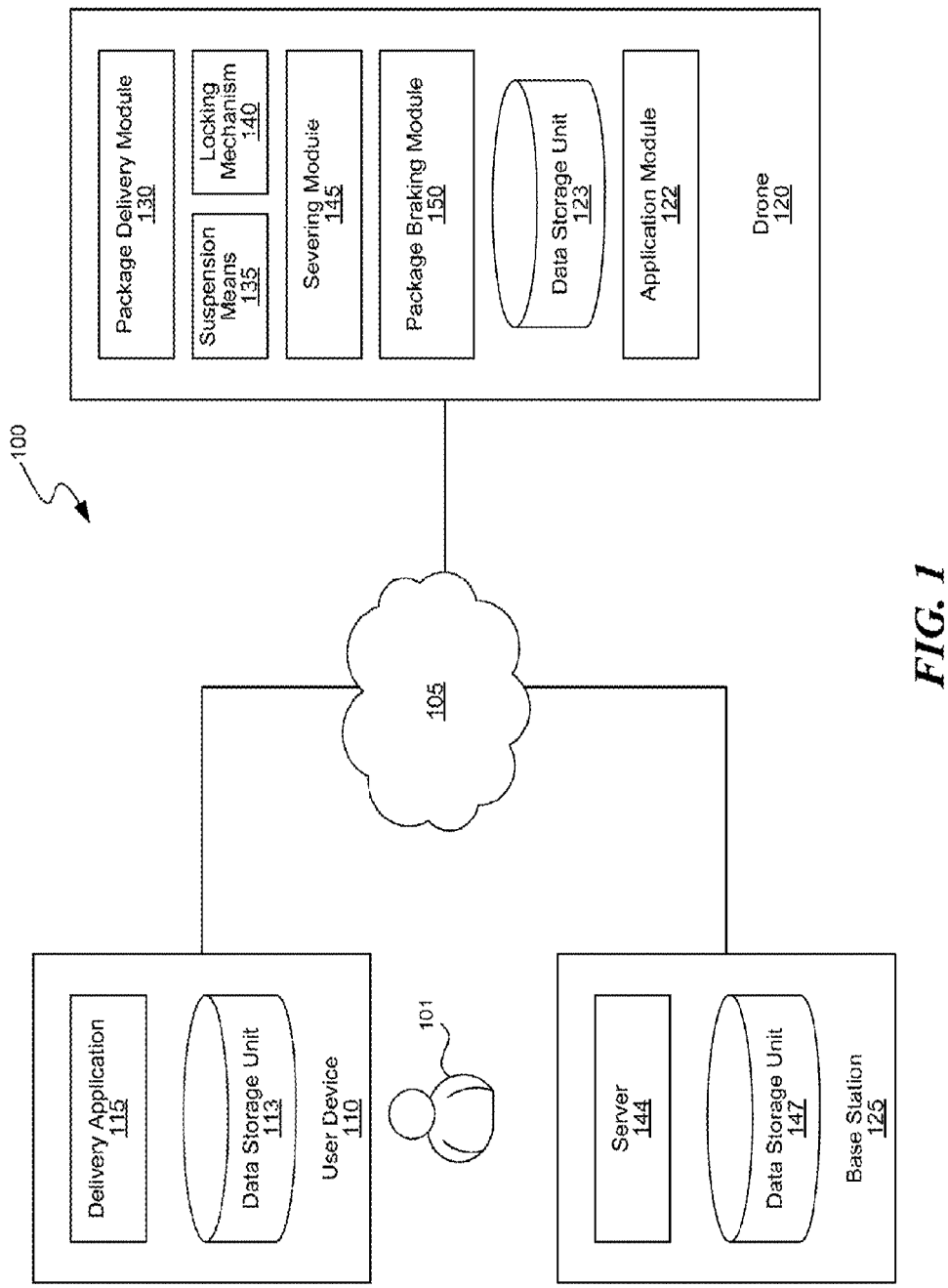
FIG. 1 is a block diagram illustrating a system to deliver a package using a drone, consistent with various embodiments.

Disclosed are package delivery mechanisms for a UAV, such as a drone, to deliver a package to a delivery destination, e.g., a home or a business. When the drone reaches the delivery destination, the package delivery mechanism (also referred to as a "package delivery module" or a "payload delivery mechanism") lowers the package from the air onto the ground and leaves the package at the delivery destination on a delivery area, e.g., a suitable location of a home such as the front lawn, on the ground somewhere at the delivery destination, a balcony, a porch, or into the hands of a human. In some embodiments, the package can also be lowered into the hands of a receiving person. The drone may not have to land on the ground to deliver the package; it can continue to hover at the delivery destination at a particular height from the ground and lower the package onto the ground. The package delivery module includes a suspension means/member, e.g., a cable, that lowers the package from the drone onto the ground and deposits the package on the ground. The suspension means can include a locking mechanism, also referred to as a coupling member herein, that holds or locks the package onto the suspension means until the package is to be deposited at the delivery destination, and unlocks to release the package when the package is lowered on to the ground and left at the delivery destination.

In some embodiments, the coupling member is gravity activated. When a package is coupled to the coupling member and lifted off the ground or the surface on which the package is resting, the gravitational force pulls the package down towards the ground due to the weight of the package, which in turn keeps the coupling member engaged with the package causing the coupling member to lock or hold the package onto the suspension means securely. The coupling member continues to be engaged throughout the flight of the drone, e.g., as the gravitational force continues to pull the package down. Upon reaching the delivery destination, the package is lowered to the ground and when the package rests on the ground, the weight of the package is taken off the coupling member, which enables the coupling member to be decoupled or disengaged from the package, thereby releasing or unlocking the package. The suspension means is then retracted by the package delivery module onto the drone. The gravity activated coupling member can eliminate the need to have additional means, e.g., a communication cable that is to be run along the suspension means or a wireless circuitry in the package delivery module, for engaging and/or disengaging the coupling member. Also, the gravity activated coupling member is significantly simpler, convenient, and cheaper to design, manufacture and use compared to other known means. The coupling member can be configured to couple with the package automatically, or passively, which is described in further detail at least with reference to FIGS. 2E-2J.

While the coupling member is described as gravity-activated, it can work using various other methods, e.g., a remote activated lock; or a timed lock; or a computer vision activated lock; or a weight activated lock; or a humanoid hand holding the package. Further, note that the terms "lock," "hold," "attach," "couple" and such similar terms with reference to the coupling member are used synonymously to denote holding of the package by the coupling member, with or without locking the package, onto the suspensions means or any other part of the drone securely for carrying the package. Similarly, the terms "unlock," "unhold," "detach," "decouple" and such similar terms with reference to the coupling member are used synonymously to denote releasing of the package by the coupling member, with or without unlocking the package, from the suspensions means or any other part of the drone to deliver or drop the package at a delivery area.

FIGS. 2E-K show a first such coupling member, which can be rotated, e.g. manually, to attach the package. FIGS. 19-25 show a second such coupling member, which automatically engages the coupling counterpart on the package. The second coupling member not only enables automatic uncoupling, but also enables automatic coupling without the need of a human or additional mechanism to cause the coupling member to rotate. Instead, the rotation is automatic in the sense that inclined surfaces on the coupling member cause the rotation by simply moving the coupling along a longitudinal axis.

In some embodiments, the package delivery module(s) also include(s) a severing module to sever the suspension means from the drone. The package delivery module may comprise two severing modules, the second of which acts as a backup in case the first severing module fails. In some situations, e.g., when the cable that lowers the package is grabbed onto and pulled by a person and/or an animal, or if the cable is tangled in an obstacle like a tree, the drone can be brought down, which can damage the drone, property near the drone, or people and/or animals near the drone. The severing module can sever the suspension means in such situations, which separates the suspension means from the drone thereby keeping the drone from being dragged down. When the cable is grabbed onto and pulled, the package delivery module can detect the additional load on the suspension means. If the load is beyond a specified value, the package delivery module can instruct the severing module to sever the suspension means from the drone, and the severing module severs the suspension means instantaneously, e.g., in a fraction of a second. In some embodiments, the suspension means can be severed automatically by the drone (e.g., whether due to computer vision, onboard sensor indicating a malfunction, or some other input), and/or by a human operator of the drone.

In some embodiments, the severing module uses a nichrome cutting element for severing the suspension means. When an electric current of certain rating is passed through the nichrome cutting element, the nichrome cutting element generates significant heat, which can be used to sever the suspension means. In some embodiments, the severing module uses other cutting instruments to sever the suspension means.

In some embodiments, the drone includes multiple suspension means, e.g., multiple cables. The multiple suspension means can be used to deliver multiple packages, or one cable can be used as a primary cable and another one as a standby cable in case the primary cable ceases to work.

In some embodiments, the drone includes a package brake module that locks the package to the drone and keeps the package from being removed by unauthorized personnel in case there is a problem with the drone, e.g., a power failure in the drone, or if there is a problem with the package delivery module, e.g., suspension means is not working. The package brake module, when engaged, can also take the weight of the package off of the suspension means, thereby reducing the tension on the suspension means and a load on the mechanism, e.g., a motor of a spool or a spindle, using which the suspension means is operated.

FIG. 1 is a block diagram illustrating a system 100 for delivering a package using a drone 120, consistent with various embodiments. The system 100 includes a user device 110, the drone 120, and a base station 125 that are configured to communicate with one another via a network 105. The network 105 can include a local area network ("LAN"), a wide area network ("WAN"), an intranet, an Internet, a cellular or other mobile communication network, Bluetooth, near field communication (NFC), or any combination thereof. The user device 110 can include a desktop computer, a laptop computer, a tablet computer, a smart phone, a wearable device or an automobile with one or more processors embedded therein, or any other wired or wireless, processor-driven device. The user device 110 can be used by a user 101, e.g., a recipient of the package, to track the status of the package delivery made by the drone 120, and/or place an order for a product and request that it be shipped using a drone. The base station 125 can include a server, a desktop computer, a laptop computer, a tablet computer, a smart phone, or any other wired or wireless, or a processor-driven device that can be used by operators of the drone 120 for operating the drone 120 to deliver the package.

In some embodiments, the user 101 may have to install an application, e.g., a delivery application 115, on the user device 110 to access various features provided by the delivery service, including delivery status of the package. In some embodiments, the user 101 may also log into a website provided by the merchant and/or the drone operator to access the above features. The user device 110 can include a data storage unit 113. The data storage unit 113 can store data that may be necessary for the working of the delivery application 115. For example, the data storage unit 113 can store data regarding the delivery status of the package. In another example, the data storage unit 113 can store information such as specific delivery instructions provided by the user to the operators of the drone 120. In some embodiments, the user 101 may access the delivery application 115 on the user device 110 via a user interface. The user 101 can sign in to the delivery application 115 and communicate with the base station 125 to arrange for, modify, or cancel the delivery of a product.

The base station 125 can include a server 144 and a data storage unit 147. The base station 125 can communicate with the user device 110, merchant systems, or other package delivery systems that deliver or receive packages. The base station 125 may be associated with any entity that delivers and/or receives packages. For example, the base station 125 may be associated with a courier company, a shipping company, a postal service, a merchant with whom the user 101 performed a transaction to buy a product that is being delivered, or another party who is operating the drone 120 on behalf of the merchant or the delivery service provider to deliver the product to the user 101.

The drone 120 may be any type of UAV, e.g., a helicopter, a quadcopter, octocopter, or a fixed-wing UAV. The drone 120 includes an application module 122 that facilitates the drone 120 to deliver a package to the user 101. The application module 122 can include the hardware and/or software for working with a package delivery module 130, suspension means/member 135 and a coupling member 140 to deliver the package to the user 101 at a delivery destination. The application module 122 can receive instructions for package deliveries, e.g., from the base station 125. For example, the application module 122 may receive an address of a delivery destination, GPS coordinates of the delivery destination, a smartphone location of the delivery destination, delivery route, package details, or other delivery information, such as delivery area at the delivery destination, which can be a balcony, a porch, front lawn, hands of a human user or on ground somewhere at the delivery destination. The application module 122 may store the received information, and other suitable data to be used for facilitating the delivery of the package in the data storage unit 123. The application module 122 can be configured to determine a delivery route of the drone based on the delivery destination. The application module 122 can be configured to monitor a location of the drone 120 and notify the package delivery module 130 upon reaching the delivery destination or a pickup address, so that the package delivery module 130 can prepare for the drone 120 for picking up or delivering the package 211, e.g., cause the drone 120 to hover at the delivery destination at a particular height from the ground, lower the suspension means to deliver or pick up the package, etc.

A package to be delivered to the user 101 can be attached to the drone 120 using the package delivery module 130. The package delivery module 130 includes a retractable suspension means/member 135, e.g., a cable, to which the package can be attached. The suspension means 135 can be made of any suitable material, e.g., a metal, a metal alloy, microfilament, a filament, a fiber, or a thread. In some embodiments, the suspension means 135 is made of microfilaments in a braided line. In some embodiments, the suspension means 135 is the same as or similar to a fishing cable wire. In some embodiments, the suspension means 135 is made of a material than can be severed by the application of heat, e.g., within a specified duration. One end of the suspension means 135 is attached to the drone 120 at the package delivery module 130, and another end to a locking mechanism 140, also known as a coupling member 140, to which the package can be attached. In some embodiments, the retractable suspension means 135 is wound like a coil onto a spindle in the package delivery module 130 though other configurations are possible. The package is attached to the coupling member 140, which locks the package to the suspension means 135. After the package is affixed to the drone 120, the base station 125 instructs the drone 120 to fly to the delivery destination. Upon reaching the delivery destination, the drone 120 prepares to release the package on a delivery area at the delivery destination. The drone 120 begins to hover in air at the delivery destination at a particular height from the ground, and the package delivery module 130 instructs the suspension means 135 to lower the attached package from the drone 120 onto the delivery area on the ground. After the package rests on the delivery area, the coupling member 140 disengages and releases the package. The package delivery module 130 then retracts the suspension means 135 onto the drone 120.

In some embodiments, the coupling member 140 is gravity activated, that is, engages when a gravitational force exerted on the coupling member 140 due to the weight of the package is beyond a first specified value, and disengages when the gravitational force on the coupling member 140 falls below a second specified value, e.g., when the weight of the package is taken off the coupling member 140. In some embodiments, the coupling member includes failsafe techniques to ensure that the coupling member 140 does not release the package accidentally, e.g., due to a sudden jolt (when a parachute of the drone 120 deploys or a jolt in the wind). Accordingly, the coupling member 140 may be configured to sustain deployment of a parachute. Similarly, in some embodiments, the suspension means is configured to sustain deployment of a parachute. In some embodiments the suspension means, the coupling member and the package delivery module are all configured to sustain a deployment of a parachute. In some embodiments, the coupling member 140 measures whether the gravitational force on the coupling member 140 falls below the second specified value over a period of time. The coupling member 140 can be configured to couple with the package automatically, or passively, which is described in further detail at least with reference to FIGS. 2E-K and FIGS. 19-25.

The drone 120 also includes a severing module 145 to sever the suspension means 135, e.g., to keep the drone 120 from crashing and causing damages in situations such as when the suspension means 135 is grabbed onto and pulled by a person and/or an animal, or if the cable is tangled in an obstacle like a tree. On severing, the suspension means 135 separates from the drone 120 thereby avoiding the drone 120 from being dragged down. In some embodiments, the package delivery module 130 determines whether to sever the suspension means 135 based on an additional load on the suspension means 135. When the suspension means 135 is pulled, there typically will be an increase in load on the suspension means 135. The package delivery module 130 can detect the additional load on the suspension means 135, and if the total load/weight is beyond a specified value, the package delivery module 130 can instruct the severing module 145 to sever the suspension means 135 from the drone 120. In some embodiments, the severing module 145 includes a nichrome cutting element for severing the suspension means 135. For example, a portion of the suspension means 135 can be wound with the nichrome cutting element, and when an electric current of certain rating is passed through the nichrome cutting element, the nichrome cutting element generates significant heat around the wire, thereby severing the suspension means 135. In some embodiments, the suspension means 135 is made of a material that can be severed using heat. In some embodiments, the severing module uses other cutting instruments to sever the suspension means 135, which may or may not use application of heat.

In one arrangement, the severing module 145 comprises one or more of (a) an independent power source, (b) an independent processor, and/or (c) an independent communications system. "Independent" means that the power source, processor and communications system operate independently of any other power sources, processors or communications system located elsewhere on the drone 120. For example, they may be part of a separate circuit. Thus, should the power source, processor and/or communications system of the drone 120 fail, the severing module 145 can still operate despite the failure.

The drone 120 includes a package brake module 150 that locks the package to the drone 120 and keeps the package from being removed by unauthorized personnel in case there is a problem with the drone 120, e.g., a power failure in the drone 120, or with the package delivery module 130, e.g., suspension means 135 is not working.

Note that the drone 120 illustrated in FIG. 1 is not restricted to having the above modules. The drone 120 can include a lesser number of modules, e.g., functionalities of two modules can be combined into one module. The drone 120 can also include more number of modules, e.g., functionalities performed by a single module can be performed by more than one module, or there can be additional modules that perform other functionalities. The functionality performed by a module described above can be performed by one or more of the other modules as well. Further, the drone 120 can include other modules for performing, or the application module 122 can be further configured to perform other functions including: controlling the drone 120 in flight; detecting errors in operation of the drone 120; deploying a parachute to decelerate the descent of the drone 120; providing power supply to the drone 120; steering the drone 120; disabling the motors of the drone 120; navigating the drone 120, including providing route information or adjusting the route information dynamically; navigating the drone 120 using auto-pilot; capturing an image, an audio clip, and/or a video clip of various targets from the drone 120; preventing unauthorized interference with the command and control of the drone 120; and deploying an airbag to minimize a damage that can be caused to the drone 120 in case of a crash.

The drone 120 can be deployed to perform one or more applications, e.g., surveillance of illegal activities to safeguard civil security, anti-poacher operations, forest fire fighting, monitoring flooding storms & hurricanes, traffic monitoring, radiation measurement, searching for missing persons, monitoring harvesting. The application module 122 can be configured to perform a specified user-defined application.

Figure 2E:
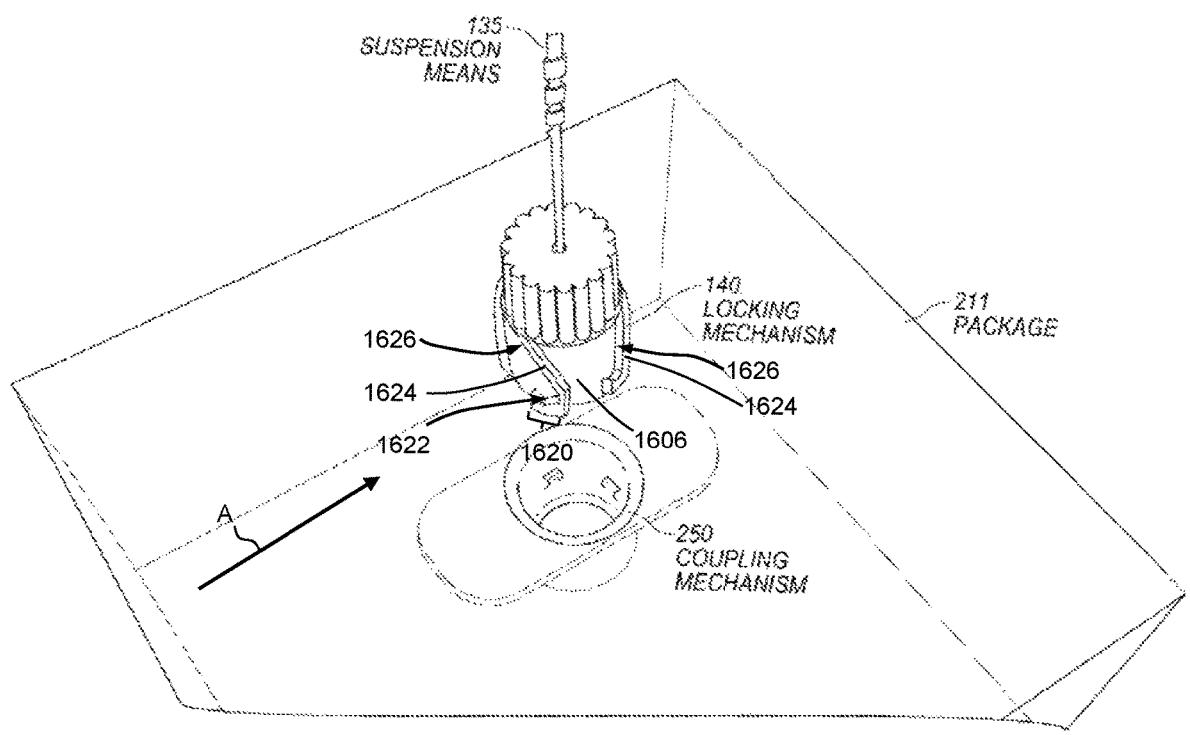
FIG. 2E is a diagram illustrating an example of the coupling member of FIG. 1, consistent with various embodiments.

FIGS. 2A-2E, collectively referred to as FIG. 2, is a diagram illustrating an example 200 of using a gravity activated coupling member in delivering packages using a drone, consistent with various embodiments. The example 200 can be implemented in the system 100 of FIG. 1 and using the drone 120. As illustrated in FIG. 2A, the drone 120 is in flight enroute to a delivery destination to deliver a package 211. The drone 120 is flying at a particular height from the ground 210. The package 211 is attached to the drone 120 via the suspension means 135. The package 211 is locked to the suspension means 135 via the coupling member 140. In some embodiments, the coupling member 140 can be gravity activated. The gravitational force exerted on the coupling member 140 due to the weight of the package 211 engages the coupling member 140 causing the package 211 to be locked to the suspension means 135. In some embodiments, the package 211 includes a coupling counterpart 250 that holds the package 211 onto the coupling member 140 when the coupling member 140 is engaged.

The package 211 is loaded onto the drone 120 such that the package 211 rests in a hood (described below at least with reference to FIGS. 11A, 11B, 13), flush against the top and all four sides of the hood. After the package 211 is raised enough by the suspension means 135, e.g., the package 211 is flush in the hood, a spool brake (e.g., the package brake module 150) is automatically engaged to prevent the suspension means 135 from lowering during the flight and therefore, prevent the package 211 from lowering. The package 211 is now secure, e.g., locked in place and may not rotate or shift due to protection from the package hood, cannot be lowered because of the spool brake, and cannot separate from the suspension means 135 because it cannot unlock itself off of the gravity activated male coupler 140 because it is flush against the top of the package hood.

Figure 13:
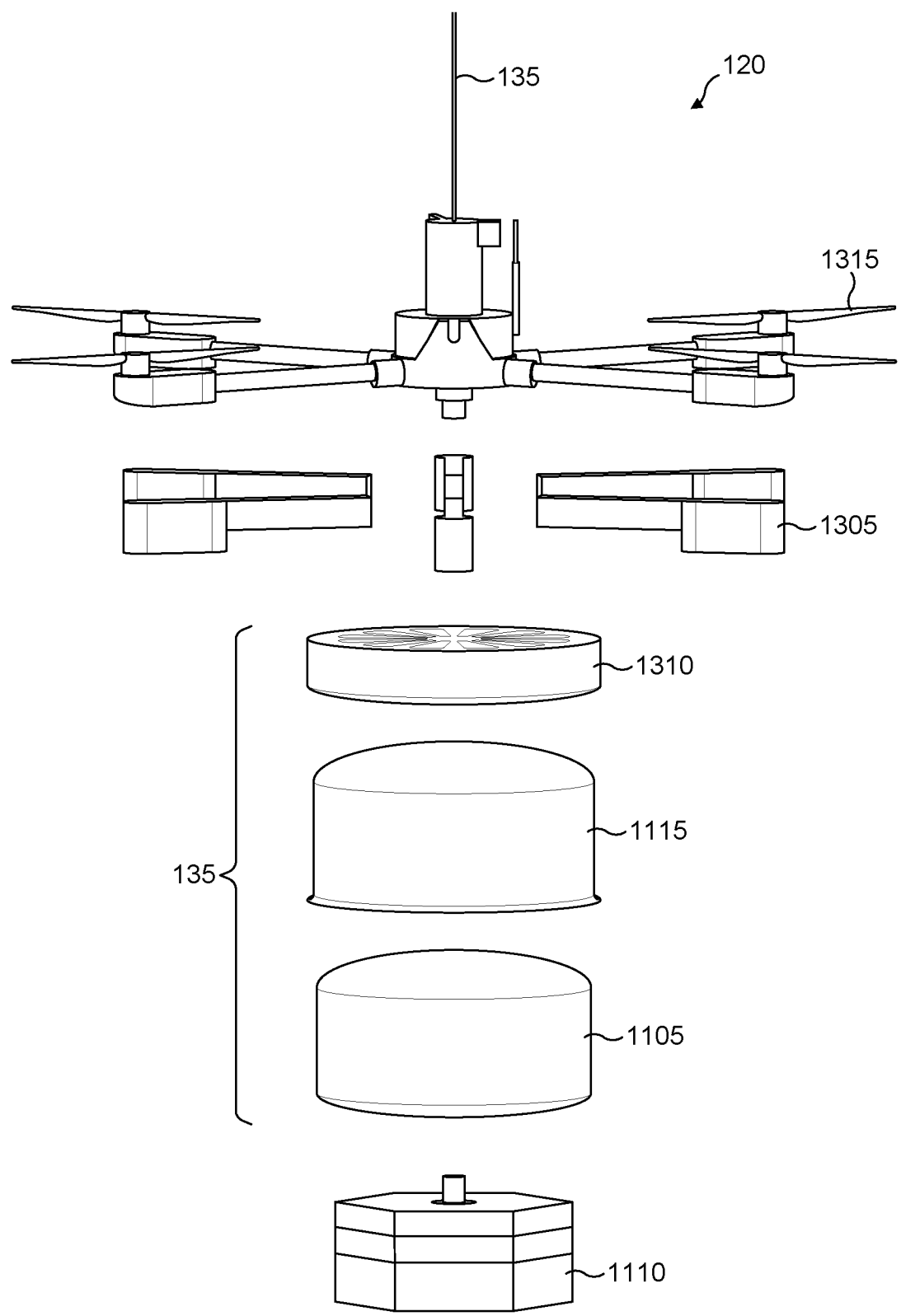
FIG. 13 is a diagram of the drone with various parts of the package delivery mechanism, consistent with various embodiments.
Figure 14:
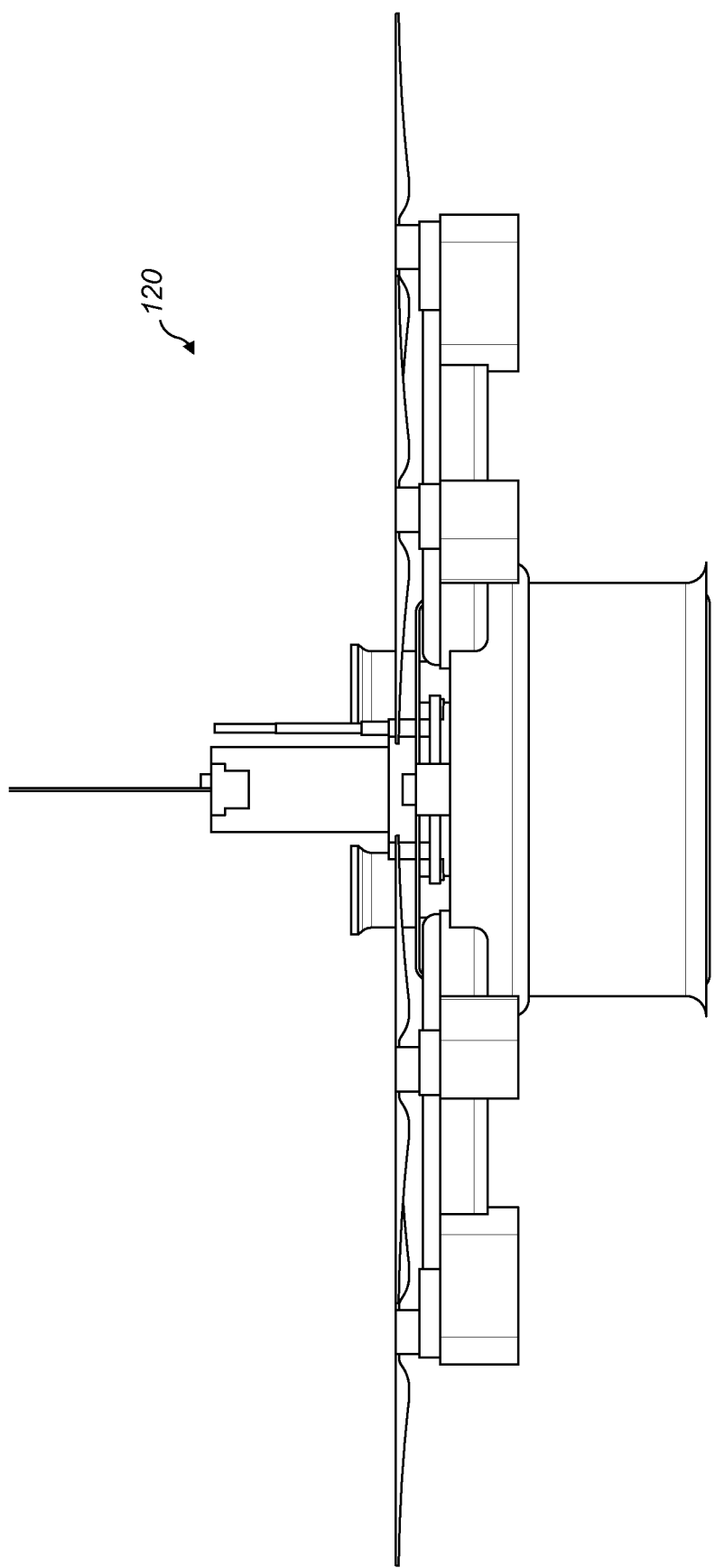
FIG. 14 is a diagram of the drone with the container housing, consistent with various embodiments.
Figure 17A:
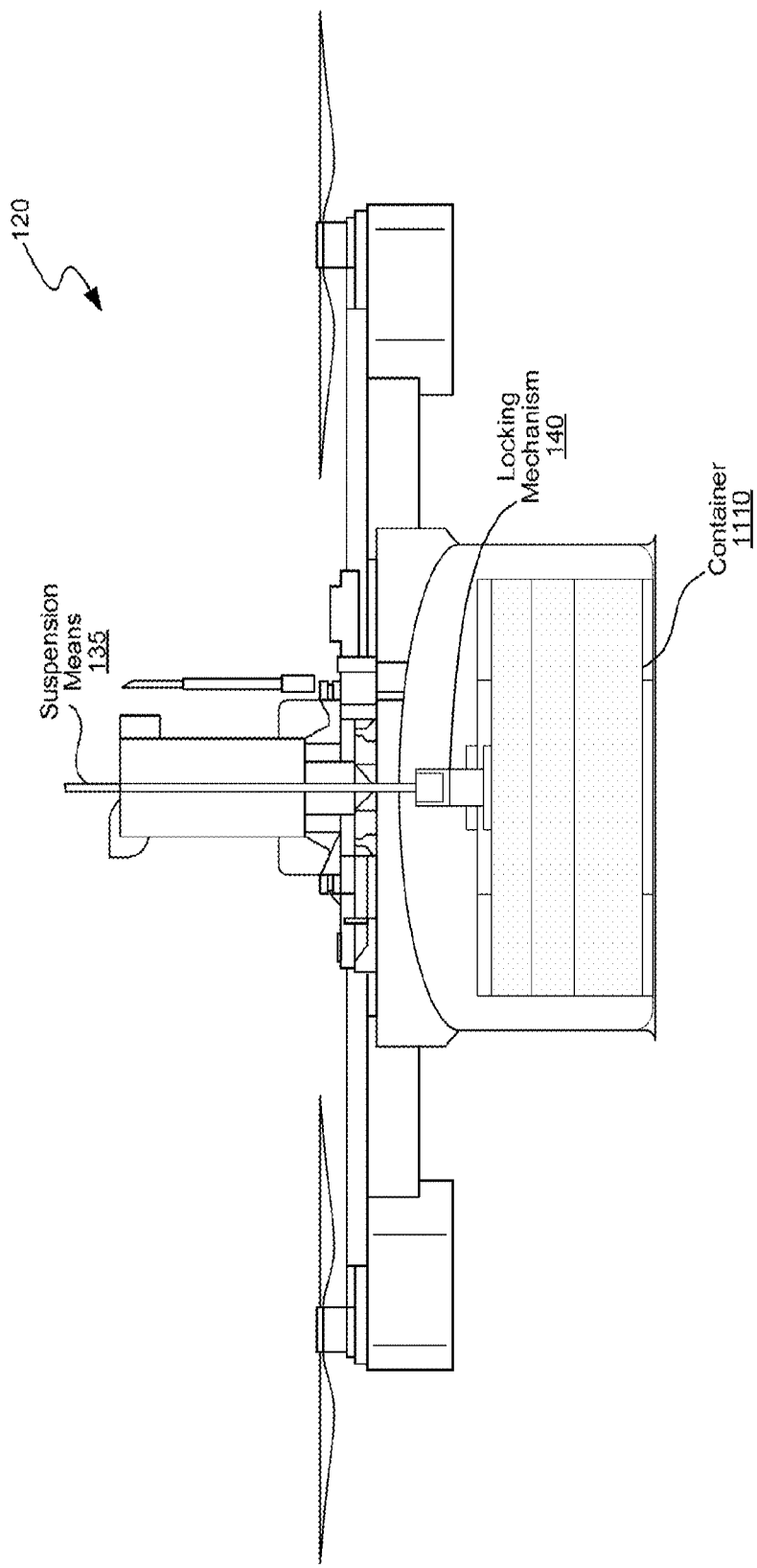
FIG. 17A is a diagram illustrating the drone enroute to deliver the package, consistent with various embodiments.

In some embodiments, the package 211 is loaded in the center of and underneath the airframe of the drone 120 (e.g., as illustrated in FIGS. 13, 14, and 17A below). Such a mounting can improve the natural stability of the payload by lowering the center of gravity temporarily, until the package 211 is delivered.

Upon reaching the delivery destination, the drone 120 prepares to deliver the package 211 at a delivery area 215 in the delivery destination. The delivery area can be any designated area in the delivery destination, e.g., a balcony of a house, a front lawn, a porch, an entrance of a business, a patio table in the front lawn. As illustrated in FIG. 2B, the drone 120 hovers in air above the delivery area 215 at a particular height from the ground, releases the spool brake and lowers the suspension means 135 to deliver the package 211 in the delivery area 215. The drone 120 continues to lower the suspension means 135 until the package 211 rests on the delivery area 215. The coupling member 140 is still engaged while the package 211 is being lowered as the weight of the package 211 keeps the coupling member 140 engaged. In some embodiments, a pilot of the drone 120 has the ability to stop the descent of the package 211 if the safety of the delivery location is compromised.

In some embodiments, one of the factors considered in determining the particular height at which the drone 120 should hover for delivery is a minimum parachute deployment height. The minimum parachute deployment height is the minimum height from the ground at which the drone 120 is required hover if the parachute is to be deployed. If the hovering height of the drone 120 is less than the minimum parachute deployment height then the parachute may not be deployed. This can be dangerous because if the drone 120 crashes and the parachute is not able to be deployed, it can cause an injury to a human being or a property in the surrounding. Accordingly, the particular height at which the drone 120 has to hover for delivering a package is computed as a function of the minimum parachute deployment height. For example, if the minimum parachute deployment height is 4 meters, then the drone 120 is configured to hover and deliver from a height of 4 meters plus height of a person plus margin of error to ensure safety for the recipient on the ground. If the minimum parachute deployment height changes, the minimum delivery height also changes accordingly.

As illustrated in FIG. 2C, when the package 211 rests on the delivery area 215, the coupling member 140 can be disengaged to release the package 211. When the package 211 rests on the delivery area 215, the weight of the package 211 is offloaded from coupling member 140 resulting in the gravitational force exerted on the coupling member 140 to drop below a specified value, which enables the coupling member to be disengaged from the package 211, thereby releasing the package 211.

After the package 211 is lowered in the delivery area 215 and released from the coupling member 140, the drone 120 retracts the suspension means 135, as illustrated in FIG. 2D. For example, the package delivery module 130 senses the reduction of weight on the suspension means 135, determines the package 211 is delivered onto the delivery area 215 and retracts the suspension means 135 back onto the line spool. In some embodiments, if the suspension means 135 becomes entangled, the operator or the package delivery module 130 can command the severing module 145 to cut the suspension means 135 and separate it from the drone 120.

FIG. 2E is a diagram illustrating an example of the locking mechanism, or coupling member of FIG. 1, consistent with a particular example. The coupling member 140 attached to the suspension means 135 can be a male coupler, and the coupling counterpart 250 on the package 211 to which the coupling member 140 engages can be a female coupler, though various other configurations of the coupling member 140 and the coupling counterpart 250 are possible. The suspension means 135 can be a microfilament braided line and can be rated to handle a specified weight, e.g., up to 100 lbs. The coupling member 140 can operate as described with reference to FIGS. 2A-2D. For example, during package loading, the suspension means 135 is lowered to insert the male coupler 140 into the female coupler 250 that is installed in the package 211. The male coupler 140 is rotated clockwise in the female coupler 250, which locks the male and female couplers together. As long as the weight of the package 211 remains on the male coupler 140, the package 211 will remain attached to the male coupler 140 and therefore, to the suspension means 135.

The coupling member 140 can operate in automatic-coupling mode or a passive-coupling mode to lock and/or unlock the package 211. For example, in the automatic-coupling mode, the coupling member 140 automatically couples the male and female couplers, e.g., rotates the male coupler 140 in the female coupler 250 after inserting the male coupler 140 into the female coupler 250, to hold the male and female couplers together in locked position so that when the package 211 is lifted off the surface it's resting on, the package 211 locks onto the suspension means 135, e.g., due to its weight. Similarly, when the package 211 is to be delivered at the delivery area 215, the package delivery module 130 lowers the suspension means 135 to the delivery area 215 and once the package 211 rests on the delivery area 215, the weight of the package 211 will be off the suspension means 135 and the package delivery module 130 automatically disengages the male and female couplers, e.g., rotates the male coupler 140 in a direction opposite to that of the locking, to unlock the male coupler 140 from the female coupler 250 thereby releasing the package 211. The package delivery module 130 then retracts the suspension means 135 onto the drone 120. The coupling member 140 can be caused to engage in various ways. For example, the suspension means 135 can have a mechanism to automatically rotate the male coupler 140, or the package delivery module 130 can have a mechanism to rotate the suspension means 135 to rotate the male coupler 140. In another example, a package loading equipment, e.g., in the loading facility associated with the base station 125 that automatically loads the package 211 to the drone 120 can have a mechanism to rotate the male coupler 140.

In a passive-coupling mode of the coupling member 140, while the package delivery module 130 performs most of the operations performed in the automatic configuration described above, e.g., lowering or retracting the suspension means 135, one or more of the operations may be performed by a human user to lock or unlock the package 211, such as manually rotate the male coupler 140 in the female coupler 250 to lock or unlock the package 211.

Note that the shape, size and any other configuration of the coupling member 140, the male and female couplers (or the drone 120 or any other part of the drone 120) illustrated in FIG. 2E is for illustration purposes only. The actual shape, size and other configurations can be different from what is illustrated in FIG. 2E. In another example, the coupling member 140 can operate using a technique other than gravity.

The coupling counterpart 250 can be affixed to a top wall of a payload container. The coupling counterpart 250 can include a plurality of protruding elements (e.g., four protrusions). The plurality of protruding elements can be evenly spaced around a surface of an opening in the coupling counterpart 250. The plurality of protruding elements can have a cross-section that is, for example, square shaped or circle shaped. A shape of the protruding elements can correspond with a shape of a hook element of the coupling member 140.

Figure 2F:
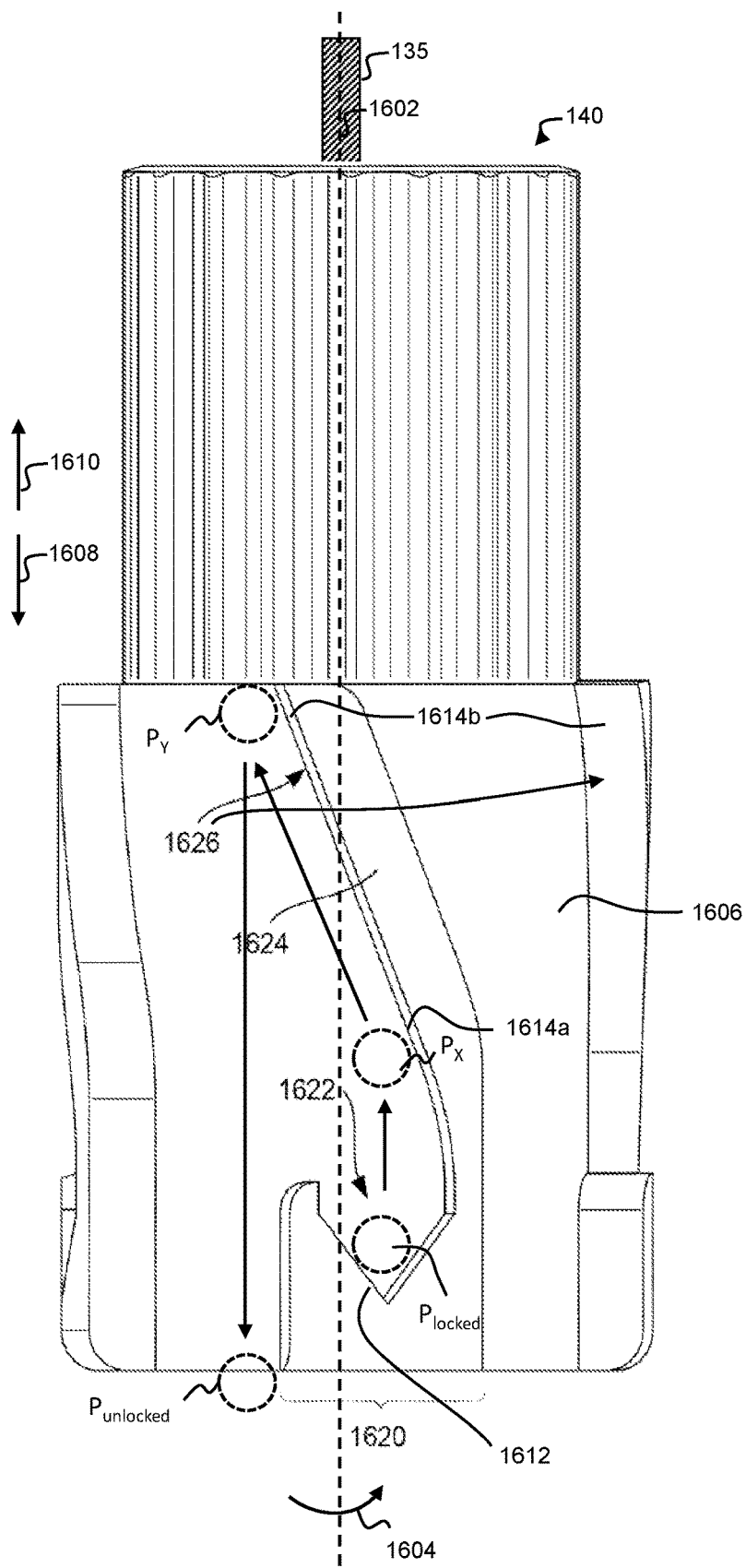
FIG. 2F illustrates a coupling member for a container, according to an embodiment.

FIG. 2F shows a side view on coupling member 140 in the direction of arrow A, shown in FIG. 2E. As shown, coupling member 140 is attached to a suspension means 135. The suspension means 135 can be controlled by a drone to lower and/or raise the coupling member 140. The coupling member 140 includes a plurality of hook elements 1620 (e.g., four hook elements), protruding from surface 1606 of the coupling member 140. An upper portion of any of the hook elements can include a slanted appendage 1624. The slanted appendage 1624 can be affixed to, or protrude from, an outer surface of the coupling member 140. The slanted appendage 1624 can include an underside 1626 sloped toward a hooked portion 1622 of the hook element 1620. The underside 1626 of the slanted appendage 1624 can be connected to the hooked portion 1622 such that a continuous surface extends from the underside 1626 to the hooked portion 1622. The underside 1626 can be slanted upward extending from a first side of the hooked portion 1622 to a second side of the hooked portion 1622.

In this embodiment, a top terminal end of the underside 1626 extends beyond a second side of the hooked portion 1622 or is in line with the second side of the hooked portion 1622. If the coupling member 140 is inserted into a coupling counterpart 250, protruding elements of the coupling counterpart 250 can glide along the underside 1626 causing the coupling member 140 to rotate out into an out-of-alignment position. An out-of-alignment position includes the protruding element not being above the hooked portion 1622.

Since the underside 1626 causes the protruding elements to be shifted out of alignment with the hooked portion 1622 if the coupling member 140 is inserted a threshold distance into the coupling counterpart 250, the threshold distance can be utilized to unlock the coupling member 140 from the coupling counterpart 250. For example, a drone having a cable connected to the coupling member 140 can allow slack to develop in the cable causing the coupling member 140 to enter the coupling counterpart 250 beyond a threshold distance causing the out-of-alignment position. Since the hooks are not in position to attach the protruding elements in the out-of-alignment position, the drone can then retract the cable and bring the coupling member 140 up to the drone while leaving the coupling counterpart 250 with the container.

Figure 2G:
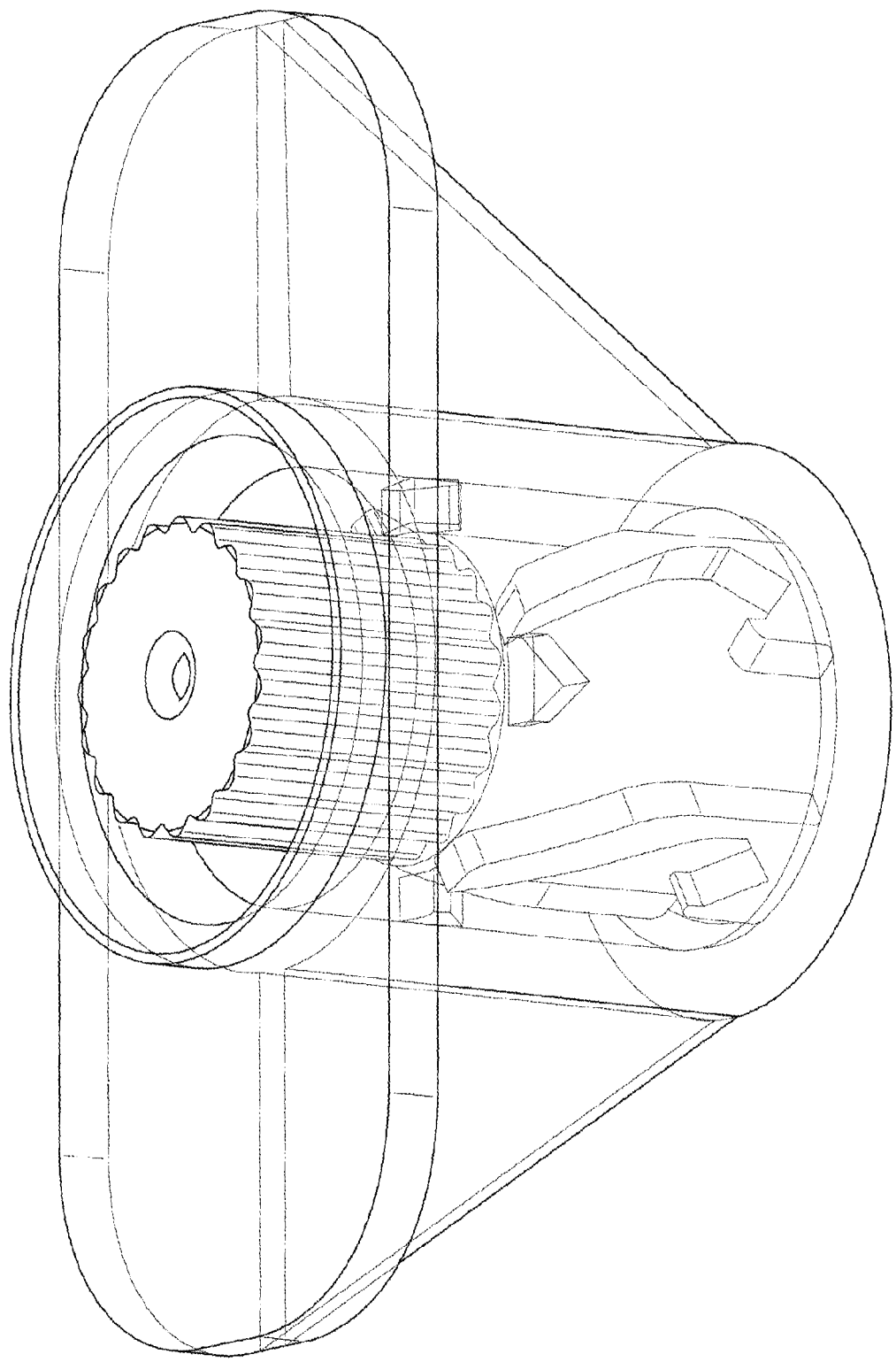
FIG. 2G illustrates a coupling member inserted into a coupling counterpart, according to an embodiment.
Figure 2H:
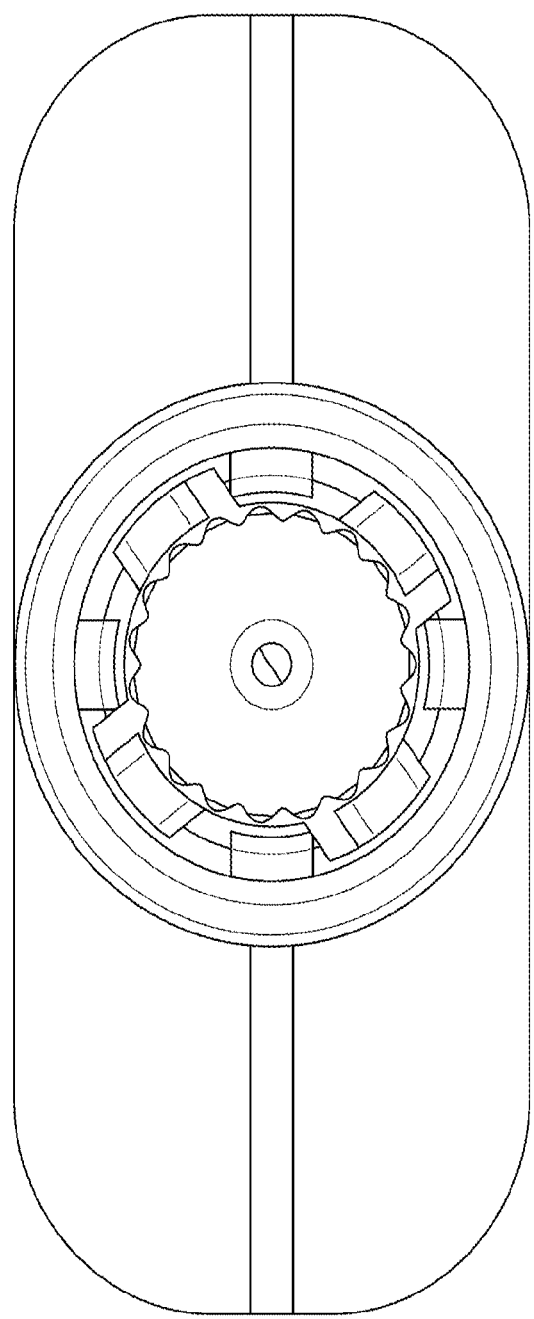
FIG. 2H illustrates a top down view of a coupling member, according to an embodiment.
Figure 2I:
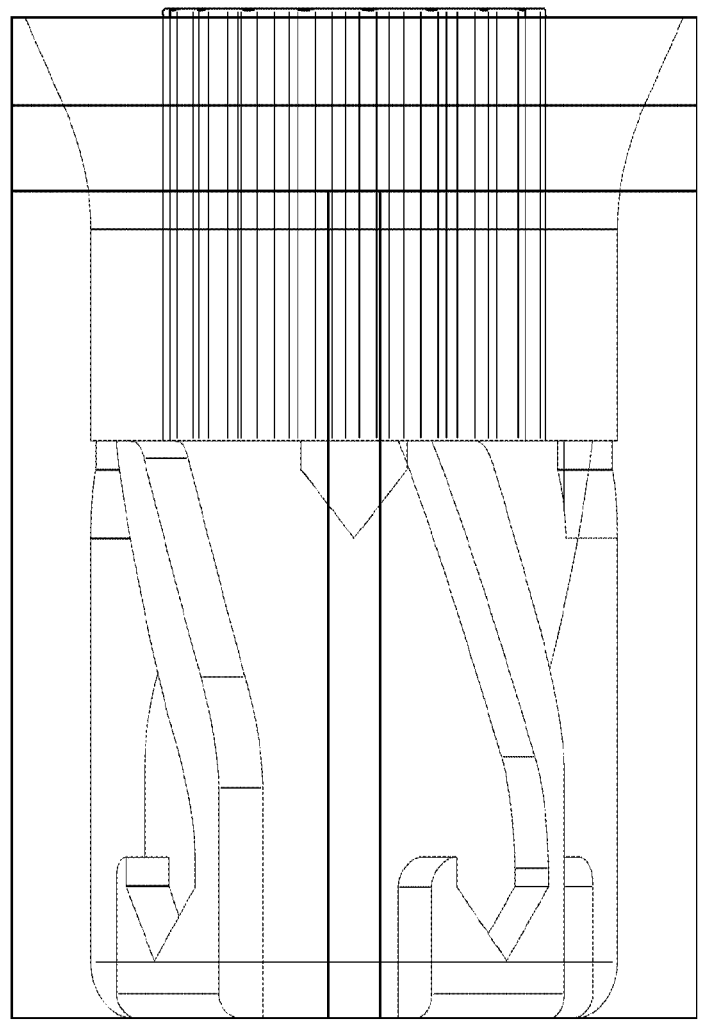
FIG. 2I illustrates a side view of a coupling member, according to an embodiment.
Figure 2J:
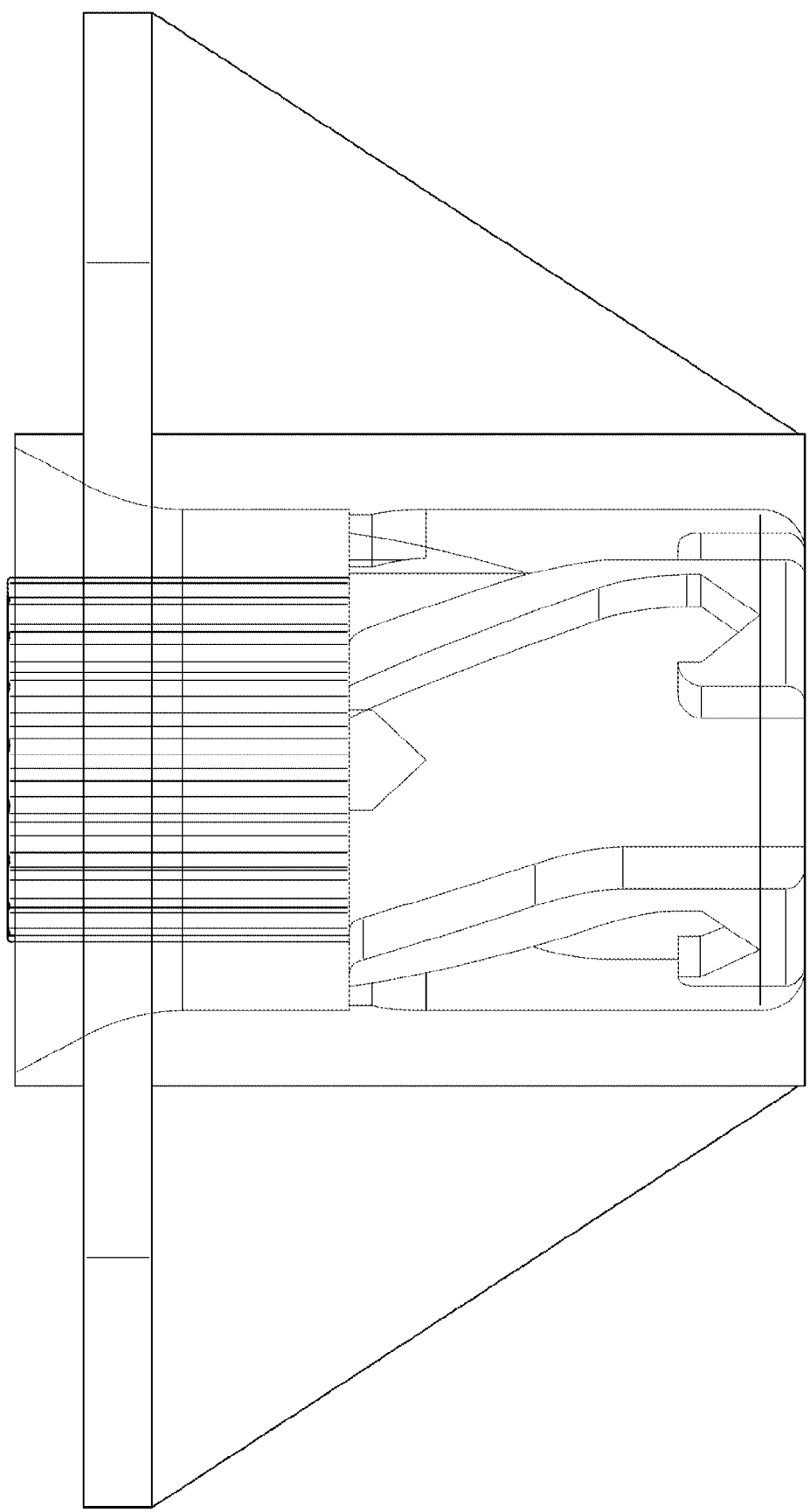
FIG. 2J illustrates a side view of a coupling member inserted into a coupling counterpart, according to an embodiment.

FIGS. 2G-2J illustrate the coupling member 140 inserted into the coupling counterpart 250 from various perspectives. FIG. 2G shows an orthogonal view of the coupling member 140 inserted into the coupling counterpart 250. FIG. 2H is a top down view of the inserting member 142 inserted into the receiving member 144. FIG. 2I is a side view of the coupling member 140 inserted into the coupling counterpart 250. A side of the coupling counterpart 250 is shown as substantially transparent to show a position of the coupling member 140 within an opening of the coupling counterpart 250. Various embodiments including opaque sides for the coupling member 140 are contemplated.

Returning to FIG. 2F, a method of engaging the example coupling member 140 with a coupling counterpart 250 (shown in FIG. 2E) will be described in more detail. The example coupling member 140 defines first 1608 and second 1610 longitudinal directions, opposite to one another and parallel to a longitudinal axis 1602, and an azimuthal direction 1604 around the longitudinal axis 1602. The coupling member 140 comprises one or more guide paths which are configured to guide a corresponding protrusion of the coupling counterpart 250 from a locked position $P_{locked}$ to an unlocked position $P_{unlocked}$. As the coupling member 140 suspends from the suspension member 135, the coupling member 140 is free to rotate in the azimuthal direction 1604 and in a direction opposite to the azimuthal direction 1604. The coupling member 140 can also move along the longitudinal axis 1602 in both the first and second longitudinal directions 1608, 1610 by raising and lowering the coupling member 140 by retracting and unravelling the suspension member 135, as previously described.

As noted above, the example coupling member 140 comprises a surface 1606, in this case an outer surface, which, by virtue of the hook elements 1620, defines one or more guide paths which extend along the surface 1606. A guide path guides a protrusion of the coupling counterpart 250 from a locked position $P_{locked}$ within the guide path to an unlocked position $P_{unlocked}$ outside of the guide path. As described above, the protrusion may be manually moved into the locked position by a human operator, or by a mechanism on the drone 120 or suspension member 135 applying a rotational force which causes the coupling member 140 to rotate. When the protrusion is in the locked position $P_{locked}$, the coupling member 140 and the coupling counterpart 250 are said to be engaged and locked together because the package (and therefore the coupling counterpart 205) and the coupling member 140 cannot be pulled apart in opposite directions along the longitudinal axis 1602. When the package is suspended from the coupling member 140, the protrusion is in the locked position $P_{locked}$.

The protrusion can be guided along the guide path (in the direction of the arrows) by moving the coupling member 140 relative to the stationary protrusion. For example, the coupling member 1904 can be moved in the first longitudinal direction 1608 when the package is deposited on a delivery surface.

As noted above, the guide path can be formed by one or more structures protruding outwards from the surface 1606 in an outwards radial direction. In another example, the guide path can be formed by forming a groove within the surface 1606, where the groove extends into the surface in an inwards radial direction. In a particular example, the coupling member 140 may be formed from a relatively rigid material such as a metal or plastic.

The protrusion, at position $P_{locked}$, is shown initially being within a guide path. The guide path comprises an engagement surface comprising a first part 1612. The first part 1612 is configured to abut the protrusion in the locked position $P_{locked}$. The drone 120 may be hovering at a particular height above a delivery surface at this moment in time and can begin lowering the package by allowing, or causing, the suspension member 135 to unravel. The coupling member 140 therefore moves in the first longitudinal direction 1608 towards the delivery surface. As the package engages the delivery surface, the coupling counterpart 250 and the protrusion become stationary relative to the coupling member 140 which continues to move in the first longitudinal direction 1608. This relative movement causes the position of the protrusion to move relative to the coupling member 140 until it engages an egress surface along a second part 1614*a*. The second part 1614*a* receives the protrusion from the first part 1612. The second part 1614*a* is spaced from the first part 1612 along the longitudinal axis 1602 and has substantially the same azimuthal position as the first part 1612. At position $P_X$ the protrusion has engaged the second part 1614*a*. This second part 1614*a* is inclined and extends from a third part 1614*b* of the egress surface in the first longitudinal direction 1608 and in the azimuthal direction 1604. As the coupling member 140 continues to move in the first longitudinal direction 1608 the engagement between the protrusion and the inclined surface of the second part 1614*a* causes the coupling member 140 to rotate in the azimuthal direction 1604. The weight of the coupling member 140, and the relatively low coefficient of friction between the protrusion and the inclined surface allows the coupling member 140 to rotate in this manner. The rotation and the movement in the first longitudinal direction 1608 continues until the third part 1614*b* engages the protrusion at point $P_Y$. The third part 1614*b* therefore receives the protrusion from the second part 1614*a* in an out of alignment position.

From here the drone 120 can retract the suspension member 135 to cause the coupling member 140 to move in the second longitudinal direction 1610. The third part 1614*b* releases the protrusion to the unlocked position $P_{unlocked}$ when the coupling member 140 is moved away from the coupling counterpart 250. At this point, the coupling member 140 has fully uncoupled from the coupling counterpart 250, so the package remains on the delivery surface as the drone 120 continues to retract the suspension member 135.

In the above example, the engagement surface 1612 and the egress surface of the guide path are defined by the hook element 1620, where the hook element 1620 protrudes from the surface 1606 of the coupling member 140. As mentioned, the hook element 1620 comprises a slanted appendage 1624, and the underside 1626 of the slanted appendage defines the egress surface 1614 of the guide path. The hook element 1620 further comprises a hooked portion 1622 which defines the engagement surface 1612. In this example the hooked portion 1622 is connected to the underside 1626 of the slanted appendage 1624. A top terminal end of the underside 1626 of the slanted appendage 1624 defines the third part 1614b of the egress surface 1614.

As mentioned, the coupling member 140 described in FIGS. 2E-2J requires the coupling member 140 or the suspension means 135 to be rotated to enable the coupling member 140 to engage with the package, while uncoupling of the coupling member 140 is gravity assisted. FIGS. 19 to 25, described in detail below, disclose another coupling member for which gravity assists both the coupling and uncoupling of the coupling member.

Figure 3B:
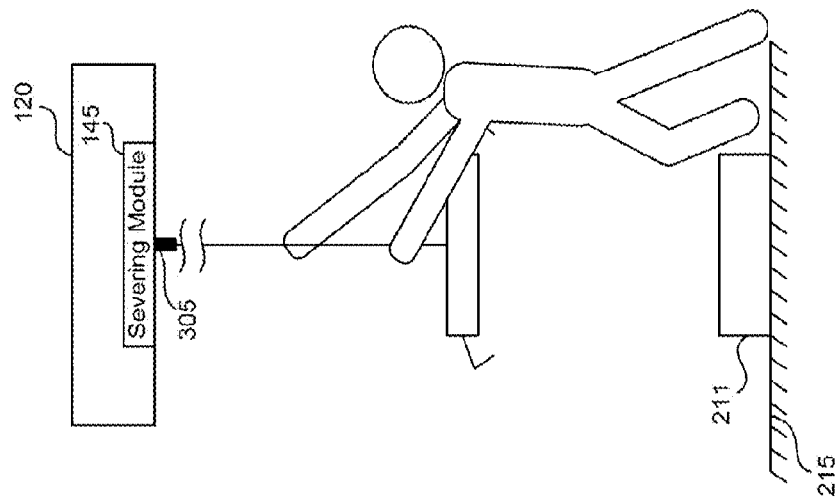
FIG. 3B is a diagram of an example for severing the suspension means of the drone, consistent with various embodiments.
Figure 3A:
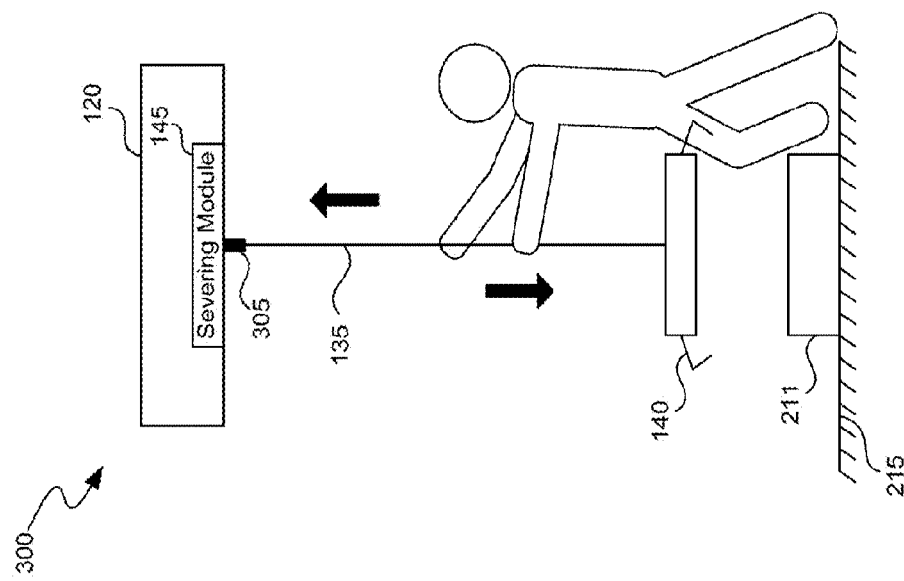
FIG. 3A is a diagram of an example for severing the suspension means of the drone, consistent with various embodiments.

FIGS. 3A and 3B, collectively, referred to as FIG. 3, is a schematic diagram of an example 300 for severing suspension means of a drone, consistent with various embodiments. As illustrated in FIG. 3A, after the package 211 is released at the delivery area 215, the drone 120 retracts the suspension means 135. When the suspension means 135 is pulled, e.g., when pulled by an animal or a person, such as a person 310, or when stuck in other objects, such as a tree, either when the suspension means 135 is being retracted or being lowered to deliver the package 211, the drone 120 can be dragged to the ground and crash, injure the person 310 and/or damage the property around the drone 120. Further, the drone 120 can be damaged or stolen.

When the suspension means 135 is pulled, the severing module 145 detects an additional load on the suspension means 135 and if the load is beyond a specified value, the severing module 145 severs the suspension means 135, as illustrated in FIG. 3B. In some embodiments, the severing module 145 includes a nichrome cutting element 305 that is used to sever the suspension means 135. The suspension means 135 can pass through a nichrome cutting element 305, shown in FIG. 4, and when the suspension means 135 is to be severed, the severing module passes an electric current of a certain rating through the nichrome cutting element 305, which generates a significant amount of heat causing the suspension means 135 to be severed at the portion where the nichrome cutting element 305 is in contact with the suspension means 135. Severing the suspension means 135 when the suspension means 135 is pulled or when the suspension means 135 is entangled in an obstacle will keep the drone 120 from crashing, being stolen, and/or causing damage to any person, animal or property in the surroundings.

Figure 4:
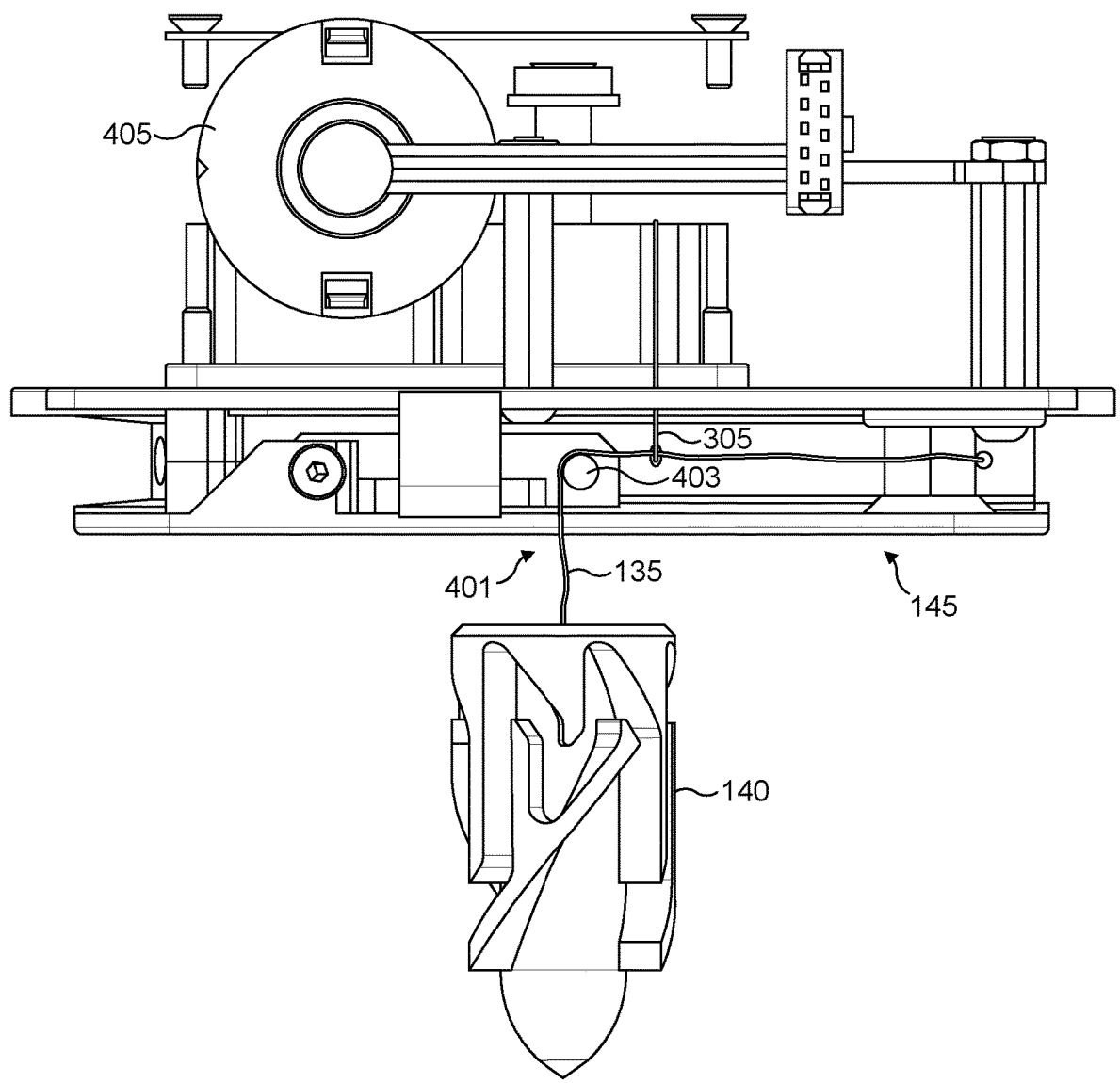
FIG. 4 is a schematic diagram showing a side view of the suspension means according to an embodiment.
Figure 5:
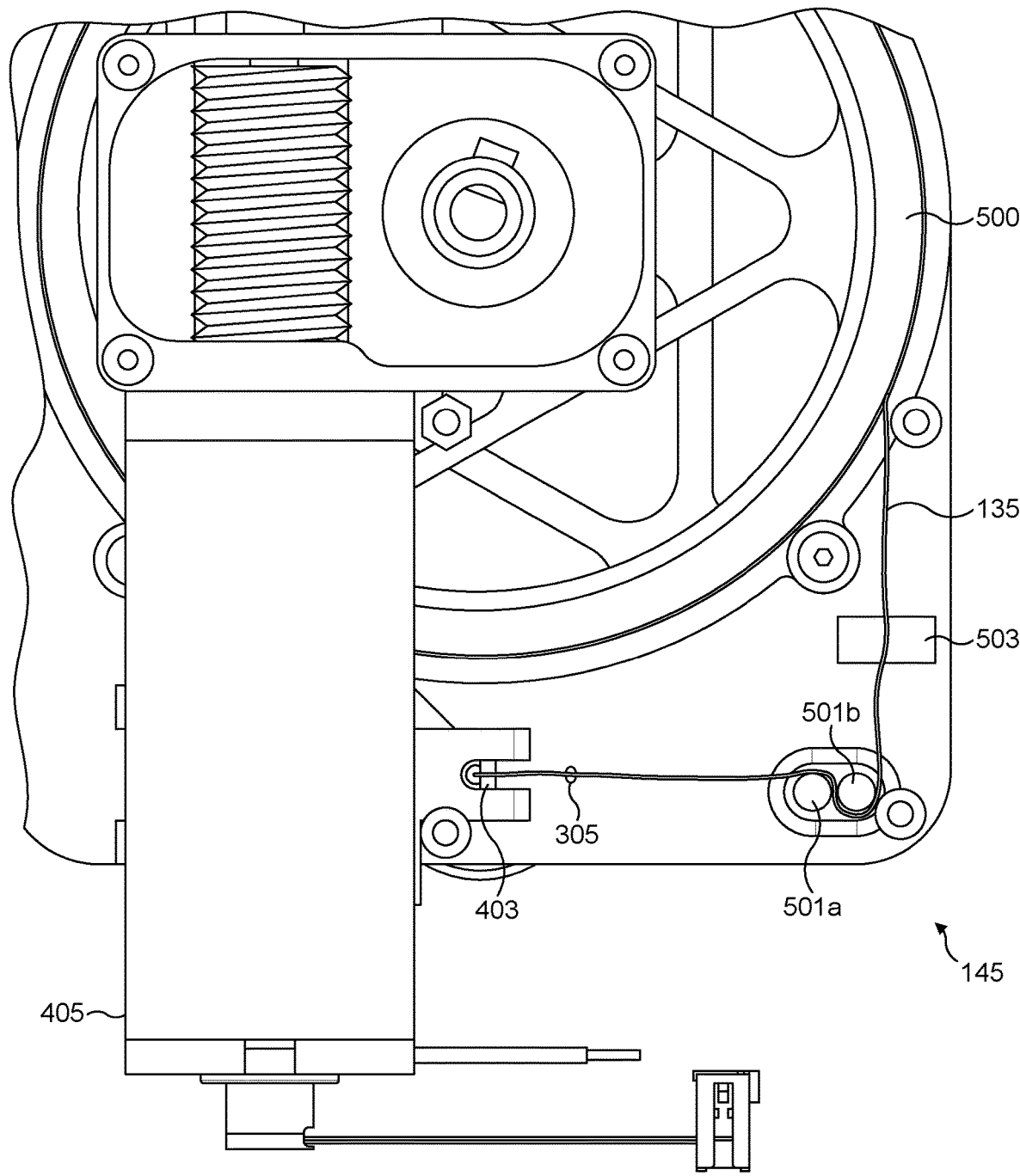
FIG. 5 is a schematic diagram showing a top view of the suspension means according to an embodiment.

Referring still to FIG. 4, and also to FIG. 5, in one arrangement the suspension means 135 can be spooled around spindle 500 of the delivery mechanism 130 by threading a free end of a new line through a bottom hole 401 of the delivery mechanism 130, around a force sensor lever rod 403, through the nichrome cutting element 305, through tensioning rods 501a, 501b, and through a line spacer 503. As depicted, the spindle 500 and associated motor 405 is an example of a means by which the suspension means 135 is lowered from the drone 120 or retracted into the drone 120. As noted above, the spindle 500, motor 405 and nichrome cutting element 305 are preferably powered and controlled separately from other elements of the drone 120.

Figure 6:
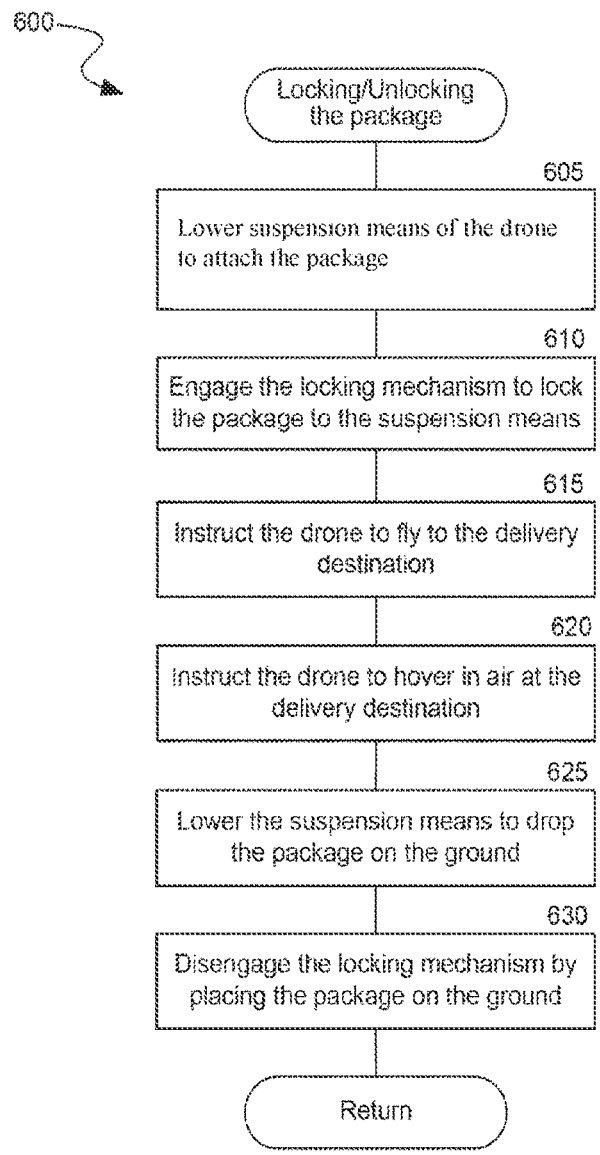
FIG. 6 is a flow diagram of a process for locking the package to and unlocking the package from the suspension means of the drone using a coupling member, consistent with various embodiments.

FIG. 6 is a flow diagram a process 600 for locking and unlocking the package attached to the suspension means of the drone using a coupling member, consistent with various embodiments. The process 600 can be performed in the system 100 and using the drone 120 of FIG. 1. In some embodiments, the process of locking the package is performed when the package is picked up, and the process of unlocking is performed when the package is dropped off. At block 605, the package delivery module 130 of the drone 120 lowers the suspension means 135 to pick-up a package, such as package 211, from a pick-up address or from the loading facility of the base station 125. In some embodiments, the package delivery module 130 lowers the suspension means until the coupling member 140 is in a position to be attached or coupled to the package 211. For example, the package delivery module 130 lowers the suspension means 135 until the male coupler 140 of the suspension means 135 is inserted into the female coupler 250 of the package 211. The package delivery module 130 can determine whether the coupling member 140 is in a position to be attached to the package 211 in various ways. For example, when the male coupler 140 is inserted into and rests in the female coupler 250, the weight of the male coupler 140 is off the suspension means 135 and the package delivery module 130 can determine that male coupler 140 is in position to be attached to the female coupler 250. In another example, the package delivery module 130 can determine the distance between the drone 120 and the package 211, e.g., using various on-board sensors, and lower the suspension means 135 based on the determined distance. In yet another example, the lowering of the suspension means 135 can be controlled by an operator of the drone 120.

At block 610, the coupling member 140 is engaged with the package 211 to lock the package 211 to the suspension means 135. The coupling member 140 can be operated, e.g., engaged and disengaged, in an automatic-coupling mode or a passive-coupling mode to lock or unlock the package, e.g., as described at least with reference to FIGS. 2E-J. Once the coupling member 140 is attached to the package 211 and the drone 120 is airborne, the coupling member 140 continues to be engaged, e.g., due the weight of the package 211 on the coupling member 140 exerted by the gravitational force, causing the package 211 to be locked to the suspension means 135. In some embodiments, the coupling member 140 is configured to engage only if the weight of the package 211 is exceeds a first specified value.

At block 615, the drone 120 flies to the delivery destination where the package has to be delivered.

At block 620, upon reaching the delivery destination, the application module 122 instructs the drone 120 to hover at the delivery destination at a particular height from the ground and instructs the package delivery module 130 to prepare for delivering the package 211.

At block 625, the package delivery module 130 lowers the suspension means 135 to deliver the package at a delivery area in the delivery destination, e.g., delivery area 215. The package delivery module 130 continues to lower the suspension means 135 until the package 211 rests on the delivery area 215. The coupling member 140 is still engaged while the package 211 is being lowered as the weight of the package 211 keeps the coupling member 140 engaged.

At block 630, when the package 211 rests on the delivery area 215, the weight of the package 211 is offloaded from the coupling member 140. When the weight is offloaded, and the weight on the coupling member 140 drops below a second specified value enabling the coupling member 140 to be disengaged, thereby releasing the package 211.

In some embodiments, the speed at which the suspension means 135 is lowered from the drone 120 or retracted into the drone 120, e.g., in blocks 605 and/or 625, can be regulated. For example, the rate of descent of the suspension means 135 is decelerated as the package 211 reaches the ground or the surface on which the package 211 is to be delivered, e.g., in order to avoid any damage to the package 211 from the impact of the delivery. In another example, the speed at which the suspension means 135 is retracted into the drone is decreased as the package 211 or the coupling member 140 reaches the drone 120, e.g., in order to avoid the package 211 or the coupling member 140 (when there is no package attached to the suspension means 135) from being retracted too forcefully into the drone 120 and harm the spool of the suspension means 135.

Figure 7:
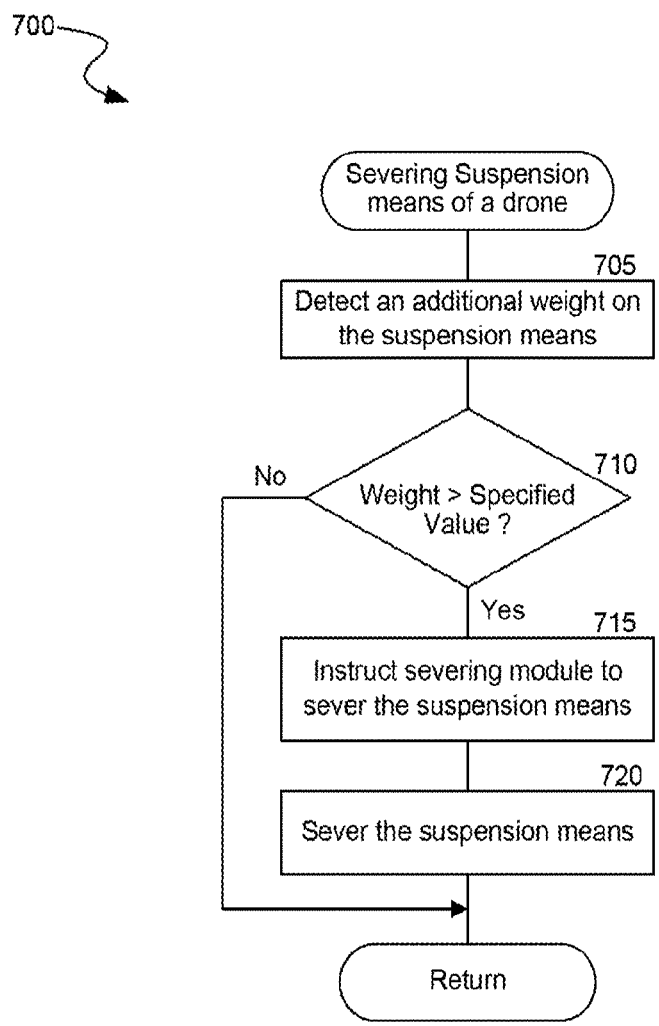
FIG. 7 is a flow diagram of a process for severing the suspension means of the drone, consistent with various embodiments.

FIG. 7 is a flow diagram of a process for severing the suspension means of a drone, consistent with various embodiments. The process 700 can be performed in the system 100 and using the drone 120 of FIG. 1. At block 705, the package delivery module 130 detects an additional weight on the suspension means 135. In some embodiments, the drone 120 has on-board sensors that can detect a change in load carried by the suspension means 135. For example, when the suspension means 135 is pulled by an animal or a person, or when the suspension means 135 is entangled in an obstacle like a tree, there can be an additional load added to the suspension means 135.

At determination block 710, the package delivery module 130 determines whether the changed weight exceeds a specified value. If the weight does not exceed the specified value, the process 700 returns. On the other hand, if the weight exceeds the specified value, at block 715, the package delivery module 130 instructs the severing module 145 to sever the suspension means 135.

At block 720, the severing module 145 severs the suspension means 135. In some embodiments, the severing module 145 includes a nichrome cutting element 305 that is used to sever the suspension means 135. When the suspension means 135 has to be severed, the severing module 145 passes an electric current of a certain rating through the nichrome cutting element 305, which generates a significant amount of heat causing the suspension means 135 to be severed at the portion where the nichrome cutting element 305 is in contact with the suspension means 135.

In determining whether the weight exceeds the specified value, the package delivery module 130 considers various factors, e.g., weight of the package if the package is still attached to the suspension means 135, change in weight because of the haphazard movement of the suspension means 135 due to strong winds, etc. The package delivery module 130 will calculate the change in weight accordingly.

It should be understood that one or more operations of the processes 600-700 can be performed manually, e.g., remotely by an operator of the drone 120 from the base station 125, or automatically by the drone 120. For example, when the drone 120 reaches the delivery area 215 at the delivery destination, the package delivery module 130 can automatically deliver the package 211 or wait to receive instructions from the operator of the drone 120. In another example, the severing module 145 can sever the suspension means 135 automatically or wait for the operator to command the severing module 145 to sever the suspension means 135.

Figure 8:
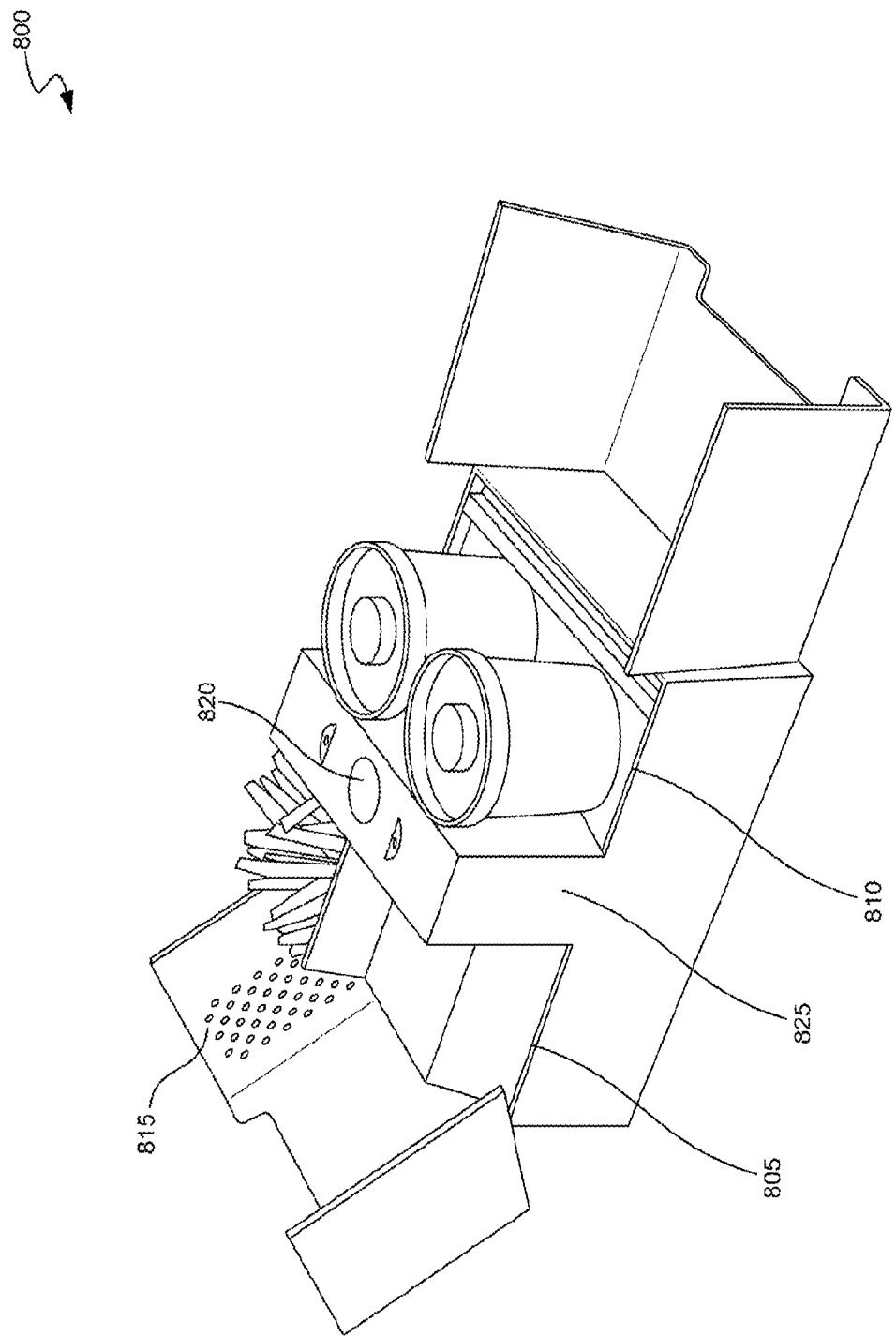
FIG. 8 is a diagram of a container for delivering food, consistent with various embodiments.

FIG. 8 is a diagram of a container 800 for delivering food, consistent with various embodiments. The drone 120 can be used to deliver and/or pickup goods in a wide variety of containers. In some embodiments, the container 800 is similar to the package 211 of FIG. 2. The container 800 can include multiple compartments for holding different types of payload and/or different types of payload that are temperature sensitive, e.g., food, medicine, blood. For example, the container 800 can have a first compartment for holding a first type of payload that is to be maintained in a first specified temperature range, and a second compartment for holding a second type of payload that is to be maintained in a second specified temperature range. As an example, the container 800 includes various compartments for carrying various types of food, e.g., liquid food, solid food, hot food and/or cold food. In some embodiments, the container 800 can have separate sections for different types of food. The container 800 includes a hot food compartment 805 and a cold food compartment 810. In some embodiments, the hot food and cold food compartments are separated by a wall 825, which can have an insulated material. The container 800 includes ventilation 815 to keep hot food, such as chips, crisp. The container 800 can be connected to the suspension means 135 of the drone 120 at a coupler 820. In some embodiments, the coupler 820 is similar to the female coupler 250 of FIG. 2. The coupler 820 is offset to a compartment that carries heavier food, e.g., drinks, to ensure the weight is centered when heavier items are included. The entire container 800 is delivered to the customer.

The container 800 can be made of paper, cardboard or other suitable materials. In one example the container includes temperature insulating material, such as polystyrene, Mylar™ or other materials. The container may be fully or partially constructed from such temperature insulating materials. The insulating material helps keep the contents of container within a desired temperature range. Mylar™ is particularly useful since it helps achieve food quality requirements. The container 800 can have one or more lids which, when opened, provide access to the contents inside. In some embodiments, the lids open away from each other so that any area/compartment in the container 800 can be accessed conveniently. In one example, the container comprises impact mitigating material, such as a deformable material. The impact mitigating material significantly improves safety in the event that the container is accidentally dropped from the drone 120.

Figure 9A:
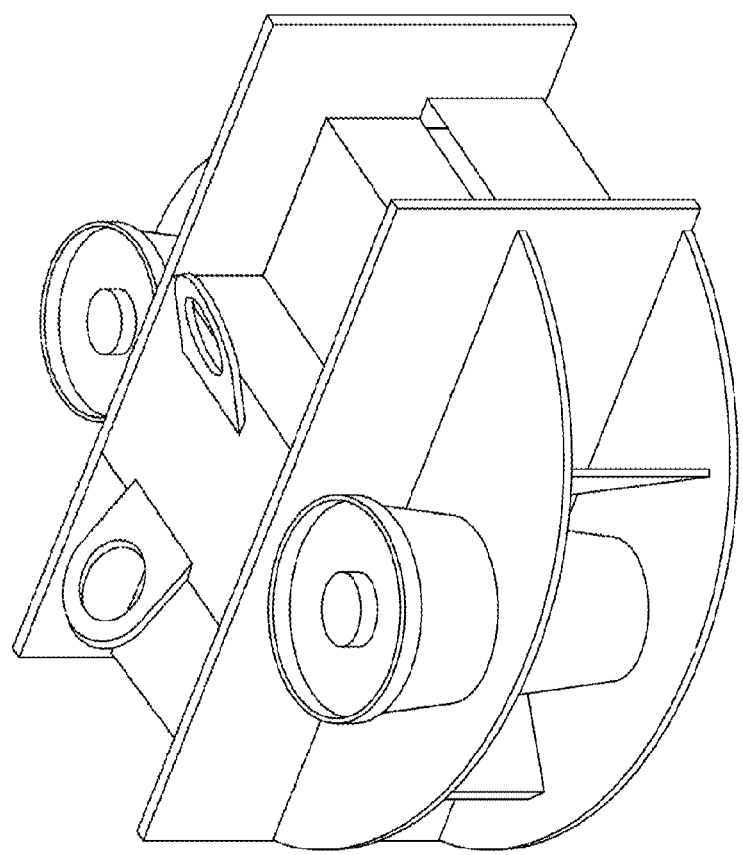
FIGS. 9A and 9B, collectively referred to as FIG. 9, is a diagram of a container, consistent with various embodiments.
Figure 9B:
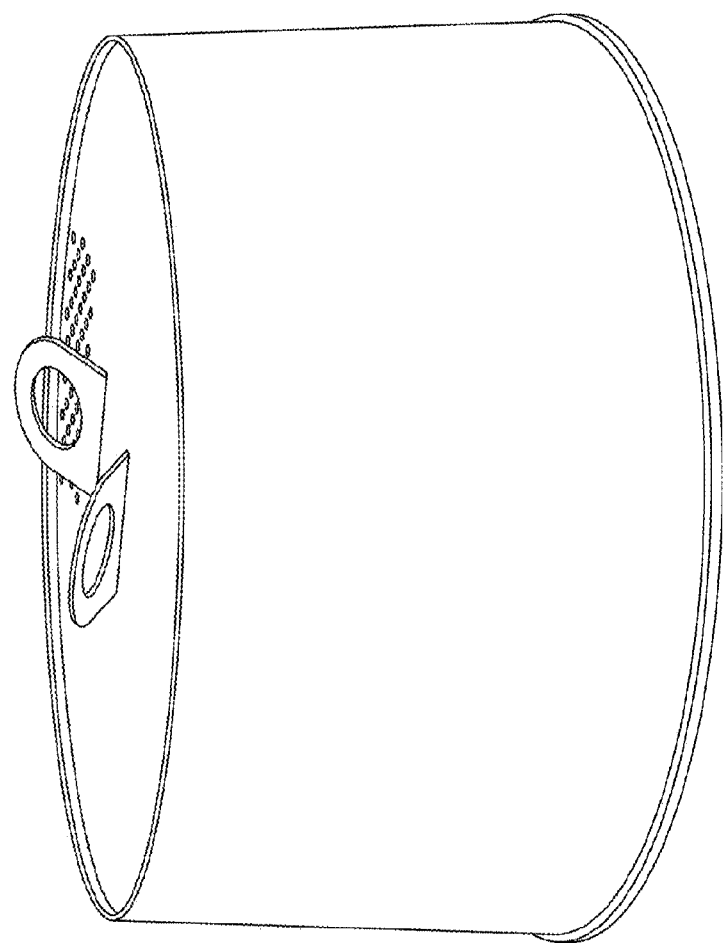

FIGS. 9A and 9B, collectively referred to as FIG. 9, is a diagram of a container 900, consistent with various embodiments. The container 900 can be round or round-like, e.g., elliptical, conical, in shape. In some embodiments, the shape of the container 900 can be representative of a bucket. The container 900 has a removable lid 950, which can be cylindrical, as illustrated in FIG. 9B. The container 900, like the container 800 of FIG. 8, can include various compartments for carrying various types of food, e.g., liquid food, solid food, hot food and/or cold food. The compartments can be designed such that when a set of food items are placed, the container 900 is well balanced, e.g., weight is centered. For example, as illustrated in FIG. 9A, the two compartments for holding liquids, e.g., drinks, are located diametrically opposite to each other in the container 900 so as to center the weight. The container 900 can also include a compartment for carrying various types of cutlery.

The container 900 can have means for facilitating a customer to hold or carry the container. For example, the container 900 includes a pair of finger grips into which the customer can slip in his/her fingers and carry the container 900. The finger grips can be affixed to the container 900, or the lid 950 of the container 900 if the lid 950 of the container 900 can be locked/secured to the container 900.

In some embodiments, the container 900 is modular, e.g., can be made using a number of card plates, e.g., made out of cardboard, paper and/or other suitable material. The card plates (not illustrated) can have fold lines, slotted lines and/or slots along which one can fold the card plates to form the container 900 or a portion thereof. The card plates can then be assembled together to form the container 900. In some embodiments, the modular container portions are adjustable to carry payload of different sizes in different compartments, e.g., pizza in one compartment and medicine in another compartment.

The container 900 (or even the container 800) can be configured to pick up and/or deliver items other than food, e.g., goods such as electronics, apparel, shoes. The container 900 can be configured to have various types of compartments based on the type of the goods that have to be picked up/delivered. In some embodiments, the container 900 has foam or other similar material in the base, as illustrated in the example 1010 of FIG. 10A. The foam-based base can serve various purposes. For example, the foam-based base can hold the packages placed in the container 900 in a stable position by minimizing the movement of the package during the flight. In another example, the foam-based base can act an impact-absorbing base by provide additional cushion between a soft outer layer of cardboard of the base of the container 900 and a potentially hard inner object such as a bottle of wine which makes it safer if the container 900 falls off the drone 120 and hits a person or property. The foam base enables delivering of a variety of shaped objects whether rectangular, triangular, elliptical, etc. (provided they can fit in the container 900, and be held in position by the foam-based base). For example, if a box containing a pair of shoes is to be delivered, the box would be placed inside the container 900, it would be held in position by foam, and then the container 900 holding the box could be picked up to the drone 120; then delivered at the destination.

Figure 10B:
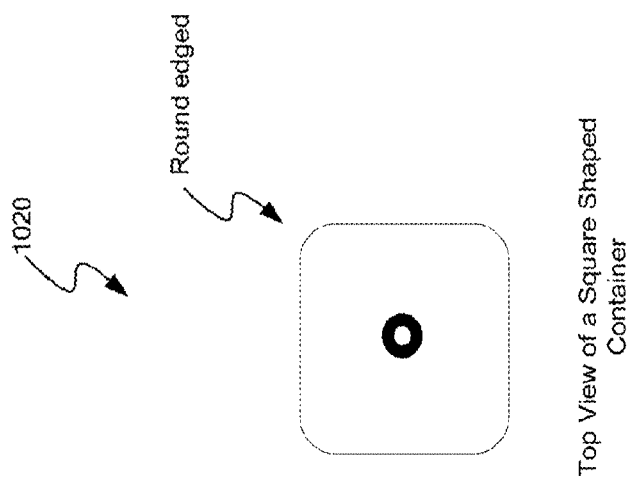
FIG. 10B is a top view of a container having rounded edges, consistent with various embodiments.
Figure 10A:
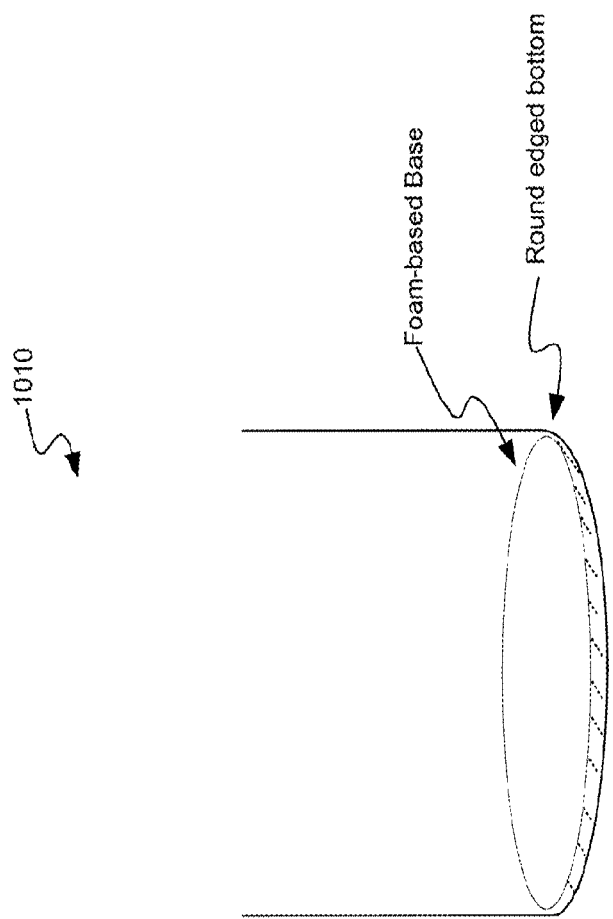
FIG. 10A is a diagram of a container having a foam-based base, consistent with various embodiments.

In some embodiments, the container 900 has no corners or edges on the exterior surface of the container 900. The container 900 can have a spherical underside with a flat bottom that eliminates corners/edges. The corners can be rounded as illustrated in the example 1010 of FIG. 10A. The rounded corners can be safer than the straight edged corner. With the rounded corners, if the container 900 falls from the drone 120 and hits a person or any other object, the round corners/edges of the exterior deforms more than a straight edged corner/edge, that is, absorbs the impact more than the straight edged corners, and is therefore, safer on the person or the object on which the container 900 crashed. FIG. 10B is a top view of a square shaped container 1020 with round corners, consistent with various embodiments.

Figure 11A:
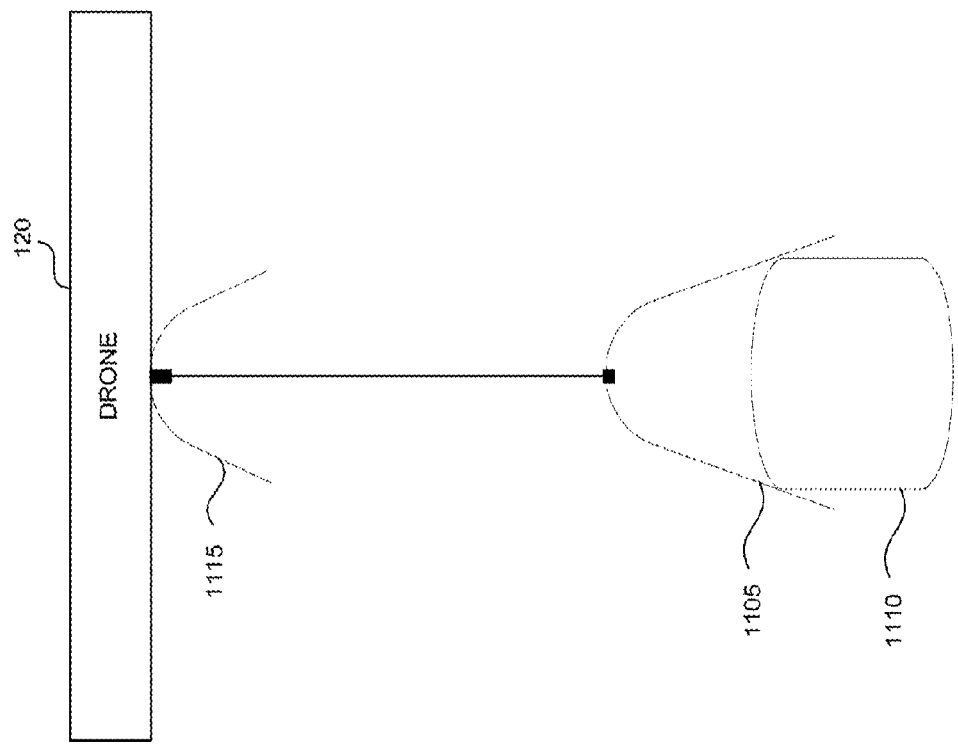
FIG. 11A is a diagram of a hood that holds a container onto the drone, consistent with various embodiments.
Figure 11B:
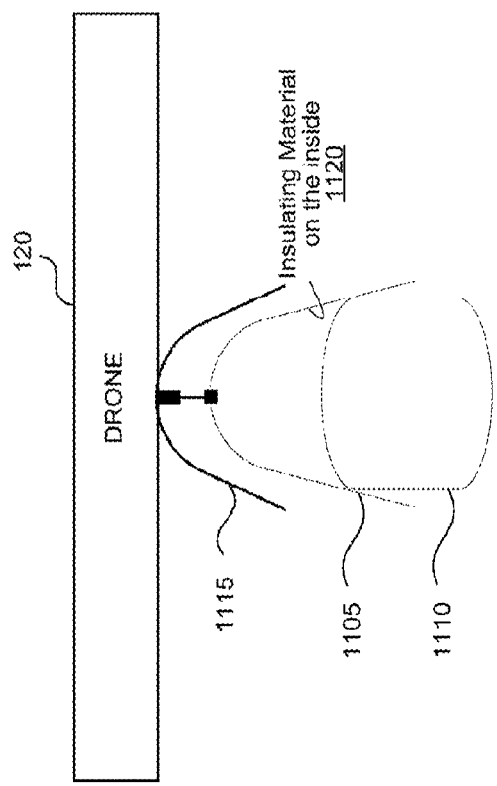
FIG. 11B is a diagram illustrating the container housed in the container housing of the drone, consistent with various embodiments.

In some embodiments, the container can be held onto the drone 120 using a conical hood. FIG. 11A is a diagram of a hood 1105 that holds a container 1110 onto the drone 120, consistent with various embodiments. In some embodiments, the container 1110 is similar to the container 900, container 800 or the package 211. A package to be delivered can be placed in the container 1110. When a drone picks up a container, the container can turn/rotate/move in the wind and the container may not align itself in a container housing fixed to the drone 120. So to ensure that the container 1110 mounts correctly on the underside of the drone 120, e.g., in the container housing 1115, the container 1110 is affixed to a hood 1105, which is then drawn into the container housing 1115 by the suspension means, e.g., suspension means 135. The hood 1105 can be conical or conical-like, e.g., spherical, in shape. The hood 1105 has a means to connect to the suspension means. In some embodiments, the lid of the container 1110 can be designed as the conical hood 1105. In some embodiments, the hood 1105 is affixed to the container 1110, e.g., to the lid of the container 1110. When the container 1110 is lifted up by the drone 120, the hood 1105 is drawn into the container housing 1115 and the container 1110 is housed within the container housing 1115 of the drone 120. In some embodiments, the container housing 1115 is a concave structure, e.g., conical concave structure, that can conveniently house the entire container 1110 or a portion of the container 1110, e.g., a significant portion of the container 1110, so as to keep the container 1110 from moving due to wind while in flight. FIG. 11B is a diagram illustrating the container 1110 housed in the container housing 1115 of the drone 120. However, in other embodiments, the hood 1105 is a concave structure and the container housing is a convex structure. This design may be advantageous for certain drones because it still enables self-aligning of the container in the container housing and has thicker padding at the center of gravity of the drone.

Further, having the container housing 1115 and the container hood 1105 in the conical shape facilitates easy mounting, alignment and/or housing of the container 1110 in the container housing 1115 compared to other shapes. For example, if the container housing 1115 is of a square shape, and if the container is also of square shape, it may be difficult to align the container 1110 within the container housing 1115, especially if there is any wind.

Also, in the case of food delivery, in some embodiments, the hood 1105 contains insulating material 1120 on the interior walls of the hood to keep the food warm/cold. In some embodiments, to maintain the temperature of the food at a given temperature, the amount of surface area of the container 1110 that is in contact with the hood 1105 has to be maximized, e.g., it has to be a round surface on surface, which can mean the container 1110 and the hood 1105 may have to be circular/round or conical in shape. In some embodiments, the insulating material 1120 can be a material that provides insulation against electro-magnetic fields and/or electro-static discharges, e.g., faraday cage insulation, which can be helpful for transporting electronic/magnetic goods.

Figure 12A:
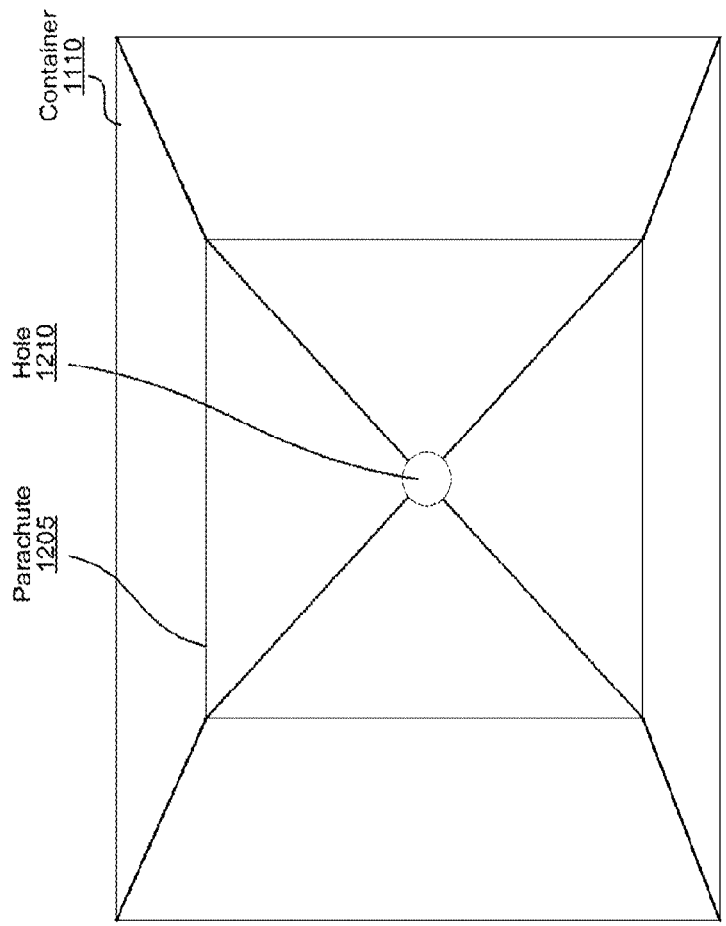
FIG. 12A is a diagram of an example of a parachute affixed to a container, consistent with various embodiments.

FIG. 12A is a diagram of an example of a parachute affixed to a container, consistent with various embodiments. The container 1110 to be dropped off at a delivery location can be installed with a parachute 1205, e.g., made of cloth, paper or paper-type material. The parachute 1205 can be folded and installed on top of the container. The parachute 1205 has a hole 1210, e.g., round in shape, in the top and middle, which is where the container 1110 may be mounted to the suspension means 135 of the drone 120. The parachute 1205 can be attached to the container 1110 at a number of locations, e.g., at least 3 locations.

Figure 12B:
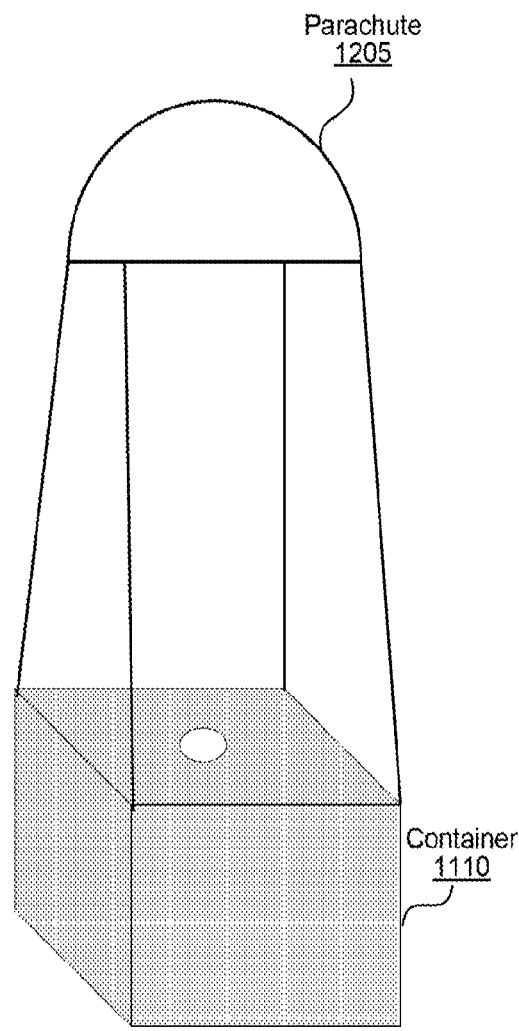
FIG. 12B is a diagram of an example in which a parachute connected to the container is deployed, consistent with various embodiments.

FIG. 12B is a diagram of an example in which the parachute of FIG. 12A is deployed, consistent with various embodiments. In the FIG. 12B, the parachute 1205 is connected to the container 1110 at four locations, e.g., near the four corners of the container 1110. The parachute 1205 can be configured to deploy in response to a trigger. In some embodiments, the parachute 1205 will deploy if the suspension means 135 of the drone 120 snaps.

FIG. 13 is a diagram of the drone 120 with various parts of the package delivery module of FIG. 1, consistent with various embodiments. The drone 120 includes arm guards 1305 that are configured to protect the arms of the drone 120, e.g., against impact on crash landing, and also, the propellers 1315 installed on the arms. The package delivery module 130 includes a "dog bowl" like structure 1310 onto which a container housing 1115 fits snugly. The package delivery module 130 includes the container housing 1115 to house the package during the flight. The packages, e.g., container 1110, are mounted in the center of the drone 120, and therefore the container housing 1115 is mounted in the center of the drone 120. By having a center mounting point, the weight of the container 1110 is centered at the middle of the drone 120, e.g., even with different size/weight containers, which enables the drone 120 to have stability in flight. The container housing 1115 also limits and/or hide the wobbling of the container 1110 during flight. In some embodiments, the drone 120 may not include the container housing 1115, e.g., if the suspension means 135 is tight enough to limit the wobbling of the package.

The package delivery module 130 includes the container hood 1105. As described above, the hood 1105 contains insulating material on the interior walls, e.g., to keep the food being delivered warm/cold. In some embodiments, to maintain the temperature of the food at a given temperature, the hood can be installed with sensor to monitor and regulate the temperature to ensure the food arrives to the customer at guaranteed food quality standards (and at safe temperatures). The hood 1105 can log the temperature data and store it and/or report it to an on-board processor (not illustrated) of the drone 120 and/or to the operator. The on-board processor or the operator can then take necessary steps, e.g., increase or decrease the temperature, to keep the food at required temperatures. The drone 120 typically has a temperature controlling mechanism, e.g., heating elements and/or cooling elements in the package, to regulate the temperature of the food during the flight, and is powered by the power supply of the drone 120 and/or of the package delivery module 130. The insulating material can also provide electro-magnetic and/or electro-static shielding.

The package delivery module 130 also includes an anti-roll feature. The anti-roll feature facilitates the drone 120 to land on the container housing 1115 even without the hood 1105 inside it, e.g., for emergencies. The anti-roll feature also prevents tipping, and even if the drone 120 tilts, the propellers 1315 cannot hit the ground, as shown by the angle depicted in FIG. 14.

Referring back to FIG. 13, the container 1110 to be delivered by the drone 120 can be of various shapes and sizes. In some embodiments, the container 1110 is similar to the package or container described at least with reference to FIGS. 2, 8, 9A, 9B, 10A and 10B. The container 1110 is designed so it can carry a variety of different product sizes including parcels and fast food with none-to-minimum changes to the container 1110 (besides adding inserts to ensure the goods that are delivered have a snug and insulated fit so they don't roll around and are kept at the correct temperature). The container 1110 can include variable padding based on the center of gravity of the drone 120, e.g., padding is thickest where the center of gravity is of greatest which makes it safer for people upon impact when the container crash lands on people. The hood 1105 can also cover the container in foam, which provides an additional safety measure. For example, if the suspension means 135 is severed and when the container 1110 falls, in the event of an impact with a person, the container 1110 hits the person with the foam rather than with a corner or edge, which makes it safer.

Note that the components or parts of the package delivery module 135 or the drone 120 illustrated in FIG. 13 are in just one embodiment. Other embodiments can have more parts or have fewer parts. For example, in one embodiment, the package delivery module 135 may not have the dog bowl 1310.

Figure 15A:
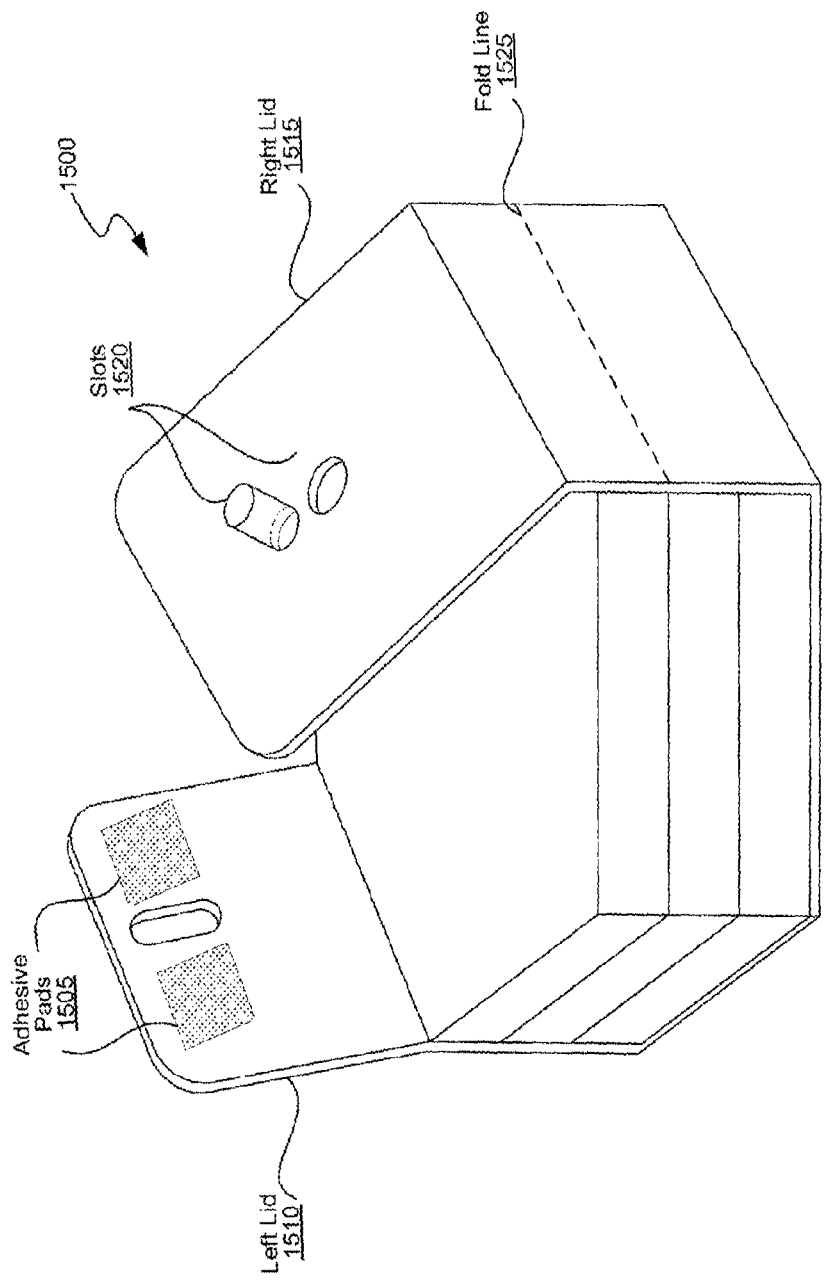
FIG. 15A is a diagram of a hex-box container for delivering food, consistent with various embodiments.
Figure 15B:
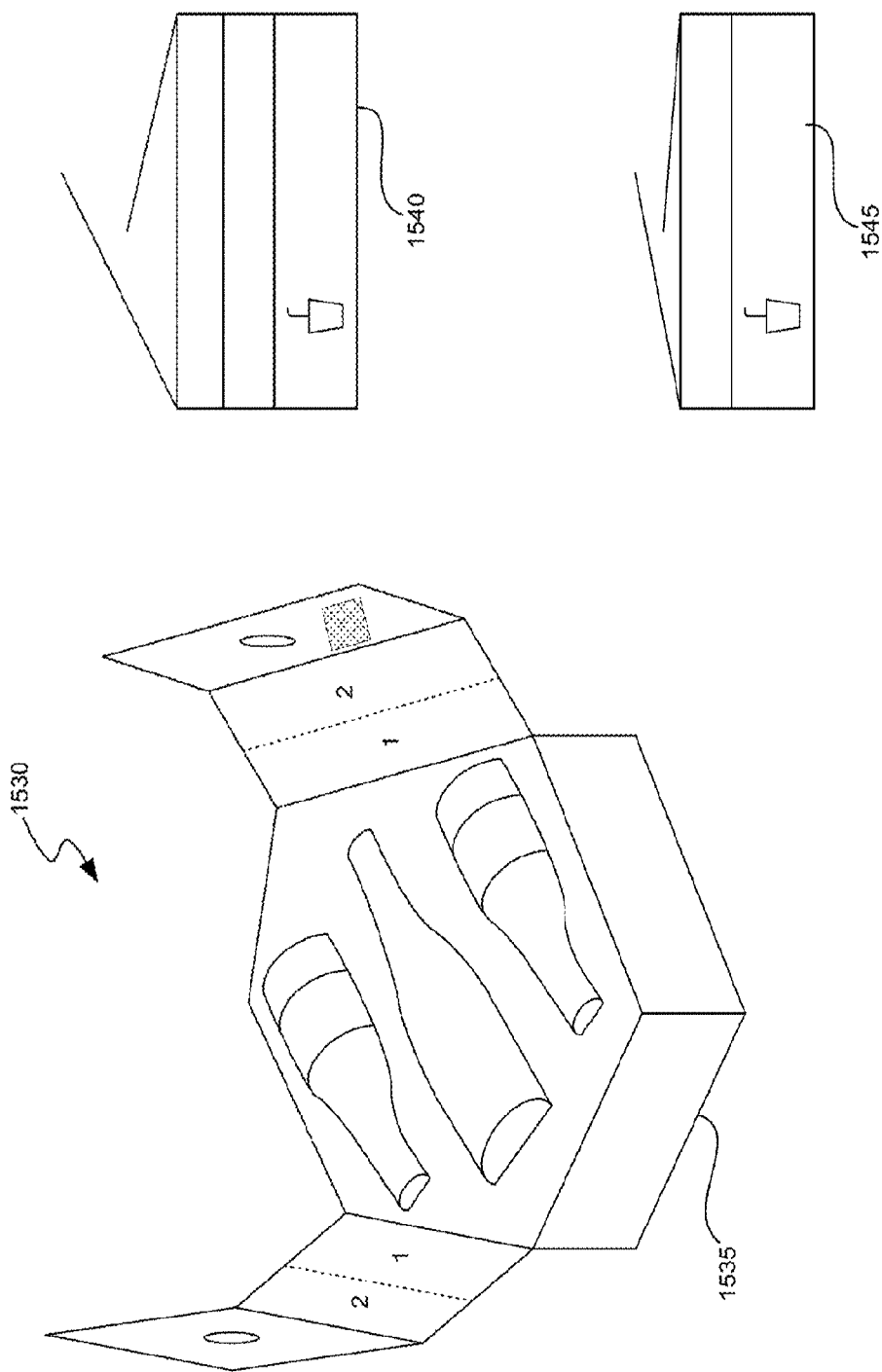
FIG. 15B is another diagram of the hex-box container for delivering food, consistent with various embodiments.
Figure 16:
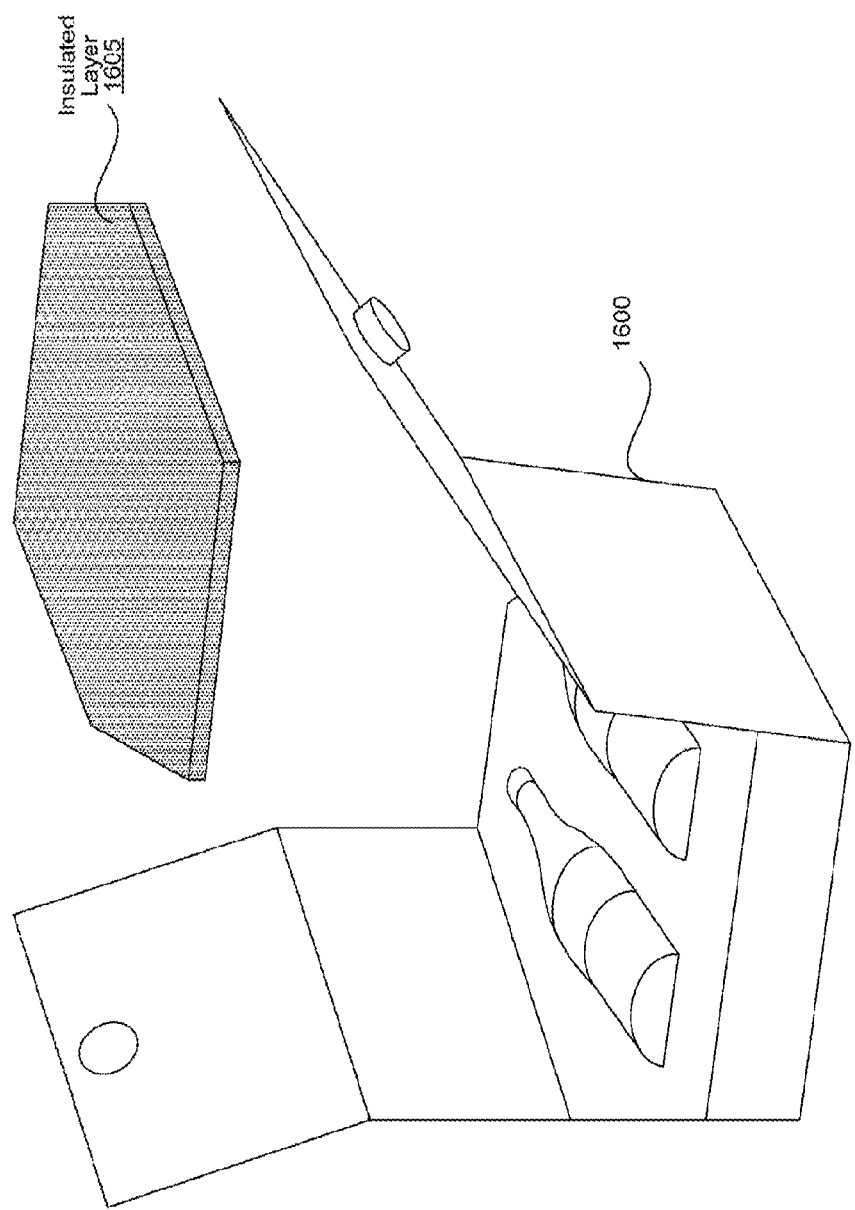
FIG. 16 is a diagram of another container for carrying beverages, consistent with various embodiments.

FIGS. 15A, 15B and 16 also illustrate various configurations of the container 1110. FIG. 15A is a diagram of a first hex-box container 1500 for delivering food, consistent with various embodiments. The first hex-box container 1500 can be used to carry food and drinks such as a pizza and a beverage, e.g., soda or wine. The first hex-box container 1500 is an adjustable hex box, which has three compartments stacked one over the other. The top two of the three compartments can be used to carry pizza, and the bottom compartment can be used to carry drinks. The first hex-box container 1500 can be made of paper, cardboard or a similar suitable material and can be assembled easily from an initial flat sheet, e.g., by folding the sheet along the fold lines 1525. The first hex-box container 1500 can be adjusted to three stacked compartments or to two stacked compartments.

The first hex-box container 1500 can have adhesive pads 1505 under the lid using which the left lid 1510 and the right lid 1515 can be secured to each other. The lids also have one or more slots 1520 for the coupler of the container, which connects to the suspension means 135. The lids can have more than slot for the coupler as the position of the coupler of the first hex-box container 1500 can change depending on whether the first hex-box container 1500 is two layered container or a three layered container.

FIG. 15B is a diagram of a second hex-box container for delivering food, consistent with various embodiments. The second hex-box container 1530 in FIG. 15B shows a pair of wine bottles housed in the slots in the bottom-most compartment 1535 of the second hex-box container 1530. The second hex-box container 1530 can also be configured to carry one or more drinks. For example, the second hex-box container 1530 will have a single slot for carrying one drink and two slots for two drinks. The second hex-box container 1530 can be configured, e.g., folded across appropriate fold lines, to have two layers for carrying solid food, e.g., pizza, and one bottom layer for beverages as shown by example 1540, and configured to have one layer for carrying solid food and one bottom layer for beverages as shown by example 1545. The shape and size of the slots can vary and depends the shape and size of the drink containers to be carried.

Note that the configuration of the containers, e.g., shape, size, the number of compartments, are completely configurable and is not restricted to the illustrated embodiments.

FIG. 16 is a diagram of another container for carrying beverages, consistent with various embodiments. The container 1600 is a rectangular or square shaped container configured to carry a beverage. The container has slots for carrying two beverages, e.g., a pair of wine bottles. Also, the beverages in the container can be wrapped with an insulating layer 1605 as illustrated to keep the beverages at a constant temperature or to minimize the temperature change. The container 1600 also has a slot for placing the coupler, which is used to attach the container 1600 to the suspension means 135 of the drone 120. In some embodiments, the container 1600 is similar to the container 1110 or the package 211.

Figure 17B:
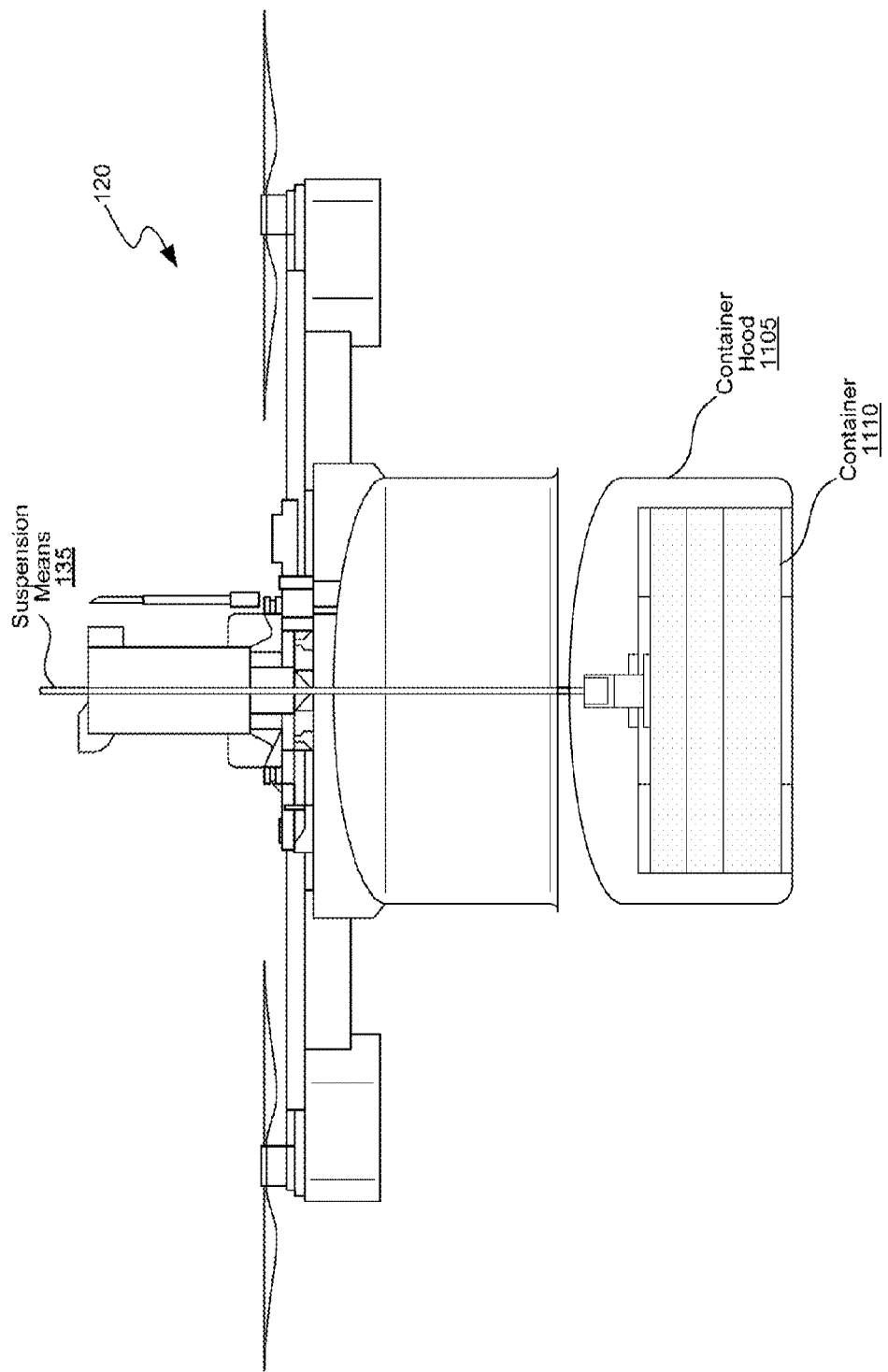
FIG. 17B is a diagram illustrating the drone lowering the package, consistent with various embodiments.
Figure 17D:
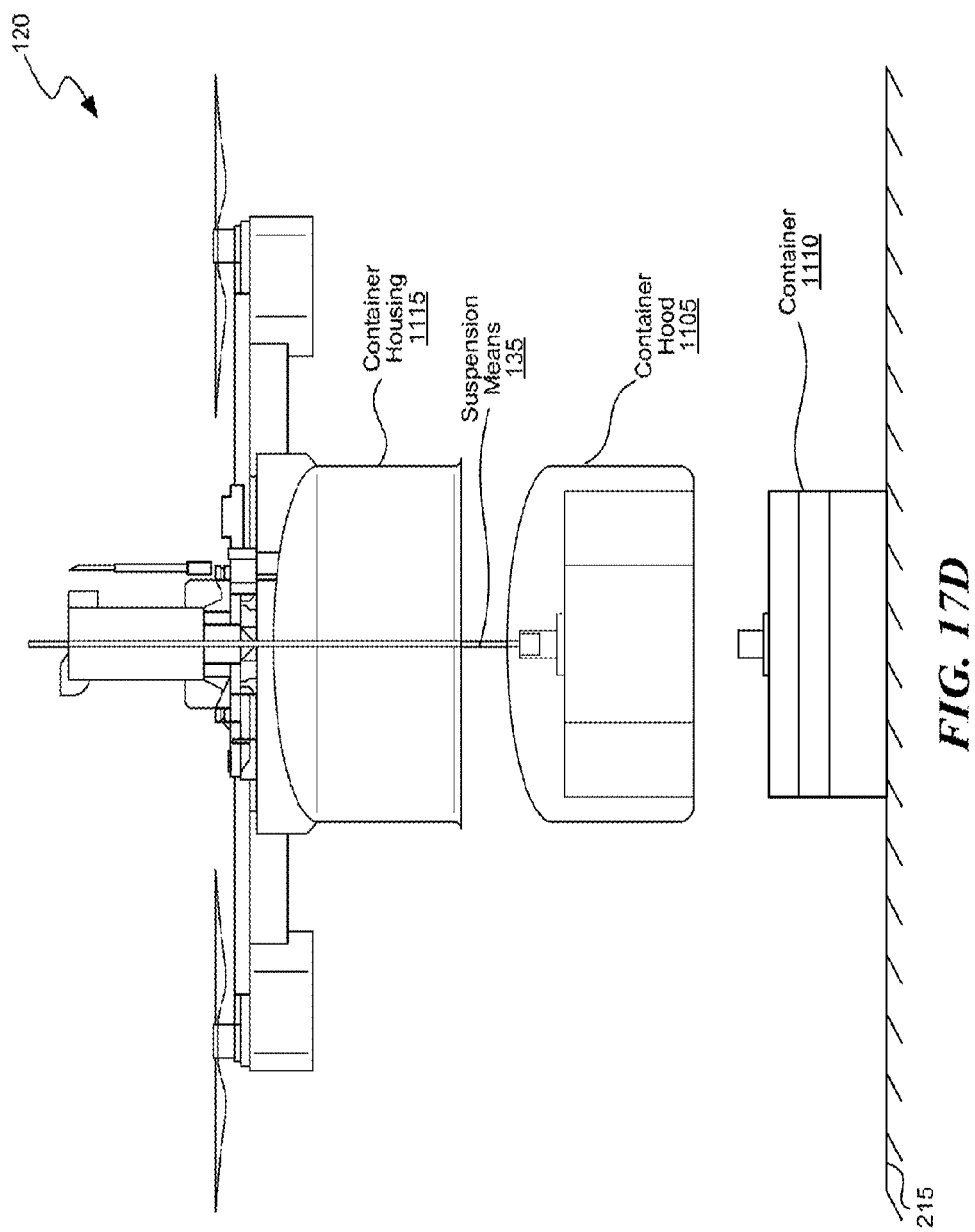
FIG. 17D is a diagram illustrating the drone retracting the suspension means after lowering the package to the surface at the delivery destination, consistent with various embodiments.

FIGS. 17A-17E, collectively referred to as FIG. 17, is a diagram illustrating an example of delivering a package using a drone, consistent with various embodiments. The example can be implemented in the system 100 of FIG. 1 and using the drone 120. In some embodiments, the example is similar to the example 200 illustrated in FIG. 2. As illustrated in FIG. 17A, the drone 120 is in flight enroute to a delivery destination to deliver a package, e.g., container 1110. In some embodiments, the container 1110 is attached to the drone 120 via the suspension means 135 and is locked to the suspension means 135 via the coupling member 140.

Upon reaching the delivery destination, the drone 120 prepares to lower the container 1110 at a delivery area in the delivery destination. As illustrated in FIG. 17B, the drone 120 while hovering at the delivery area at a particular height from the ground, lowers the suspension means 135 to deliver the container 1110. The hood 1105 is lowered to deliver the container 1110. While FIG. 17B illustrates the container 1110 being visible from outside the hood 1105, note that the container 1110 can be concealed in the hood 1105. The drone 120 continues to lower the suspension means 135 until the container 1110 rests on the delivery area 215, as illustrated in FIG. 17C. When the container 1110 rests on the delivery area 215, e.g., the ground, the coupling member 140 is disengaged to release the container 1110. The coupling member 140 can be operated in automatic-coupling mode or a passive coupling-mode to unlock, as described at least with reference to FIG. 2E.

After the package is lowered in the delivery area 215 and released from the coupling member 140, the drone 120 retracts the hood 1105 as illustrated in FIG. 17D. The drone 120 continues to retract the suspension means 135 until the hood 1105 is secured into the container housing 1115, as illustrated in FIG. 17E.

The configuration of the hood 1105 and the container housing 1115 can enable self-aligning retraction of the container 1110, which enables the package delivery mechanism to perform pickups in addition to deliveries. The self-aligning retraction can also facilitate mid-delivery aborts, e.g., aborting delivery midway and retracting the container 1110 back to the container housing 1115. The packages can be picked up from or delivered to consumers while the drone 120 is in hover.

Also, since the hood 1105 lowers with the container 1110, in some embodiments, if the suspension mechanism 135 is severed, the likelihood of the container 1110 landing on its edge on someone is reduced significantly and therefore, it is safer. Also the hood 1105 can keep the hot food hot on its the way to the destination. Further, since the container 1110 is concealed in the hood 1105, after the container 1110 is delivered on the ground, the hood 1105 lifts away to reveal the container 1110, which provides a magical effect of the container 1110 appearing all of a sudden.

Figure 18:
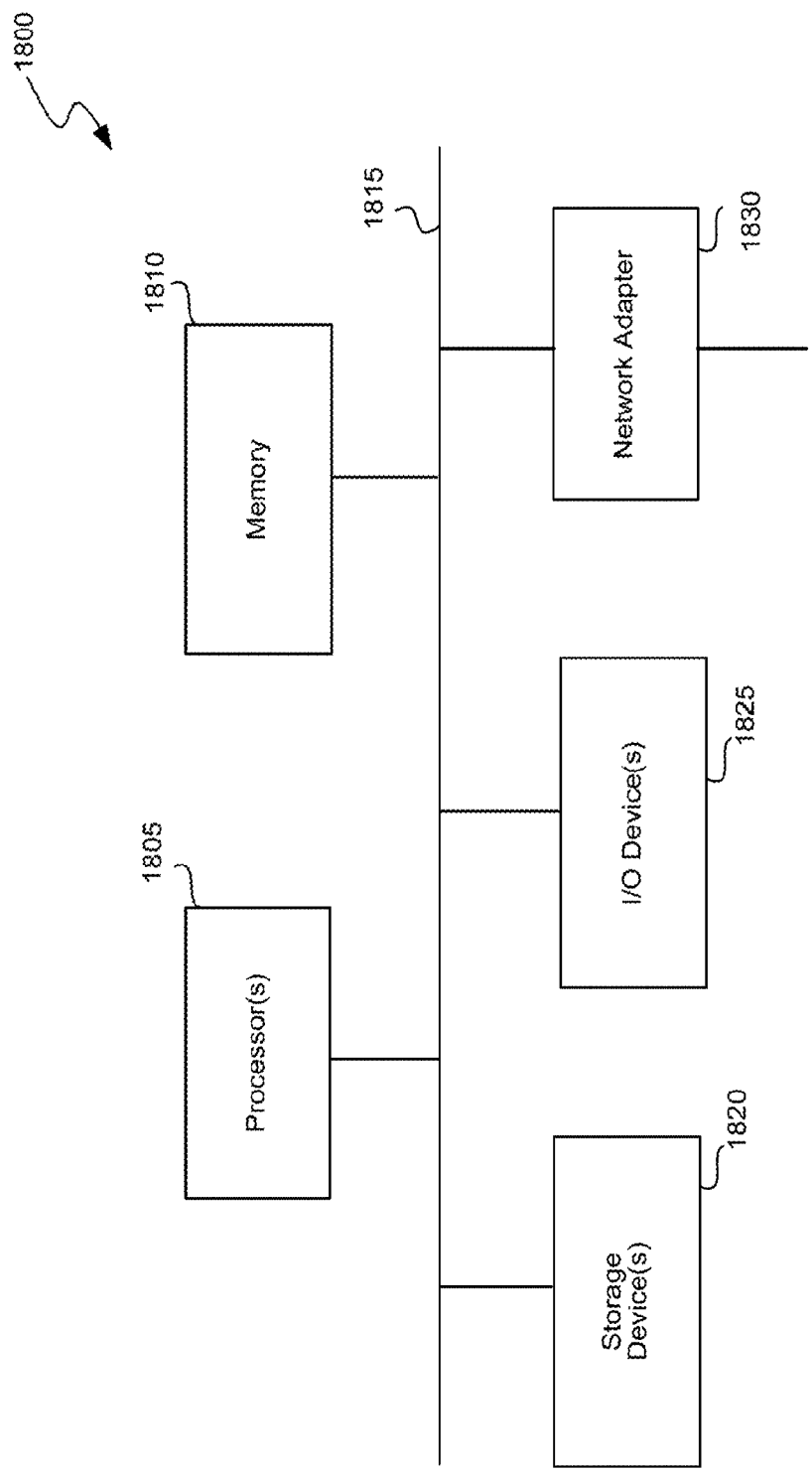
FIG. 18 is a block diagram of a computer system as may be used to implement features of the disclosed embodiments.

FIG. 18 is a block diagram of a computer system as may be used to implement features of the disclosed embodiments. The computing system 1800 may be used to implement any of the entities, components, modules, mechanisms, or services depicted in the examples of the foregoing figures (and any other described in this specification). The computing system 1800 may include one or more central processing units ("processors") 1805, memory 1810, input/output devices 1825 (e.g., keyboard and pointing devices, display devices), storage devices 1820 (e.g., disk drives), and network adapters 1830 (e.g., network interfaces) that are connected to an interconnect 1815. The interconnect 1815 is illustrated as an abstraction that represents any one or more separate physical buses, point to point connections, or both connected by appropriate bridges, adapters, or controllers. The interconnect 1815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1810 and storage devices 1820 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 1810 can be implemented as software and/or firmware to program the processor(s) 1805 to carry out actions described above. In some embodiments, such software or firmware may be initially provided to the processing system 1800 by downloading it from a remote system through the computing system 1800 (e.g., via network adapter 1830).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Improved Coupling Member

FIGS. 2A-J described a particular example of a coupling member which allows a package to be uncoupled automatically, via gravity, without human intervention or without some other mechanism to rotate the coupling member or suspension means. Initial attachment of the coupling member to the package, however, requires the coupling member to be rotated relative to the package. An improved coupling member will now be described which not only enables automatic uncoupling, but also enables automatic coupling. The rotation is automatic in the sense that several inclined surfaces on the coupling member cause the rotation by simply moving the coupling along a longitudinal axis.

The primary difference between the coupler of FIGS. 2A-J and the improved coupling member is that the improved coupling member has a guide path with two ends, the two ends forming an inlet and an outlet. This allows a protrusion to be guided through the inlet towards a locking position when the coupling member is coupled to the coupling counterpart, and then guided from the locking position to the outlet when uncoupled from the coupling counterpart. In contrast, the coupler of FIGS. 2A-J has a guide path with only one end which acts as both the inlet and outlet. To guide the protrusion through the guide path of the updated coupler, the guide path comprises several inclined surfaces to cause the coupler to rotate several times. Again, this is in contrast with the guide path of the coupler of FIGS. 2A-J, which has a single inclined surface. These differences allow the improved coupler to automatically couple and uncouple from the coupling counterpart, via gravity.

Figure 19A:
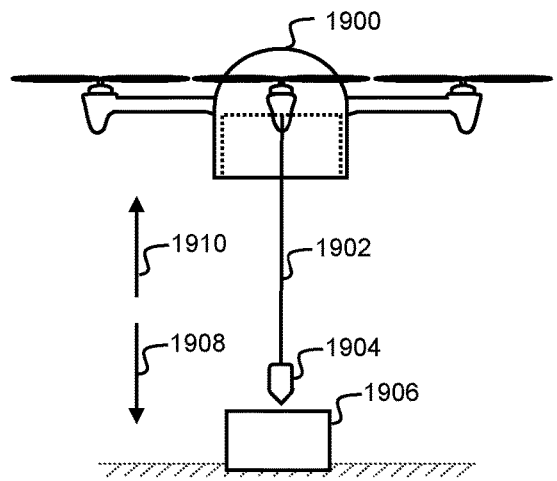
FIG. 19A is a diagram illustrating a drone before engaging a payload container, consistent with various embodiments.

FIG. 19A depicts a UAV 1900 having a payload delivery mechanism comprising a retractable suspension member 1902 and the improved coupling member 1904 according to an embodiment, attached to a lower end of the suspension member 1902. FIG. 19A shows the UAV 1900 before it has picked up a payload container 1906 comprising a payload.

To pick up the payload container 1906, the suspension member 1902 is released so that it moves in a first longitudinal direction 1908, towards the payload container 1906. The combined weight of the suspension member 1902 and the improved coupling member 1904 (hereinafter referred to as "coupling member 1904") causes the coupling member to move in this direction.

Figure 19B:
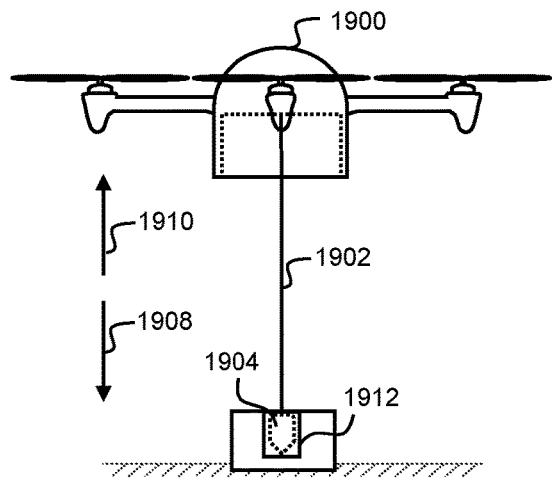
FIG. 19B is a diagram illustrating a suspension member of the drone inserted into a coupling counterpart, consistent with various embodiments.

FIG. 19B depicts the UAV 1900 at a later time. The coupling member 1904 has been lowered by the suspension member 1902 to the extent that it has now been received within a coupling counterpart 1912 located on/in a container comprising the payload container 1906. The coupling counterpart 1912 comprises one or more protrusions which engage with the coupling member 1904 to allow the payload container to be attached to the coupling member 1904. The coupling member 1904 is shown within the coupling counterpart 1912 as dashed lines. By moving the coupling member 1904 in the first longitudinal direction 1908 relative to the protrusion, an inclined surface on the coupling member 1904 engages the protrusion and causes the coupling member 1904 to rotate relative to the coupling counterpart 1912, and therefore the protrusion. This rotation occurs without human intervention, and without the UAV applying an external force to cause the coupling member 1904 or the suspension member 1902 to rotate. Instead, the rotation occurs through the motion of the coupling member 1904 in the first longitudinal direction 1908 (due to gravity) and the abutment of the protrusion with the inclined surface on the coupling member 1904.

Figure 19C:
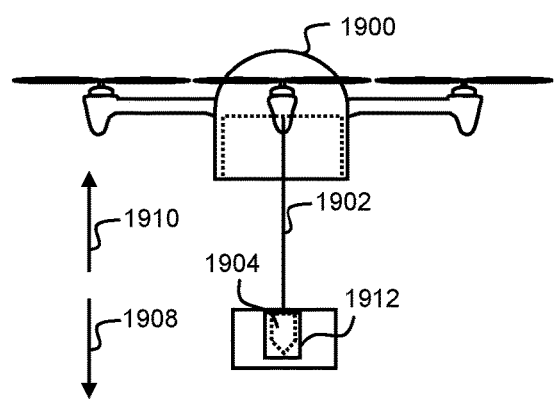
FIG. 19C is a diagram illustrating a payload container suspended from the suspension member of the drone, consistent with various embodiments.
Figure 19D:
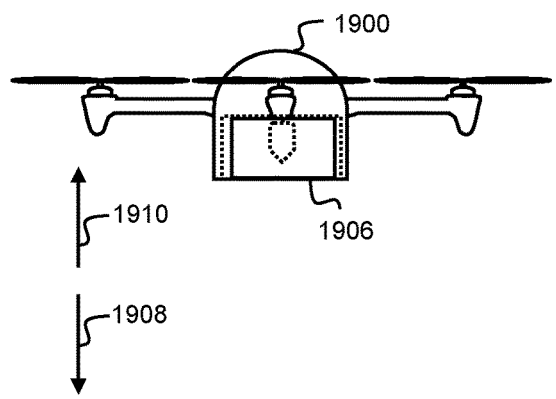
FIG. 19D is a diagram illustrating the payload container fully retracted by the drone, consistent with various embodiments.

FIG. 19C depicts the UAV 1900 at a later time. The coupling member 1904 has been fully inserted into the coupling counterpart 1912 and drawn back towards the UAV in a second longitudinal direction 1910. Initial motion in the second longitudinal direction 1910 again causes the coupling member 1904 to rotate due to the engagement of the protrusion with another inclined surface. This rotation causes the protrusion to move into a locking position, such that continued motion in the second longitudinal direction 1910 locks the coupling member 1904 and the coupling counterpart 1912 together. The weight of the payload container 1906, which acts in the first longitudinal direction 1908, keeps the coupling member 1904 and the coupling counterpart 1912 locked together as the payload container 1906 is transported to a delivery destination. FIG. 19D depicts the UAV 1900 after the payload container 1906 has been fully retracted into a container housing of the UAV 1900 (shown in FIG. 19D with dashed lines). The payload container may be stored this way until the UAV 1900 arrives at its delivery destination.

Once the UAV 1900 arrives at its delivery destination, the UAV 1900 can hover at a certain distance above a delivery surface. FIG. 19D therefore also depicts the UAV hovering above the delivery surface. To deliver the payload container 1906, the UAV 1900 can lower the payload container 1906 towards the delivery surface by causing the suspension member 1902 to unwind. The weight of the payload container 1906 and the coupling member 1904 pulls the payload container 1906 and coupling member 1904 in the first longitudinal direction 1908 towards the ground. FIG. 19C can also represent the lowering of the payload container 1906 towards the delivery surface.

Similarly, FIG. 19B can also be used to depict the payload container 1906 as it engages the delivery surface. As the payload container 1906 engages the surface, the payload container 1906 is no longer moving in the first longitudinal direction 1908. However, the weight of the coupling member 1904 means that the coupling member 1904 is still moving in the first longitudinal direction 1908, so moves relative to the coupling counterpart 1912. Another inclined surface of the coupling member 1904 again engages the protrusion due to the relative movement. The engagement with the inclined surface causes the coupling member 1904 to rotate as the coupling member 1904 continues to move in the first longitudinal direction 1908. After the rotation, the UAV 1900 can retract the suspension member 1902 and thereby move the coupling member 1904 in the second longitudinal direction 1910. The previous rotation means that the protrusion has been moved out of alignment with the locking position, so that movement in the second longitudinal direction 1910 causes the coupling member 1904 and the coupling counterpart 1912 to be uncoupled (rather than causing them to lock together again). FIG. 19A therefore can also be used to depict the release of the coupling member 1904 as the suspension member 1902 draws the coupling member 1904 in the second longitudinal direction 1910. Therefore again, the coupling member 1904 is automatically uncoupled from the payload container 1906 without human intervention or without the UAV 1900 applying an additional force to cause the coupling member 1904 or suspension means 1902 to rotate.

Figure 20:
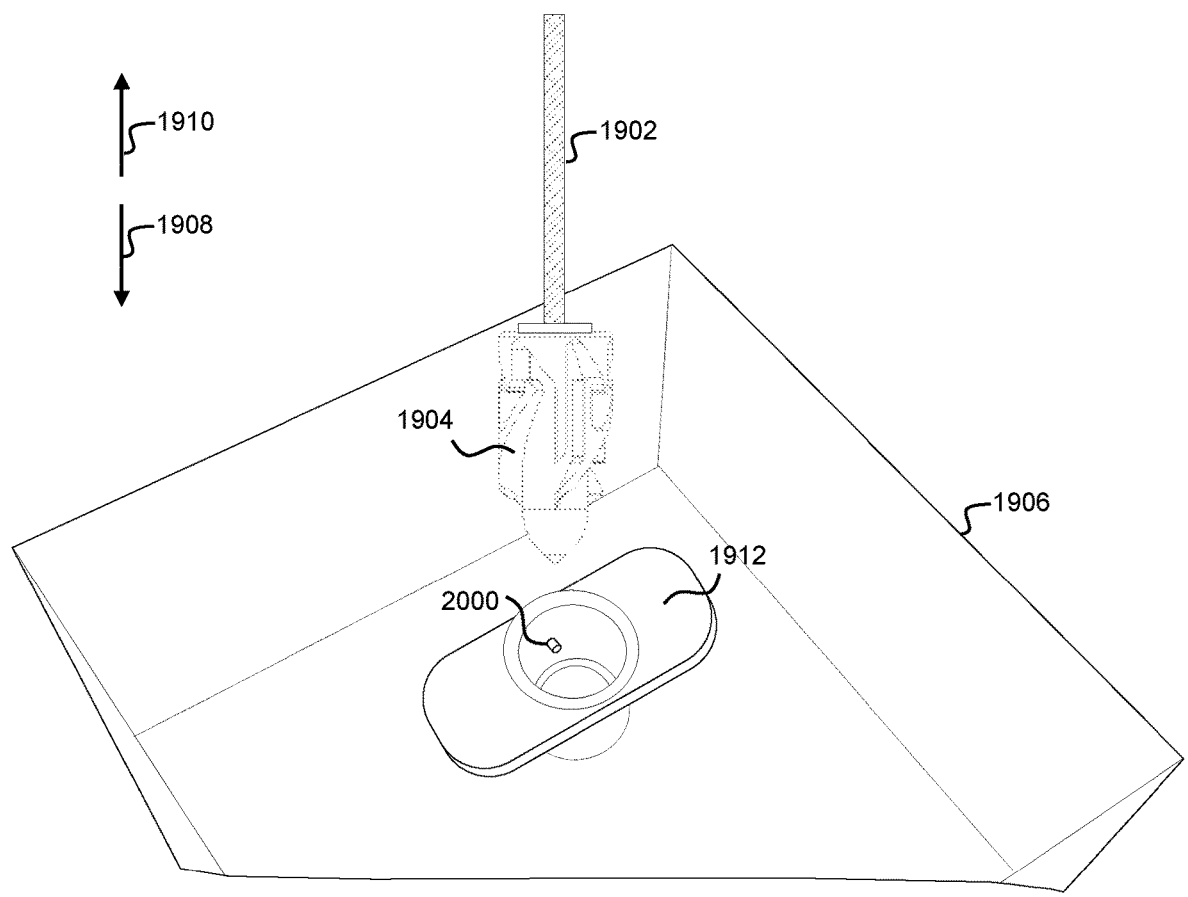
FIG. 20 is a diagram illustrating another example coupling member being inserted into a coupling counterpart attached to a payload container, consistent with various embodiments.

FIG. 20 depicts a more detailed view of the coupling member 1904 attached to the suspension member 1902, and the coupling counterpart 1912 affixed to an upper surface of a payload container 1906.

The coupling counterpart 1912 comprises one or more protrusions 2000 which engage the coupling member 1904. In this example, the coupling member 1904 is a male connector and is configured to fit within a female coupling counterpart 1912. The coupling counterpart 1912 comprises an inner surface from which the protrusion projects inwards, in a radial direction. In another example, however, the coupling member 1904 may be a female connector and is configured to fit around an outer perimeter of a male coupling counterpart 1912. In a further example, the coupling member 1904 may be affixed to the payload container 1906 and the coupling counterpart 1912 may be attached to the suspension member 1902.

Figure 21:
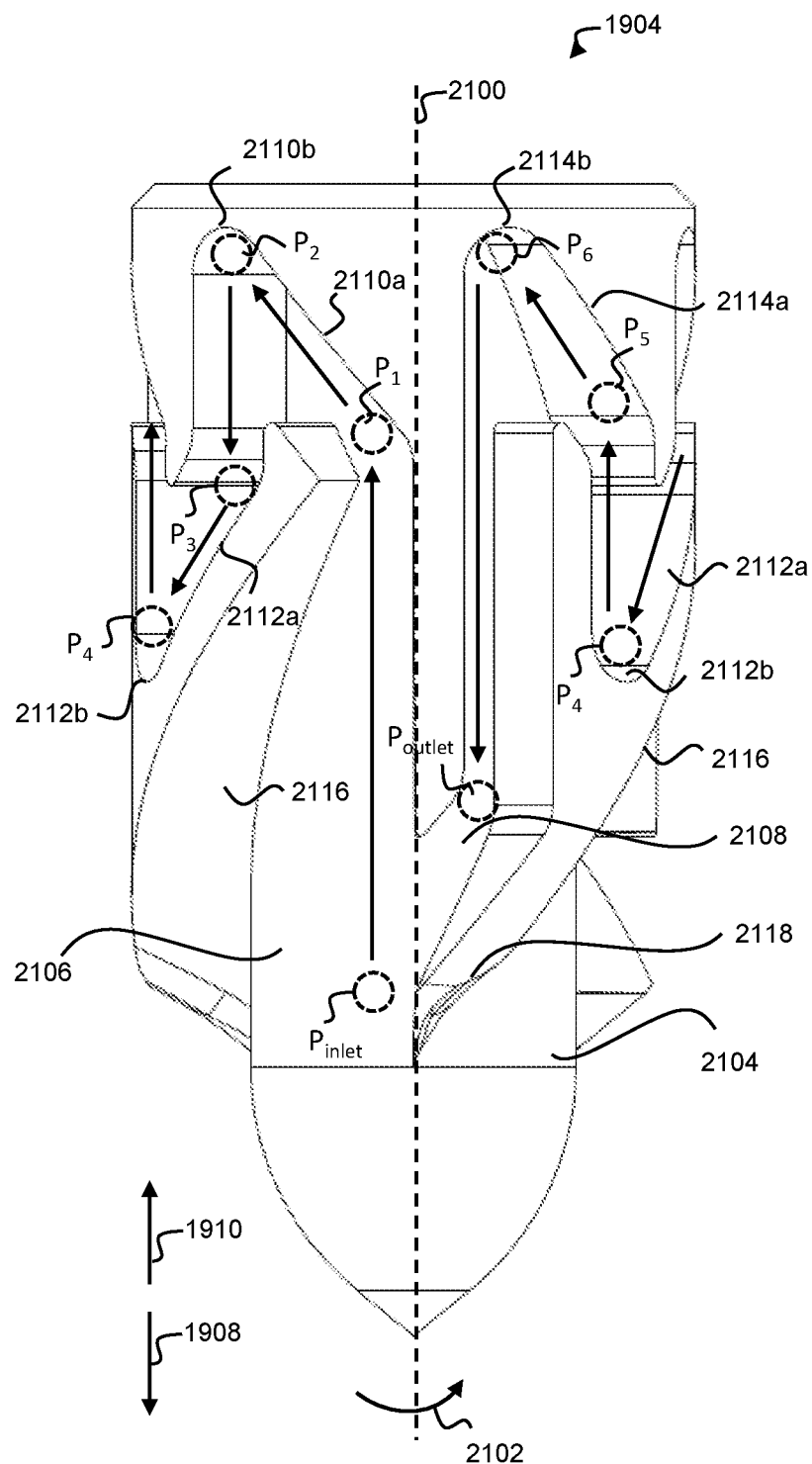
FIG. 21 is a diagram illustrating the example coupling member of FIG. 20, consistent with various embodiments.

FIG. 21 depicts an enlarged view of the coupling member 1904 according to an embodiment. The example coupling member 1904 defines first 1908 and second 1910 longitudinal directions, which point opposite to one another and are parallel to a longitudinal axis 2100 defined by the coupling member 1904. An outer surface 2104 of the coupling member 1904 extends in an azimuthal direction 2102 around the longitudinal axis 2100. As the coupling member 1904 suspends from the suspension member 1902, the coupling member 1904 is free to rotate in the azimuthal direction 2102 and in a direction opposite to the azimuthal direction 2102. The coupling member 1904 can also move along the longitudinal axis 2100 in both the first and second longitudinal directions 1908, 1910 by raising and lowering the coupling member 1904 by retracting and unravelling the suspension member 1902.

Figure 22A:
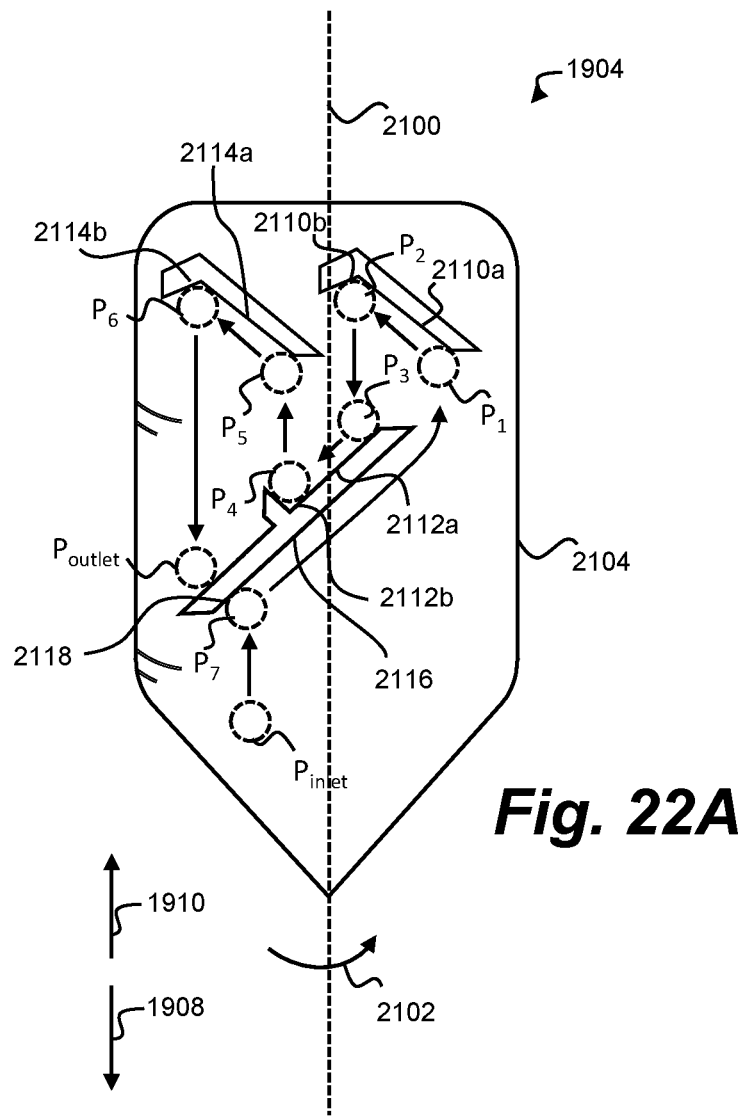
FIG. 22A is a diagram illustrating the example coupling member of FIG. 21, consistent with various embodiments.
Figure 22B:
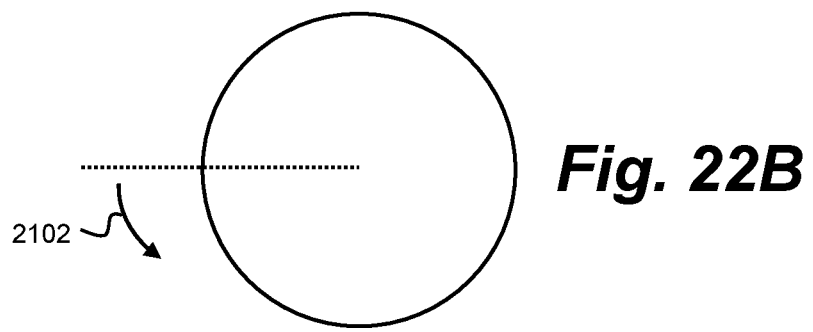
FIG. 22B is a top down view illustrating the example coupling member of FIG. 22A, consistent with various embodiments.

For ease of understanding, FIG. 22A depicts a simplified view of the coupling member 1904 depicted in FIG. 21. FIG. 22B depicts a top down view of the coupling member 1904, which more clearly indicates the azimuthal direction 2102.

Referring to both FIGS. 21 and 22A, the example coupling member 1904 comprises a surface 2104, in this case an outer surface, comprising one or more guide paths which extend around the surface 2104. A guide path guides a protrusion of the coupling counterpart 1912 from an inlet 2106 of the guide path to an outlet 2108 of the guide path. When the protrusion has entered the guide path, the coupling member 1904 can guide the protrusion into a locking position, where the coupling member and coupling counterpart are said to be locked together. The protrusion is guided by moving the coupling member 1904 relative to the stationary protrusion. The guiding can be achieved by simply moving the coupling member 1904 in the first and second longitudinal directions 1908, 1910 and allowing the coupling member 1904 to rotate as the protrusion engages a number of surfaces within the guide path.

The guide path can be formed by various structures protruding outwards from the surface 2104 in an outwards radial direction. These structures form a number of surfaces which can engage a protrusion of the coupling counterpart 1912. In another example however, the guide path can be formed by forming a groove within the surface 2104, where the groove extends into the surface in an inwards radial direction. In a particular example, the coupling member 1902 may be formed from a relatively rigid material such as a metal or plastic.

To guide a protrusion through the guide path, the protrusion is initially received in an inlet 2106. In this example the guide path at the inlet tapers and therefore narrows in width as it extends in the second longitudinal direction 1910. This tapered shape is particularly useful to more easily guide the protrusion into the guide path. The arrows in FIG. 21 depict the relative movement of a protrusion through a guide path as the coupling member 1904 moves in the first and second longitudinal directions 1908, 1910 and is caused to rotate as the protrusion engages a number of surfaces within the guide path.

The protrusion, at position $P_{inlet}$, is shown initially being received with a guide path via the inlet 2106 as the coupling member 1904 moves in the first longitudinal direction 1908 towards the coupling counterpart 1912. As the coupling member 1904 continues to move in the first longitudinal direction 1908, the position of the protrusion moves relative to the coupling member 1904. At position $P_1$ the protrusion engages an ingress surface along a first part 2110a of the ingress surface. This first part 2110a is inclined and extends from a second part 2110b of the ingress surface in the first longitudinal direction and in the azimuthal direction. As the coupling member 1904 continues to move in the first longitudinal direction 1908 the engagement between the protrusion and the inclined surface of the first part 2110a causes the coupling member 1904 to rotate in the azimuthal direction 2102. The rotation and the movement in the first longitudinal direction 1908 continues until the second part 2110b abuts the protrusion at point $P_2$. The second part 2110b therefore receives the protrusion from the first part 2110a. This abutment stops or limits further movement and rotation of the coupling member 1904. The weight of the coupling member 1904, and the relatively low coefficient of friction between the protrusion and the inclined surface allows the coupling member 1904 to rotate in this manner.

If the UAV 1900 were to continue unravelling the suspension member 1902, the suspension member 1902 would begin to go slack. At this point, the UAV 1900 can retract the suspension member 1902, and cause the coupling member 1904 to move in the second longitudinal direction 1910, which causes the position of the protrusion to move relative to the coupling member 1904 until it engages a locking surface along a third part 2112a. The third part 2112a therefore receives the protrusion from the second part 2110b. The third part 2112a is spaced from the second part 2110b along the longitudinal axis 2100 and has substantially the same azimuthal position as the second part 2110b. At position $P_3$ the protrusion has engaged the third part 2112a.

This third part 2112a is inclined and extends from a fourth part 2112b of the locking surface in the second longitudinal direction and in the azimuthal direction. As the coupling member 1904 continues to move in the second longitudinal direction 1910 the engagement between the protrusion and the inclined surface of the third part 2112a causes the coupling member 1904 to rotate in the azimuthal direction 2102. The rotation continues until the fourth part 2112b abuts the protrusion at point $P_4$. In this position, the protrusion can be said to be in a locked position, and so the coupling member 1904 is in a locking position relative to the coupling counterpart 1912. The fourth part 2112b therefore receives the protrusion from the third part 2112a.

As the UAV 1900 continues to retract the suspension member 1902, the coupling member 1904 continues to move in the second longitudinal direction 1910. Because the protrusion at point $P_4$ is trapped within a "U", "V" or hook-shaped fourth part 2112b of the guide path, the coupling counterpart 1912, and therefore the payload, can be lifted away from a surface by the UAV 1900. The payload can then be transported to its delivery destination.

As the UAV 1900 reaches its delivery destination, the payload can be lowered in the first longitudinal direction 1908 by allowing the suspension member 1902 to unwind. As the payload container engages the delivery surface, the coupling counterpart and the protrusion become stationary relative to the coupling member 1904 which continues to move in the first longitudinal direction 1908. This relative movement causes the position of the protrusion to move relative to the coupling member 1904 until it engages an egress surface along a fifth part 2114a. The fifth part 2114a therefore receives the protrusion from the fourth part 2112b. The fifth part 2114a is spaced from the fourth part 2112b along the longitudinal axis 2100 and has substantially the same azimuthal position as the fourth part 2112b.

In FIG. 21, the fifth part 2114a of the particular guide path being described is obscured from view towards the rear side of the coupling member 1904. For illustrative purposes, the fifth part 2114a of another adjacent guide path is used to describe the remaining features of the guide path.

At position $P_5$ the protrusion has engaged the fifth part 2114a. This fifth part 2114a is inclined and extends from a sixth part 2114b of the egress surface in the first longitudinal direction and in the azimuthal direction. As the coupling member 1904 continues to move in the first longitudinal direction 1908 the engagement between the protrusion and the inclined surface of the fifth part 2114a causes the coupling member 1904 to rotate in the azimuthal direction 2102. The rotation and the movement in the first longitudinal direction 1908 continues until the sixth part 2114b abuts the protrusion at point $P_6$. The sixth part 2114b therefore receives the protrusion from the fifth part 2114a. This abutment stops or limits further movement and rotation of the coupling member 1904.

If the UAV 1900 were to continue unravelling the suspension member 1902, the suspension member 1902 would begin to go slack. At this point, the UAV 1900 can retract the suspension member 1902, and cause the coupling member 1904 to move in the second longitudinal direction 1910, which causes the position of the protrusion to move relative to the coupling member 1904 until it is released towards and out of the guide path outlet 2108 at position $P_{outlet}$. At this point, the coupling member 1904 has fully uncoupled from the coupling counterpart 1912, so the payload container remains on the delivery surface as the UAV 1900 continues to retract the suspension member 1902.

Figure 23:
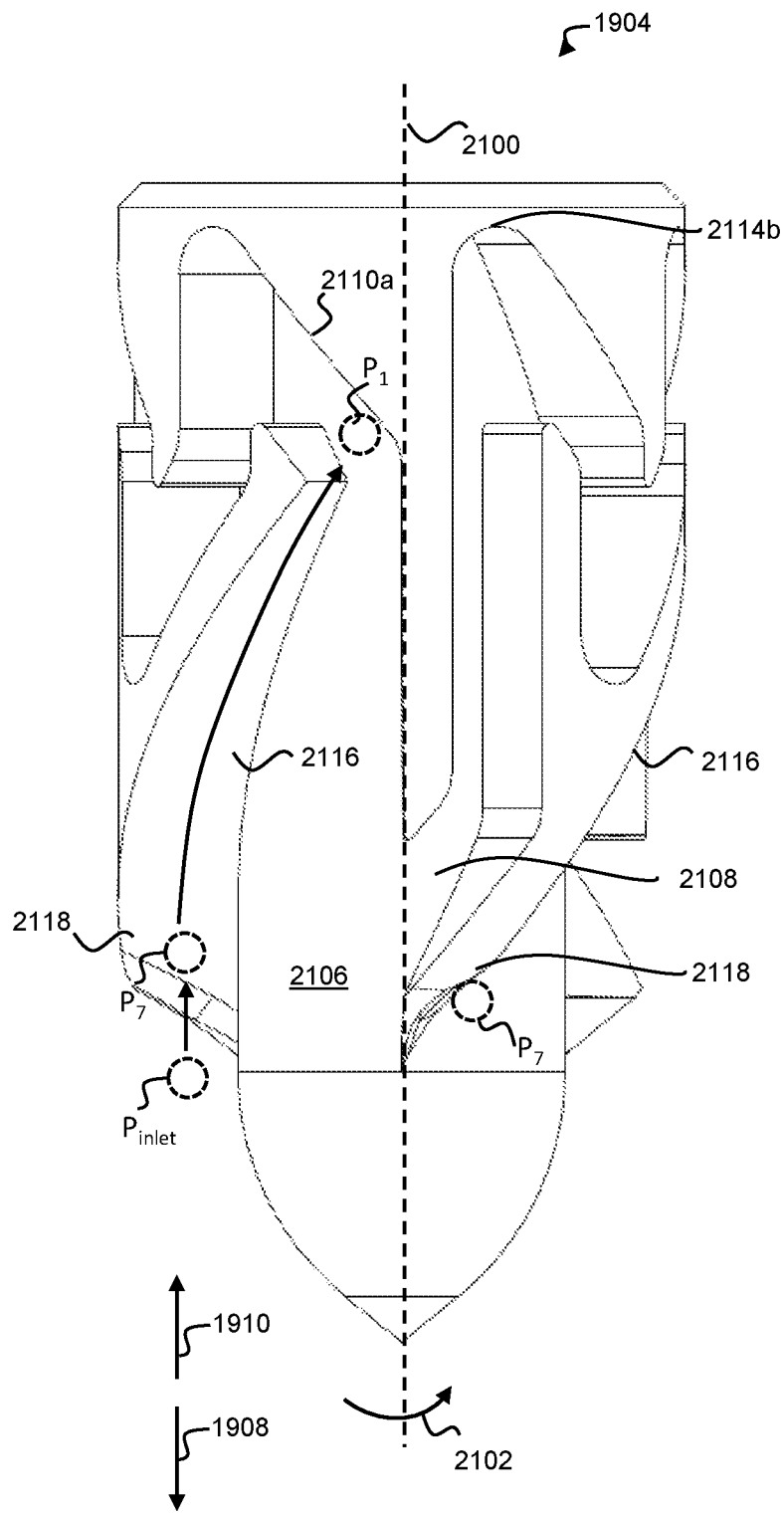
FIG. 23 is another diagram illustrating the example coupling member of FIG. 20, consistent with various embodiments.

FIG. 23 depicts the coupling member of FIG. 21 again to more clearly illustrate other features of the inlet 2106 to the guide path. The inlet 2106 in this example comprises an inlet surface 2116 which has a curvature in the second longitudinal direction and in the azimuthal direction. The inlet surface 2116 can be used to guide the protrusion towards the first part 2110a by causing the coupling member 1904 to rotate in a direction opposite to the azimuthal direction when the coupling member 1904 is initially moved in the first longitudinal direction 1908 towards the coupling counterpart when the payload container 1906 is being collected by the UAV 1900.

In some examples, the inlet surface 2116 comprises a seventh part 2118, the seventh part 2118 being spaced from the sixth part 2114b along the longitudinal axis 2100 and having substantially the same azimuthal position as the sixth part 2114b such that the protrusion is prevented from entering the outlet 2108 and engaging the sixth part 2114b when the coupling member 1904 moves in the first longitudinal direction 1908 towards the coupling counterpart 1912.

For example, $P_{inlet}$ is the position of the protrusion as it first enters the inlet 2106 as the coupling member 1904 moves in the first longitudinal direction 1908 towards the coupling counterpart 1912. Unlike the example described in FIG. 21, the protrusion is not aligned with the first part 2110a because the protrusion has a different azimuthal position to the first part 2110a. Therefore, as the coupling member 1904 continues to move in the first longitudinal direction 1908, the protrusion engages the inlet surface 2116 along a seventh part 2118 at position $P_7$. As mentioned above the inlet surface 2116 and therefore the seventh part 2118 has a curvature that extends in the first longitudinal direction and in the azimuthal direction. As the coupling member 1904 continues to move in the first longitudinal direction 1908 the engagement between the protrusion and the surface of the inlet surface 2118 causes the coupling member 1904 to rotate in a direction opposite to the azimuthal direction 2102. The rotation and the movement in the first longitudinal direction 1908 continues until the first part 2110a receives the protrusion at point $P_1$. Because the protrusion engages the seventh part 2118, it cannot accidentally enter the outlet 2108 because the seventh part 2118 blocks access to the outlet 2018 and the sixth part 2114b. The protrusion cannot erroneously enter the guide path in the wrong direction. The outlet 2108 can be said to be arranged in a direction substantially perpendicular to the longitudinal axis 2100, which means that movement in along the longitudinal axis 2100 does not allow the protrusion to enter the outlet 2108.

The coupling member 1904 advantageously has a generally cylindrical form to allow for a fluid rotation within the coupling counterpart 1912. In a particular example, the bottom end of the coupling member 1904 has a tapered profile to assist in guiding the coupling member 1904 into the coupling counterpart 1912. FIGS. 21-23 depict the width of the coupling member 1904 narrowing in the first longitudinal direction. As the coupling member 1904 is being lowered towards the coupling counterpart 1912, and is slightly misaligned with the coupling counterpart 1912, the tapered or pointed end can help guide the coupling member 1904 back towards the center of the coupling counterpart 1912.

As mentioned, FIG. 22A depicts a simplified view of the coupling member 1904 depicted in FIGS. 21 and 23. In this two-dimensional projection of the coupling member 1904, the inclined nature of the surfaces 2110a, 2112a, 2114a is more easily seen. For example, FIG. 22A shows that an acute angle subtends between the first part 2110a and the longitudinal axis 2100. Similarly, an acute angle subtends between the third part 2112a and the longitudinal axis 2100, and an acute angle also subtends between the fifth part 2114a and the longitudinal axis 2100. In the example of FIG. 22A, the first part 2110a of the ingress surface and the fifth part 2114a of the egress surface are inclined at substantially the same angle and have substantially the same length.

FIG. 22A depicts the route taken by a protrusion through a single guide path. As previously mentioned, the coupling member 1904 may comprise one or more guide paths, being azimuthally spaced apart from each other, around the coupling member 1904. For example, in FIG. 22A a guide path is shown on a front facing surface of the coupling member 1904, but one or more further guide paths may be formed on a rear facing surface of the coupling member 1904. Each guide path therefore receives and engages a corresponding protrusion of the coupling counterpart 1912.

In FIGS. 21 and 23, the guide path is formed between two structures which extend from the surface 2104 of the coupling member 1904. For example, the ingress and egress surfaces are part of the same structure and a barrier, extending in the first longitudinal direction 1908 separates the ingress and egress surfaces 2110a, 2110b, 2114a, 2114b. Similarly, the locking surface 2112a, 2112b and the inlet surface 2116 are part of the same structure. In FIG. 22A, however, the guide path is formed by three separate structures which extend from the surface 2104. It is therefore clear that the guide path can be formed by two or more separate structures which extend from the surface of the coupling member.

In one example the coupling member 1904 and the structures for engaging the protrusion(s) are a unitary member. For example, the guide path may be formed by removing material from the coupling member in order to create a groove or channel along the surface of the coupling member, where the groove or channel defines the guide path. In another example the structures may be formed separately from the coupling member 1904 and are attached to the coupling member 1904.

Figure 24A:
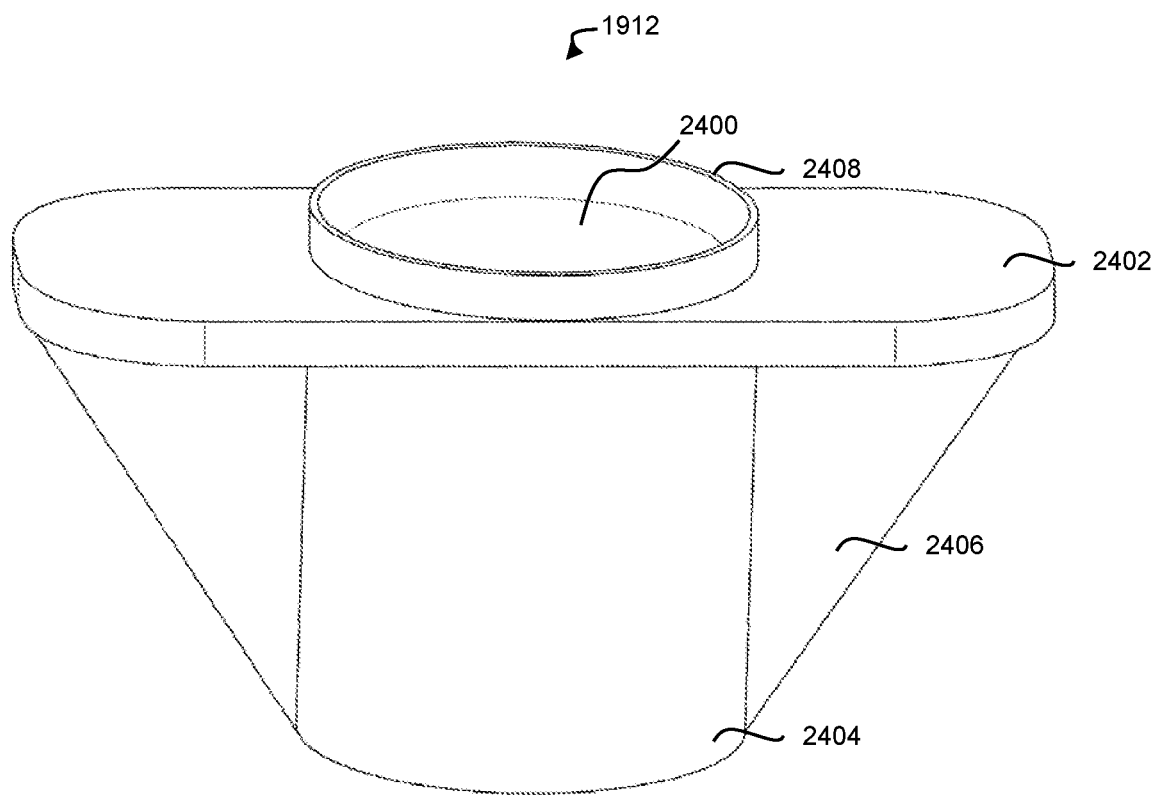
FIG. 24A illustrates a coupling counterpart for a container, according to an embodiment.
Figure 24B:
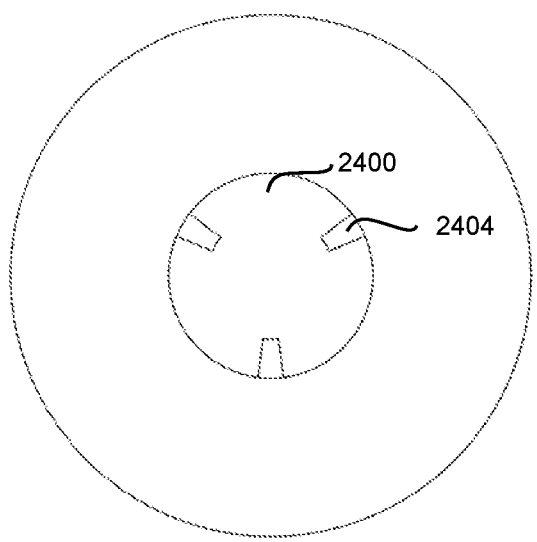
FIG. 24B illustrates a top down view of a coupling member, according to an embodiment.

FIGS. 24A and 24B depict an example coupling counterpart 1912 suitable for use with the coupling members described in FIGS. 19-23. The coupling member may however be similar or identical to the coupling counterpart 250 described in FIGS. 2G-J. FIG. 24B depicts a partial top down view of the coupling counterpart 1912. The coupling counterpart 1912 can be affixed to a payload container so that the payload container can be picked up by a coupling member. For example, the coupling counterpart 1912 can be fitted within an aperture on an outer surface of the payload container so that it is at least partially recessed within the payload container.

The coupling counterpart 1912 comprises an aperture 2400 to receive a coupling member 1904 therein. In this example the aperture is elongate and cylindrical, to correspond to the cylindrical profile of the coupling member 1904. The coupling counterpart 1912 further comprises an outer portion 2402 which surrounds the aperture 2400 and is designed to rest upon an outer surface of the payload container while at least a recessed portion 2404 of the aperture extends within the payload container. One or more wings 2406 may extend between the outer portion 2402 and the recessed portion 2406 to provide strength and stability. An edge or lip 2408 of the aperture 2400 can engage the tapered outer profile of the coupling member 1904 to help guide the coupling member 1904 into the aperture 2400 if they are slightly misaligned.

FIG. 24B depicts a partial top down view of the coupling counterpart 1912. Three protrusions 2404 can be seen extending radially inwards from an inner surface of the aperture 2400. Each protrusion is configured to engage a corresponding guide path of the coupling member 1904.

Figure 25:
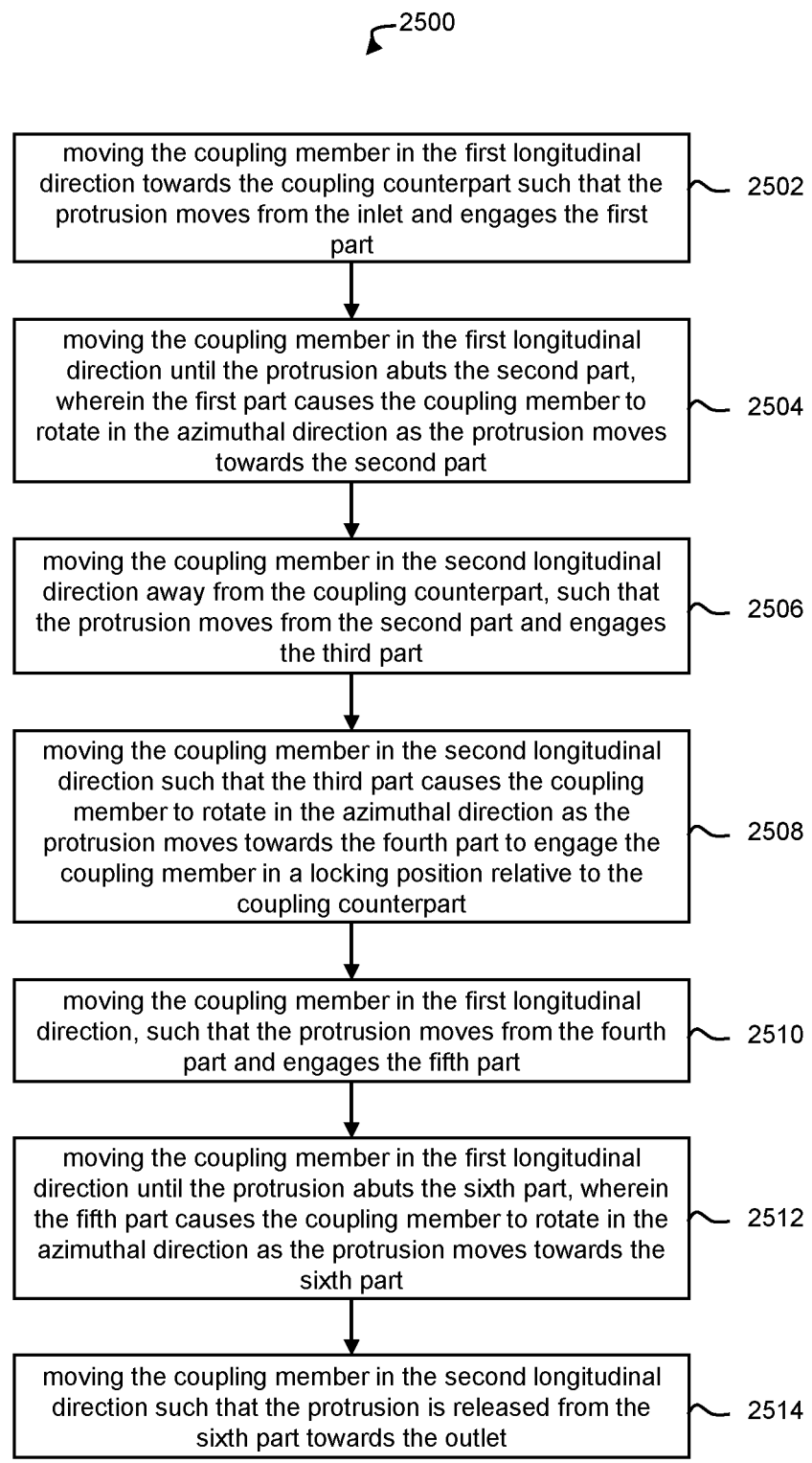
FIG. 25 is a flow diagram of a process for coupling the coupling member of FIG. 21 to a coupling counterpart, consistent with various embodiments.

FIG. 25 is a flow diagram of a method 2500 for coupling the coupling member 1904 to the coupling counterpart 1912. The method 2500 can be performed in the system 100 and using the drones 120, 1900 of FIGS. 1 and 19.

At block 2502, the method comprises moving the coupling member 1904 in the first longitudinal direction 1908 towards the coupling counterpart 1912 such that the protrusion moves from the inlet 2106 and engages the first part 2110a.

At block 2504, the method comprises moving the coupling member 1904 in the first longitudinal direction 1908 until the protrusion abuts the second part 2110b, wherein the first part 2110a causes the coupling member 1904 to rotate in the azimuthal direction 2102 as the protrusion moves towards the second part 2110b.

At block 2506, the method comprises moving the coupling member 1904 in the second longitudinal direction 1910 away from the coupling counterpart 1904, such that the protrusion moves from the second part 2110b and engages the third part 2112a.

At block 2508, the method comprises moving the coupling member 1904 in the second longitudinal direction 1910 such that the third part 2112a causes the coupling member 1904 to rotate in the azimuthal direction 2102 as the protrusion moves towards the fourth part 2112b to engage the coupling member 1904 in a locking position relative to the coupling counterpart 1912. The UAV 1900 may then transport the payload to a delivery destination.

At block 2510, the method comprises moving the coupling member 1904 in the first longitudinal direction 1908, such that the protrusion moves from the fourth part 2112b and engages the fifth part 2114a.

At block 2512, the method comprises moving the coupling member 1904 in the first longitudinal direction 1908 until the protrusion abuts the sixth part 2114b, wherein the fifth part 2114a causes the coupling member to rotate in the azimuthal direction 2102 as the protrusion moves towards the sixth part 2114b.

At block 2514, the method comprises moving the coupling member 1904 in the second longitudinal direction 1910 such that the protrusion is released from the sixth part 2114b towards the outlet 2108.

The following clauses define further examples.

1. A coupling member for coupling to a coupling counterpart, the coupling member defining first and second longitudinal directions, opposite to one another and parallel to a longitudinal axis, and an azimuthal direction around the longitudinal axis,
   wherein the coupling member comprises a guide path extending in the first and second longitudinal directions and in the azimuthal direction, the guide path being configured to guide a protrusion of the coupling counterpart from a locked position to an unlocked position, wherein the guide path comprises:
   an engagement surface comprising a first part, the first part being configured to abut the protrusion in the locked position; and
   an egress surface comprising a second part and a third part, the second part being configured to receive the protrusion from the first part when the coupling member is moved in the first longitudinal direction, the second part having a curvature in the first longitudinal direction and in the azimuthal direction, thereby to cause the coupling member to rotate in the azimuthal direction when the coupling member is moved in the first longitudinal direction after the protrusion is received by the second part, and the third part being configured to receive the protrusion from the second part and to release the protrusion to the unlocked position when the coupling member is moved in the second longitudinal direction away from the coupling counterpart.

2. The coupling member of clause 1, wherein the engagement surface and the egress surface of the guide path are defined by a hook element, the hook element protruding from a surface of the coupling member.

3. The coupling member of clause 2, wherein the hook element comprises:
   a slanted appendage, wherein a lower surface of the slanted appendage defines the egress surface of the guide path; and
   a hooked portion defining the engagement surface, wherein the hooked portion is connected to the lower surface of the slanted appendage.

4. The coupling member of clause 3, wherein an end of the lower surface of the slanted appendage defines the third part of the egress surface.

5. A drone comprising:
   suspension means configured to hold a package that is to be delivered or picked up;
   a coupling member in the suspension means configured to securely hold the package onto the suspension means; and
   a package delivery module configured to control a movement of the suspension means for delivering the package on a delivery area at a delivery destination, or for picking up the package.

6. The drone of clause 5, wherein the suspension means is configured to be wound around a spindle on the drone when the suspension means is in a retracted position.

7. The drone of clause 5, wherein the suspension means is a cable made of at least one of a metal, a metal alloy, a filament, a fiber, a thread, or a microfilament.

8. The drone of clause 5, wherein the suspension means includes a first end that is attached to the package delivery module and a second end that is attached to the coupling member.

9. The drone of clause 5, wherein the suspension means is made of a material that is severable by application of heat or using a cutting instrument.

10. The drone of clause 5, wherein the coupling member is gravity activated to hold or release the package from the suspension means, wherein the coupling member is configured to hold the package locked to the suspension means in an event the gravitational force exerted on the coupling member due to the weight of the package exceeds a first specified value.

11. The drone of clause 5, wherein the coupling member is configured to release the package from the suspension means in an event the gravitational force exerted on the coupling member due to the weight of the package drops below a second specified value.

12. The drone of clause 5, wherein the coupling member is configured to:
   couple with a coupling counterpart of the package to hold the package securely onto the suspension means, and decouple with the coupling counterpart to release the package from the suspension means.

13. The drone of clause 12, wherein the coupling member is configured to couple or decouple with the coupling counterpart in an automatic-coupling mode, the automatic-coupling mode including coupling or decoupling the coupling member with the coupling counterpart automatically by the drone.

14. The drone of clause 12, wherein the coupling member is configured to couple or decouple with the coupling counterpart in a passive-coupling mode, the passive-coupling mode including one or more manual operations to be performed by a human user to couple or decouple the coupling member with the coupling counterpart.

15. The drone of clause 5 further comprising:
a severing module configured to sever the suspension means from the drone.

16. The drone of clause 15, wherein the severing module is configured to sever the suspension means (a) in an event a load on the suspension means exceeds a specified value, (b) automatically by the drone, or (c) by a human operator.

17. The drone of clause 15, wherein the severing module is configured to sever the suspension means by applying heat on the suspension means or by using a cutting instrument.

18. The drone of clause 15, wherein the severing module is configured to apply heat on the suspension means by using a nichrome cutting element.

19. The drone of clause 18, wherein the nichrome cutting element is configured to be wound around a portion of the suspension means.

20. The drone of clause 5, wherein the package delivery module is further configured to monitor a load on the suspension means.

21. The drone of clause 15, wherein the package delivery module is configured to instruct the severing module to sever the suspension means in an event a load on the suspension means exceeds a specified value.

22. The drone of clause 5 further comprising:
an application module that is configured to execute a delivery application that facilitates the drone in delivering the package to the delivery destination or picking up the package from a pick up location.

23. The drone of clause 22, wherein the package delivery module is configured to:
instruct the drone to hover at the delivery destination at a particular height from the ground, and
lower the suspension means to deliver the package.

24. The drone of clause 22, wherein the application module is configured to receive location information of the pickup location, wherein the location information includes an address of the pickup location, GPS co-ordinates of the pickup location, or a smartphone location corresponding to the pickup location.

25. The drone of clause 22, wherein the application module is configured to instruct the package delivery module to lower the suspension means to pick up the package upon reaching the pickup location.

26. The drone of clause 15, wherein the drone comprises a plurality of power sources, processors and communications systems, and the severing module is configured to operate in accordance with one or more of:
a power source of the plurality of power sources that is independent of another power source or other power sources of the plurality;
a processor of the plurality of processors that is independent of another processor or other processors of the plurality; and
a communications system of the plurality of communications systems that is independent of another communications system or other communications systems of the plurality.

27. The drone of clause 5 further comprising:
a container in which the package is carried by the drone, and
a container hood attached to the suspension means, wherein the container is connected to the suspension means within the container hood.

28. The drone of clause 27, wherein the container includes multiple compartments for holding different types of payload that are temperature sensitive, wherein the multiple compartments include a first compartment for holding a first type of payload that is to be maintained in a first specified temperature range, and a second compartment for holding a second type of payload that is to be maintained in a second specified temperature range.

29. The drone of clause 27, wherein the container comprises a number of container portions, wherein some of the container portions include fold lines and slots, wherein the container is assembled by folding the container portions along the fold lines and connecting the container portions to each other using the slots.

30. The drone of clause 27, wherein the container includes modular container portions that are adjustable to carry payload of different sizes.

31. The drone of clause 27, wherein the container includes impact mitigating material.

32. The drone of clause 27, wherein the container includes temperature insulating material.

33. A method comprising:
loading a package onto a drone, wherein the package is locked to suspension means of the drone using a gravity activated coupling member, wherein the gravitational force exerted on the coupling member due to the weight of the package holds the package locked to the suspension means;
determining, by an application module of the drone, that the drone has reached a delivery destination of the package;
lowering, by a package delivery module of the drone, the suspension means to deliver the package at a delivery area in the delivery destination; and
releasing, by the coupling member, the package from the suspension means, wherein, when the package rests on the delivery area, the weight of package is off the suspension means, which enables the coupling member to be disengaged from the package causing the package to be released from the suspension means.

34. A method of transporting a package by a drone, comprising:
receiving, by the drone, location information of (a) a pickup location from which the package is to be picked up by the drone and (b) a delivery destination at which the package is to be delivered by the drone;
flying, by the drone, to the pickup location;
confirming, by the drone, that the drone is at the pickup location;
lowering, in response to the confirming, a suspension means of the drone to pick up the package from a pickup area at the pickup location, the lowering including holding the package onto the suspension means;
flying, by the drone, to the delivery destination;
confirming, by the drone, that the drone is at a delivery area in the destination location; and lowering, in response to the confirming, the suspension means to deliver the package at the delivery area, the lowering including releasing the package from the suspension means when the package is on the delivery area.

35. A method of severing suspension means of a drone, the method comprising:
detecting a change in load on the suspension means of the drone, wherein the suspension means is configured to carry a package to be delivered;
confirming that a weight on the suspension means due to the change in load exceeds a specified value; and
severing the suspension means from the drone, wherein the suspension means is severed by the application of heat on the suspension means.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

What is claimed is:

1. A drone comprising:
a retractable suspension member;
a coupling member attached to an end of the retractable suspension member, wherein the coupling member:
is configured to engage with a coupling counterpart of a container;
is gravity activated to hold or release the container from the retractable suspension member; and
is configured to hold the container locked to the retractable suspension member in an event the gravitational force exerted on the coupling member due to the weight of the container exceeds a first specified value and release the container from the retractable suspension member in an event the gravitational force exerted on the coupling member due to the weight of the container drops below a second specified value;
a package delivery module configured to control a movement of the retractable suspension member so as to lower and raise the coupling member;
a container housing affixed to the drone, wherein the container housing is adapted to receive the container; and
a brake;
wherein, in use:
the package delivery module fully retracts the container into the container housing such that the container is received flush within the container housing; and
the brake prevents the retractable suspension member from lowering.

2. The drone of claim 1, further comprising two tensioning rods, wherein the retractable suspension member passes between the tensioning rods.

3. The drone of claim 1, further comprising:
a force sensor configured to detect a gravitational force exerted on the retractable suspension member due to the weight of the container, wherein the drone is configured to determine, using the force sensor, whether the gravitational force falls below the second specified value.

4. The drone of claim 3, wherein the drone is configured to determine that the coupling member and coupling counterpart have decoupled when the gravitational force falls below the second specified value, and in response, cause the package delivery module to raise the retractable suspension member.

5. The drone of claim 1, wherein the coupling member is configured to:
couple with the coupling counterpart of the container to hold the package securely onto the retractable suspension member, and
decouple with the coupling counterpart to release the container from the retractable suspension member.

6. The drone of claim 5, wherein the coupling member is configured to couple or decouple with the coupling counterpart in an automatic-coupling mode, the automatic-coupling mode including coupling or decoupling the coupling member with the coupling counterpart automatically by the drone.

7. The drone of claim 6, wherein the drone is configured to rotate the coupling member to couple the coupling member with the coupling counterpart.

8. The drone of claim 1, further comprising:
a severing module configured to sever the retractable suspension member from the drone by applying heat to the retractable suspension member by using a nichrome cutting element, wherein the retractable suspension member passes through the nichrome cutting element.

9. The drone of claim 1, further comprising:
an application module that is configured to execute a delivery application that facilitates the drone in delivering the container to the delivery destination or picking up the container from a pick up location, wherein the application module is configured to:
instruct the drone to hover at the delivery destination at a particular height from the ground, and
lower the retractable suspension member to deliver the container,
wherein the particular height is a minimum parachute deployment height.

10. The drone of claim 8, wherein the drone comprises a plurality of power sources, processors and communications systems, and the severing module is configured to operate in accordance with one or more of:
a power source of the plurality of power sources that is independent of another power source or other power sources of the plurality;
a processor of the plurality of processors that is independent of another processor or other processors of the plurality; and
a communications system of the plurality of communications systems that is independent of another communications system or other communications systems of the plurality.

11. The drone of claim 1, further comprising:
a container hood attached to the retractable suspension member, wherein the container is connected to the retractable suspension member within the container hood.

12. The drone of claim 1, wherein the container includes impact mitigating material configured to deform in the event that the container is dropped from the drone.

13. The drone of claim 1, wherein the coupling member defines first and second longitudinal directions, opposite to one another and parallel to a longitudinal axis, and an azimuthal direction around the longitudinal axis,
wherein the coupling member comprises a guide path extending in the first and second longitudinal directions and in the azimuthal direction, the guide path being configured to guide a protrusion of the coupling counterpart from an inlet of the guide path to an outlet of the guide path, the inlet and outlet having different azimuthal positions on the coupling member, and wherein the guide path comprises:
an ingress surface comprising a first part and a second part, the first part being configured to receive the protrusion from the inlet when the coupling member is moved in the first longitudinal direction towards the coupling counterpart, the first part being inclined so as to extend in the first longitudinal direction and in the azimuthal direction, thereby to cause the coupling member to rotate in the azimuthal direction when the coupling member is moved in the first longitudinal direction towards the coupling counterpart after the protrusion is received by the first part, and the second part being configured to receive the protrusion from the first part and to abut the protrusion to limit movement of the coupling member relative to the coupling counterpart in the first longitudinal direction;
a locking surface comprising a third part and a fourth part, the third part being configured to receive the protrusion from the second part when the coupling member is moved in the second longitudinal direction away from the coupling counterpart, the third part being inclined so as to extend in the second longitudinal direction and in the azimuthal direction, thereby to cause the coupling member to rotate in the azimuthal direction when the coupling member is moved in the second longitudinal direction away from the coupling counterpart after the protrusion is received by the third part, and the fourth part being configured to receive the protrusion from the third part and to abut the protrusion to engage the coupling member in a locking position relative to the coupling counterpart; and
an egress surface comprising a fifth part and a sixth part, the fifth part being configured to receive the protrusion from the fourth part when the coupling member is moved in the first longitudinal direction towards the coupling counterpart, the fifth part being inclined so as to extend in the first longitudinal direction and in the azimuthal direction, thereby to cause the coupling member to rotate in the azimuthal direction when the coupling member is moved in the first longitudinal direction towards the coupling counterpart after the protrusion is received by the fifth part, and the sixth part being configured to receive the protrusion from the fifth part, to abut the protrusion to limit movement of the coupling member relative to the coupling counterpart in the first longitudinal direction, and to release the protrusion towards the outlet when the coupling member is moved in the second longitudinal direction away from the coupling counterpart.

14. The drone of claim 13, wherein:
the third part is spaced from the second part along the longitudinal axis and has substantially the same azimuthal position as the second part; and
the fifth part is spaced from the fourth part along the longitudinal axis and has substantially the same azimuthal position as the fourth part.

15. The drone of claim 13, wherein a gravitational force acts on the coupling member in the first longitudinal direction, thereby to cause the rotation in the azimuthal direction.

16. The drone of claim 13, wherein the first part of the ingress surface and the fifth part of the egress surface are inclined at substantially the same angle and have substantially the same length.

17. The drone of claim 13, wherein the coupling member comprises a profile that tapers in the first longitudinal direction towards a pointed end of the coupling member.

18. A system comprising:
the drone of claim 1;
a container; and
a coupling counterpart affixed to a top wall of the container, comprising:
an aperture to receive the coupling member of the drone;
a recessed portion extending into the container; and
an outer portion that surrounds the aperture and rests upon the top wall of the container.

19. The system of claim 18, wherein the coupling counterpart comprises one or more wings extending between the outer portion and the recessed portion.

20. A method of transporting a container by a drone, comprising:
receiving, by the drone, location information of (a) a pickup location from which the package is to be picked up by the drone and (b) a delivery destination at which the package is to be delivered by the drone;

flying, by the drone, to the pickup location;

confirming, by the drone, that the drone is at the pickup location;

lowering, in response to the confirming, a retractable suspension member of the drone towards the container such that a coupling member attached to an end of the retractable suspension member engages with a coupling counterpart of the container, wherein the coupling member:
   is gravity activated to hold or release the container from the retractable suspension member; and
   is configured to hold the container locked to the retractable suspension member in an event the gravitational force exerted on the coupling member due to the weight of the container exceeds a first specified value and release the container from the retractable suspension member in an event the gravitational force exerted on the coupling member due to the weight of the container drops below a second specified value;

fully retracting the retractable suspension member until the container is received flush within a container housing affixed to the drone;

engaging a brake to prevent the retractable suspension member from lowering;

flying, by the drone, to the delivery destination;

confirming, by the drone, that the drone is at a delivery area in the destination location; and lowering, in response to the confirming, the retractable suspension member to deliver the container at the delivery area, the lowering including releasing the container from the retractable suspension member when the container is on the delivery area.

* * * * *